US010110920B2

(12) United States Patent
Sato

(10) Patent No.: US 10,110,920 B2
(45) Date of Patent: *Oct. 23, 2018

(54) IMAGE PROCESSING APPARATUS AND METHOD

(71) Applicant: SONY CORPORATION, Tokyo (JP)

(72) Inventor: Kazushi Sato, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/465,132

(22) Filed: Mar. 21, 2017

(65) Prior Publication Data

US 2017/0195689 A1    Jul. 6, 2017

Related U.S. Application Data

(63) Continuation of application No. 14/363,503, filed as application No. PCT/JP2013/050212 on Jan. 9, 2013, now Pat. No. 9,667,995.

(30) Foreign Application Priority Data

Jan. 19, 2012    (JP) ................................. 2012-009328

(51) Int. Cl.
*H04N 19/593* (2014.01)
*H04N 19/44* (2014.01)
(Continued)

(52) U.S. Cl.
CPC ......... *H04N 19/593* (2014.11); *H04N 19/122* (2014.11); *H04N 19/436* (2014.11);
(Continued)

(58) Field of Classification Search
None
See application file for complete search history.

(56) References Cited

U.S. PATENT DOCUMENTS

| 2002/0057739 A1 | 5/2002 | Hasebe et al. |
| 2011/0228853 A1 | 9/2011 | Suzuki et al. |
| 2015/0237370 A1 | 8/2015 | Zhou et al. |

OTHER PUBLICATIONS

Bross, et al., WD4: Working Draft 4 of High-Efficiency Video Coding, Joint Collaborative Team on Video Coding (JCT-VC) of ITU-T SG16 WP3 and ISO/IEC JTC1/SC29/WG11, Jul. 14-22, 2011, p. i-204, 6th Meeting, Torino, Italy.
(Continued)

*Primary Examiner* — Frederick D Bailey
(74) *Attorney, Agent, or Firm* — Paratus Law Group, PLLC

(57) ABSTRACT

The present disclosure relates to an image processing apparatus and an image processing method capable of improving process efficiency through a parallel process. In a case of corresponding $PU_1$, there is a use of motion vector information pieces of $B_1$, $C_1$, and $E_1$ which are adjacent to corresponding $PU_1$ in the following positional relationship, and $A_0$ and $D_0$ which are adjacent to $PU_0$ located on corresponding $PU_1$ in the CU in the following positional relationship. In other words, in relation to corresponding $PU_1$, a PU corresponding to $A_1$ is $PU_0$, and thus $A_0$ is set instead of $A_1$ as an adjacent region of corresponding $PU_1$. The present disclosure is applicable to, for example, an image processing apparatus.

20 Claims, 34 Drawing Sheets

(51) Int. Cl.
*H04N 19/46* (2014.01)
*H04N 19/436* (2014.01)
*H04N 19/122* (2014.01)
*H04N 19/52* (2014.01)
*H04N 19/70* (2014.01)
*H04N 19/61* (2014.01)
*H04N 19/58* (2014.01)
*H04N 19/577* (2014.01)
*H04N 19/176* (2014.01)

(52) U.S. Cl.
CPC ............. *H04N 19/44* (2014.11); *H04N 19/46* (2014.11); *H04N 19/52* (2014.11); *H04N 19/176* (2014.11); *H04N 19/577* (2014.11); *H04N 19/58* (2014.11); *H04N 19/61* (2014.11); *H04N 19/70* (2014.11)

(56) References Cited

OTHER PUBLICATIONS

Winken, et al., Description of video coding technology proposal by Fraunhofer HHI, Joint Collaborative Team on Video Coding (JCT-VC) of ITU-T SG16 WP3 and ISO/IEC JTC1/SC29/WG11, Apr. 15-23, 2010, p. 1-44, 1$^{st}$ Meeting, Dresden, Germany.

Jung, et al., Competition-Based Scheme for Motion Vector Selection and Coding, ITU—Telecommunications Standardization Sector Study Group 16 Question 6 Video Coding Experts Group (VCEG), Jul. 17-18, 2006, p. 1-7, 29$^{th}$ Meeting, Klagenfurt, Austria.

| A | $e_1$ | b | | A |
|---|---|---|---|---|
| | $e_2$ | $e_3$ | | |
| d | | c | | d |
| | | | | |
| A | | b | | A |

IMAGE PROCESSING APPARATUS AND METHOD

CROSS-REFERENCE TO PRIOR APPLICATION

This application is a continuation of U.S. patent application Ser. No. 14/363,503 (filed on Jun. 6, 2014), which is a National Stage Patent Application of PCT International Patent Application No. PCT/JP2013/050212 (filed on Jan. 9, 2013) under 35 U.S.C. § 371, which claims priority to Japanese Patent Application No. 2012-009328 (filed on Jan. 19, 2012), which are all hereby incorporated by reference in their entirety.

TECHNICAL FIELD

The present disclosure relates to an image processing apparatus and an image processing method, and particularly to an image processing apparatus and an image processing method capable of improving process efficiency through a parallel process.

BACKGROUND ART

In recent years, apparatuses have been widely used which compress and code an image by employing a coding method in which image information is treated as a digital value, and, at this time, the image information is compressed through orthogonal transform such as discrete cosine transform and motion compensation by using redundancy unique to the image information in order to transmit and accumulate information with high efficiency. The coding method includes, for example, Moving Picture Experts Group (MPEG) or the like.

Particularly, MPEG2 (ISO/IEC 13818-2) is defined as a general use image coding method, and is a standard covering both an interlaced scanning image and a progressive scanning image, and a standard resolution image and a high definition image. For example, MPEG2 is currently widely used in extensive applications for professional use and consumer use. By the use of the MPEG2 compression method, it is possible to assign a bit rate of 4 Mbps to 8 Mbps to an interlaced scanning image of a standard resolution having 720×480 pixels, for example. In addition, by the use of MPEG2, it is possible to assign a bit rate of 18 Mbps to 22 Mbps to an interlaced scanning image of a high resolution having 1920×1088 pixels, for example. Accordingly, it is possible to realize a high compression ratio and good image quality.

MPEG2 has mainly targeted high image quality coding suitable for broadcasting, but has not handled a coding method at a bit rate lower than that in MPEG1, that is, at a higher compression ratio. With the wide use of portable terminals, the need for such a coding method has been considered to increase, and thus a MPEG4 coding method has been standardized so as to correspond thereto. In relation to an image coding method, a standard thereof was approved as an international standard entitled ISO/IEC 14496-2 on December, 1998.

As for the standardization schedule thereof, the coding method has become an international standard under the name of H.264 and MPEG-4 Part 10 (Advanced Video Coding which will be hereinafter referred to as AVC) in March 2003.

In addition, as an extension of the AVC method, Fidelity Range Extension (FRExt) which includes coding tools for use in business such as RGB or 4:2:2 and 4:4:4 and also includes 8×8 DCT or quantization matrix defined in MPEG2 was standardized in February, 2005. This realizes a coding method in which even film noise included in a movie can be favorably expressed by using the AVC method, and thus leads to use for various applications such as Blu-Ray Disc (registered trademark).

However, recently, there have been increasing need for higher compression ratio coding, such as a need for compression of an image with about 4000×2000 pixels which is four times the size of a high-vision image or a need for delivery of a high-vision image in limited transmission capacity circumstances such as the Internet. For this reason, study of improvement of coding efficiency is being currently performed in Video Coding Expert Group (VCEG) affiliated to the above ITU-T.

As one of methods for improving coding efficiency, a method (hereinafter, referred to as MV competition) has been proposed in which, in order to improve coding of a motion vector using median prediction in the AVC method, either "temporal predictor" or "spatio-temporal predictor" is adaptively used as prediction motion vector information in addition to "spatial predictor" which is defined in the AVC method and is obtained through the median prediction (for example, refer to NPL 1).

In addition, in the AVC method, a cost function value in a high complexity mode or a low complexity mode implemented in reference software using the AVC method, called Joint Model (JM), is used to select prediction motion vector information.

In other words, a cost function value when prediction motion vector information is used is selected, and optimal prediction motion vector information is selected. Flag information indicating information regarding which prediction motion vector information is used in each block is transmitted in image compression information.

However, there is a concern that a macroblock size of 16 pixels×16 pixels may not be optimal for a large picture frame such as Ultra High Definition (UHD; 4000 pixels× 2000 pixels) which will become a target of a next-generation coding method.

Therefore, currently, for the purpose of improvement in higher coding efficiency than that of AVC, standardization of a coding method called High Efficiency Video Coding (HEVC) is in progress by Joint Collaboration Team-Video Coding (JCTVC) which is a joint standardization organization of International Telecommunication Union Telecommunication Standardization Sector (ITU-T) and International Organization for Standardization (ISO)/International Electrotechnical Commission (IEC) (for example, refer to NPL 2).

In the HEVC coding method, a coding unit (CU) which is the same process unit as the macroblock in the AVC method is defined. The CU is not fixed in a size of 16×16 pixels, unlike in the macroblock of the AVC method, and is designated in image compression information for each sequence. In addition, in each sequence, the largest coding unit (LCU) and the smallest coding unit (SCU) of the CU are prescribed.

Further, as one of the coding methods of motion information, a method (hereinafter, referred to as a merge mode) called motion partition merging has been proposed (for example, refer to NPL 3). In this method, in a case where motion information of a corresponding block is the same as motion information of a neighboring block, only flag information is transmitted, and, during decoding, the motion information of the corresponding block is reconstructed by using the motion information of the neighboring block.

In other words, also in the merge mode, a spatial predictor (spatial prediction motion vector) and a temporal predictor (temporal prediction motion vector) are obtained from the neighboring blocks, and an optimal prediction motion vector is determined from thereamong. Further, in the merge mode, in a case where the determined prediction motion vector and motion information of a corresponding block are the same as each other, only flag information is transmitted.

Meanwhile, a spatial predictor of a corresponding PU which is a process target is obtained in a motion vector coding or decoding process in the above MV competition or merge mode. In this case, a method has been proposed in which a motion vector of a PU adjacent to the corresponding PU in a predetermined positional relationship among PUs adjacent thereto is used as a candidate of a spatial predictor of the corresponding PU.

Specifically, a motion vector of $A_0$ which is a PU adjacent to the lower left side of the corresponding PU, and a motion vector of $A_1$ which is a PU located on $A_0$ among PUs adjacent to the left side of the corresponding PU, are used as candidates. In addition, a motion vector of $B_2$ which is a PU adjacent to the upper left side the corresponding PU, a motion vector of $B_0$ which is a PU adjacent to the upper right side of the corresponding PU, and a motion vector of $B_1$ which is a PU located on the left side of $B_0$ among PUs adjacent to the upper side of the corresponding PU, are used as candidates.

In addition, scanning is performed in an order of $A_0$ and $A_1$ and an order of $B_0$, $B_1$ and $B_2$, and the scanning finishes at the time when motion vector information having a reference frame which is equivalent to motion vector information of the corresponding PU is detected.

CITATION LIST

Non Patent Literature

NPL 1: Joel Jung, Guillaume Laroche, "Competition-Based Scheme for Motion Vector Selection and Coding", VCEG-AC06, ITU-Telecommunications Standardization Sector STUDY GROUP 16 Question 6 Video Coding Experts Group (VCEG) 29th Meeting: Klagenfurt, Austria, 17 and 18 Jul. 2006

NPL 2: Thomas Wiegand, Woo-Jin Han, Benjamin Bross, Jens-Rainer Ohm, Gary J. Sullivan, "Working Draft 4 of High-Efficiency Video Coding", JCTVC-F803, Joint Collaborative Team on Video Coding (JCT-VC) of ITU-T SG16 WP3 and ISO/IEC JTC1/SC29/WG11 6th Meeting: Torino, IT, 14 to 22 Jul. 2011

NPL 3: Martin Winken, Sebastian Bosse, Benjamin Bross, Philipp Helle, Tobias Hinz, Heiner Kirchhoffer, Haricharan Lakshman, Detlev Marpe, Simon Oudin, Matthias Preiss, Heiko Schwarz, Mischa Siekmann, Karsten Suehring, and Thomas Wiegand, "Description of video coding technology proposed by Fraunhofer HHI", JCTVC-A116, April, 2010

SUMMARY OF INVENTION

Technical Problem

However, in a case where a single CU is split into, for example, 2N×N, the above-described coding or decoding of a motion vector regarding PU1 located on the upper side of the CU cannot be performed unless motion vector information regarding PU0 located on the lower side of the CU is fixed. For this reason, motion vector information pieces regarding PU0 and PU1 cannot be processed in parallel.

In addition, this is also the same for a case where a single CU is split into PUs of N×2N.

The present disclosure has been made in consideration of these circumstances and is to improve process efficiency through a parallel process in coding or decoding of a motion vector.

Technical Solution

According to an aspect of the present disclosure, there is provided an image processing apparatus including an adjacent region setting unit that sets spatially adjacent regions on the basis of positions of prediction regions in a coding region so that generation of spatial motion vectors of the plurality of prediction regions is performed in parallel when a spatial prediction motion vector is generated among prediction motion vectors used to decode motion vectors of the plurality of prediction regions forming the coding region of an image; a prediction motion vector generation unit that generates a spatial prediction vector of the prediction region by using the motion vector of the spatially adjacent region set by the adjacent region setting unit; and a motion vector decoding unit that decodes a motion vector of the prediction region by using the prediction motion vector of the prediction region.

In a case where a first prediction region is located on a right or lower side in the coding region, the adjacent region setting unit may set a first adjacent region of a second prediction region instead of the first adjacent region serving as the second prediction region located on a left or upper side in the coding region among adjacent regions of the first prediction region.

In a case where the first prediction region is located on the right or lower side in the coding region, the adjacent region setting unit may set a second adjacent region of the second prediction region instead of the second adjacent region adjacent to the first prediction region among the adjacent regions of the first prediction region.

In a case where the coding region is split into prediction regions of 2N×N, the first prediction region is a prediction region located on the lower side in the coding region, the second prediction region is a prediction region located on the upper side in the coding region, the first adjacent region is an adjacent region adjacent to an upper side of the prediction region, and the second adjacent region is an adjacent region adjacent to an upper right side of the prediction region.

In a case where the coding region is split into prediction regions of N×2N, the first prediction region is a prediction region located on the right side in the coding region, the second prediction region is a prediction region located on the left side in the coding region, the first adjacent region is an adjacent region adjacent to a left side of the prediction region, and the second adjacent region is an adjacent region adjacent to a lower left side of the prediction region.

In a case where the first prediction region is located on the right side and the lower side in the coding region, the adjacent region setting unit sets a first adjacent region of a second prediction region instead of the first adjacent region serving as the second prediction region adjacent to the upper left side in the coding region among adjacent regions of the first prediction region.

In a case where the coding region is split into prediction regions of 4×4, when the first prediction region is a prediction region located on the upper right side in the coding region, and the second prediction region is a prediction region located on the upper left side in the coding region, the first adjacent region is an adjacent region adjacent to the left side of the prediction region, and the second adjacent region is an adjacent region adjacent to the lower left side of the prediction region; when the first prediction region is a prediction region located on the lower left side in the coding region, and the second prediction region is a prediction region located on the upper left side in the coding region, the first adjacent region is an adjacent region adjacent to the upper side of the prediction region, and the second adjacent region is an adjacent region adjacent to the upper right side of the prediction region; and when the first prediction region is a prediction region located on the lower right side in the coding region, and the second prediction region is a prediction region located on the upper left side in the coding region, the first adjacent region is an adjacent region adjacent to the upper left side of the prediction region.

The coding region is split into a plurality of prediction regions on the basis of asymmetric motion partition.

The image processing apparatus may further include a reception unit that receives a coded stream and a flag indicating whether or not setting of the spatially adjacent region will be performed; and a decoding unit that decodes the coded stream received by the reception unit so as to generate the image, and, the adjacent region setting unit may perform setting of the spatially adjacent region on the basis of the flag received by the reception unit.

The flag is set for each coding region or the prediction region.

Whether or not setting of the spatially adjacent region will be performed may be set on the basis of a sequence profile or level, and the adjacent region setting unit may perform setting of the spatially adjacent region on the basis of the sequence profile or level.

According to the aspect of the present disclosure, there is provided an image processing method including causing an image processing apparatus to set spatially adjacent regions on the basis of positions of prediction regions in a coding region so that generation of spatial motion vectors of the plurality of prediction regions is performed in parallel when a spatial prediction motion vector is generated among prediction motion vectors used to decode motion vectors of the plurality of prediction regions forming the coding region of an image; generate a spatial prediction vector of the prediction region by using the motion vector of the set spatially adjacent region; and decode a motion vector of the prediction region by using the prediction motion vector of the prediction region.

According to another aspect of the present disclosure, there is provided an image processing apparatus including an adjacent region setting unit that sets spatially adjacent regions on the basis of positions of prediction regions in a coding region so that generation of spatial motion vectors of the plurality of prediction regions is performed in parallel when a spatial prediction motion vector is generated among prediction motion vectors used to code motion vectors of the plurality of prediction regions forming the coding region of an image; a prediction motion vector generation unit that generates a spatial prediction vector of the prediction region by using the motion vector of the spatially adjacent region set by the adjacent region setting unit; and a motion vector coding unit that codes a motion vector of the prediction region by using the prediction motion vector of the prediction region.

In a case where a first prediction region is located on a right or lower side in the coding region, the adjacent region setting unit may set a first adjacent region of a second prediction region instead of the first adjacent region serving as the second prediction region located on a left or upper side in the coding region among adjacent regions of the first prediction region.

In a case where the first prediction region is located on the right or lower side in the coding region, the adjacent region setting unit may set a second adjacent region of the second prediction region instead of the second adjacent region adjacent to the first prediction region among the adjacent regions of the first prediction region.

In a case where the coding region is split into prediction regions of 2N×N, the first prediction region is a prediction region located on the lower side in the coding region, the second prediction region is a prediction region located on the upper side in the coding region, the first adjacent region is an adjacent region adjacent to an upper side of the prediction region, and the second adjacent region is an adjacent region adjacent to an upper right side of the prediction region.

In a case where the coding region is split into prediction regions of N×2N, the first prediction region is a prediction region located on the right side in the coding region, the second prediction region is a prediction region located on the left side in the coding region, the first adjacent region is an adjacent region adjacent to a left side of the prediction region, and the second adjacent region is an adjacent region adjacent to a lower left side of the prediction region.

In a case where the first prediction region is located on the lower right side in the coding region, the adjacent region setting unit sets a first adjacent region of a second prediction region instead of the first adjacent region serving as the second prediction region located on the upper left side in the coding region among adjacent regions of the first prediction region.

In a case where the coding region is split into prediction regions of 4×4, when the first prediction region is a prediction region located on the upper right side in the coding region, and the second prediction region is a prediction region located on the upper left side in the coding region, the first adjacent region is an adjacent region adjacent to the left side of the prediction region, and the second adjacent region is an adjacent region adjacent to the lower left side of the prediction region; when the first prediction region is a prediction region located on the lower left side in the coding region, and the second prediction region is a prediction region located on the upper left side in the coding region, the first adjacent region is an adjacent region adjacent to the upper side of the prediction region, and the second adjacent region is an adjacent region adjacent to the upper right side of the prediction region; and when the first prediction region is a prediction region located on the lower right side in the coding region, and the second prediction region is a prediction region located on the upper left side in the coding region, the first adjacent region is an adjacent region adjacent to the upper left side of the prediction region.

The coding region is split into a plurality of prediction regions on the basis of asymmetric motion partition.

The image processing apparatus may further include a setting unit that sets a flag indicating whether or not setting of the spatially adjacent region will be performed; a coding unit that codes the image so as to generate a coded stream; and a transmission unit that transmits the motion vector coded by the motion vector coding unit, the coded stream generated by the coding unit, and the flag set by the setting unit, and the adjacent region setting unit may perform setting of the spatially adjacent region on the basis of the flag set by the setting unit.

The setting unit may set the flag for each coding region or the prediction region.

Whether or not setting of the spatially adjacent region will be performed may be set on the basis of a sequence profile or level, and the adjacent region setting unit may perform setting of the spatially adjacent region on the basis of the sequence profile or level.

According to another aspect of the present disclosure, there is provided an image processing method including causing an image processing apparatus to set spatially adjacent regions on the basis of positions of prediction regions in a coding region so that generation of spatial motion vectors of the plurality of prediction regions is performed in parallel when a spatial prediction motion vector is generated among prediction motion vectors used to code motion vectors of the plurality of prediction regions forming the coding region of an image; generate a spatial prediction vector of the prediction region by using the motion vector of the set spatially adjacent region; and code a motion vector of the target region by using the prediction motion vector of the prediction region.

According to an aspect of the present disclosure, spatially adjacent regions are set on the basis of positions of prediction regions in a coding region so that generation of spatial motion vectors of the plurality of prediction regions is performed in parallel when a spatial prediction motion vector is generated among prediction motion vectors used to decode motion vectors of the plurality of prediction regions forming the coding region of an image. In addition, a spatial prediction vector of the prediction region is generated by using the motion vector of the set spatially adjacent region, and a motion vector of the prediction region is decoded by using the prediction motion vector of the prediction region.

According to another aspect of the present disclosure, spatially adjacent regions are set on the basis of positions of prediction regions in a coding region so that generation of spatial motion vectors of the plurality of prediction regions is performed in parallel when a spatial prediction motion vector is generated among prediction motion vectors used to code motion vectors of the plurality of prediction regions forming the coding region of an image. In addition, a spatial prediction vector of the prediction region is generated by using the motion vector of the set spatially adjacent region, and a motion vector of the target region is coded by using the prediction motion vector of the prediction region.

Further, the above-described image processing apparatus may be a standalone apparatus, and may be an internal block which forms a single image coding device or image decoding device.

Advantageous Effects of Invention

According to the aspect of the present disclosure, it is possible to decode an image. Particularly, it is possible to improve process efficiency through a parallel process in coding or decoding of a motion vector.

According to another aspect of the present disclosure, it is possible to code an image. Particularly, it is possible to improve process efficiency through a parallel process in coding or decoding of a motion vector.

DESCRIPTION OF EMBODIMENTS

Hereinafter, embodiments of the present disclosure will be described. In addition, the description will be made in the following order.
1. First embodiment (image coding device)
2. Second embodiment (image decoding device)
3. Third embodiment (multi-view image coding and multi-view image decoding devices)
4. Fourth embodiment (layer image coding and layer image decoding devices)
5. Fifth embodiment (computer)
6. Application examples
7. Application examples of scalable coding

1. First Embodiment

[Image Coding Device]

Figure 1:
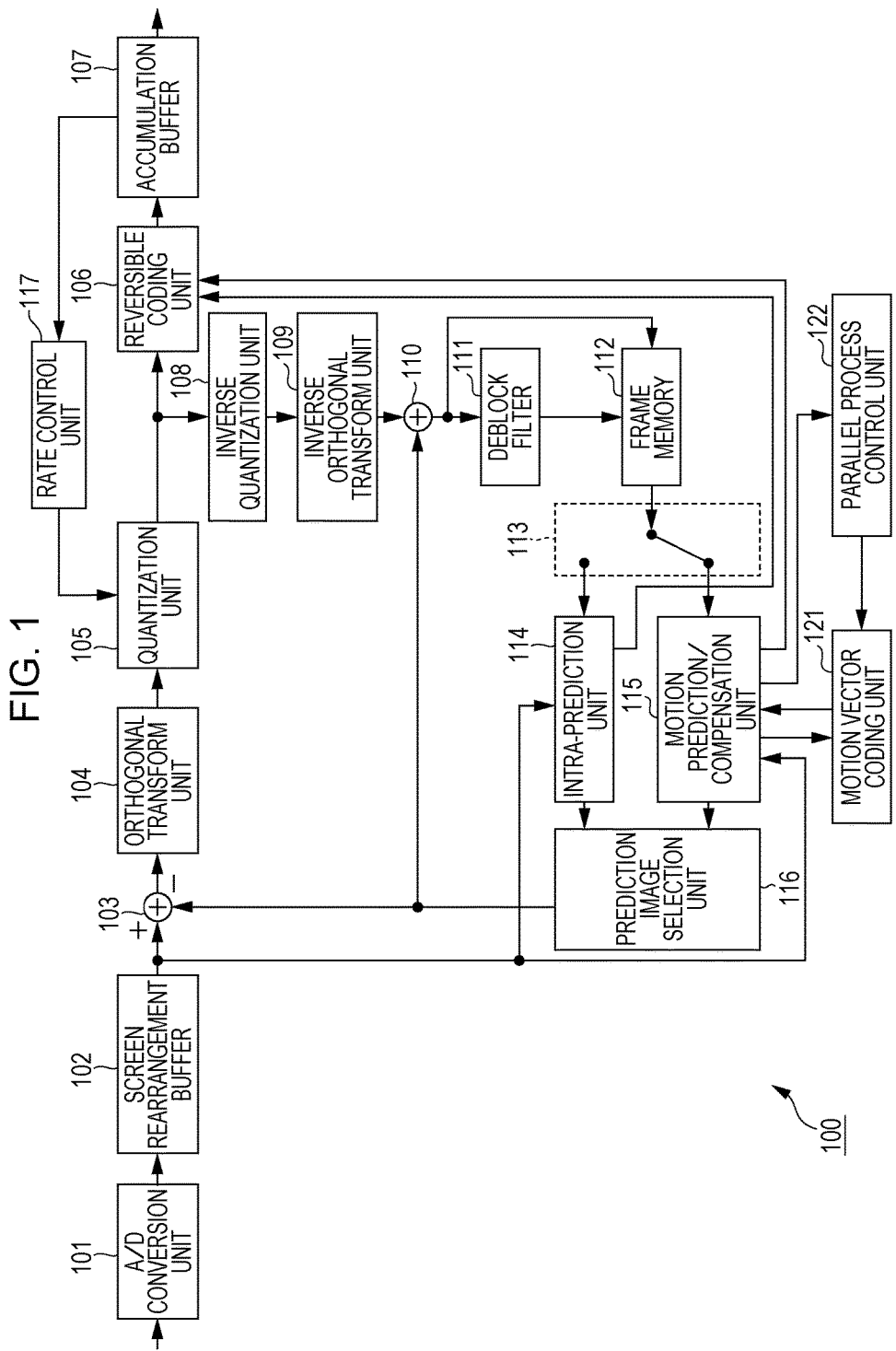
FIG. 1 is a block diagram illustrating a main configuration example of an image coding device.

FIG. 1 is a block diagram illustrating a main configuration example of an image coding device.

The image coding device 100 illustrated in FIG. 1 codes image data, for example, by using a prediction process method conforming to High Efficiency Video Coding (HEVC). In the image coding device 100, coding is performed by using a CU (also referred to as a coding region) as a process unit.

As illustrated in FIG. 1, the image coding device 100 includes an A/D conversion unit 101, a screen rearrangement buffer 102, a calculation unit 103, an orthogonal transform unit 104, a quantization unit 105, a reversible coding unit 106, an accumulation buffer 107, an inverse quantization unit 108, and an inverse orthogonal transform unit 109. In addition, the image coding device 100 includes a calculation unit 110, a deblock filter 111, a frame memory 112, a selection unit 113, an intra-prediction unit 114, a motion prediction/compensation unit 115, a prediction image selection unit 116, and a rate control unit 117.

The image coding device 100 further includes a motion vector coding unit 121 and a parallel process control unit 122.

The A/D conversion unit 101 performs A/D conversion on input image data, and supplies and stores the converted image data (digital data) to and in the screen rearrangement buffer 102. The screen rearrangement buffer 102 rearranges images of frames in a stored display order, in an order of frames for coding in accordance with a group of picture (GOP), and supplies the images of which an order of the frames is rearranged to the calculation unit 103. In addition, the screen rearrangement buffer 102 also supplies the images of which an order of the frames is rearranged to the intra-prediction unit 114 and the motion prediction/compensation unit 115.

The calculation unit 103 subtracts a prediction image which is supplied from the intra-prediction unit 114 or the motion prediction/compensation unit 115 via the prediction image selection unit 116, from the image which is read from the screen rearrangement buffer 102, and outputs difference information thereof to the orthogonal transform unit 104.

For example, in a case of an image on which inter-coding is performed, the calculation unit 103 subtracts a prediction image which is supplied from the motion prediction/compensation unit 115, from an image which is read from the screen rearrangement buffer 102.

The orthogonal transform unit 104 performs orthogonal transform such as discrete cosine transform or Karhunen-Loeve transform on the difference information supplied from the calculation unit 103. In addition, any method of the orthogonal transform may be used. The orthogonal transform unit 104 supplies a transform coefficient obtained by the orthogonal transform to the quantization unit 105.

The quantization unit 105 quantizes the transform coefficient supplied from the orthogonal transform unit 104. The quantization unit 105 sets a quantization parameter on the basis of information on a target value of a bit rate supplied from the rate control unit 117, and quantizes the parameter. In addition, any method of the quantization may be used. The quantization unit 105 supplies the quantized transform coefficient to the reversible coding unit 106.

The reversible coding unit 106 codes the transform coefficient which has been quantized in the quantization unit 105, by using any coding method. The coefficient data is quantized under the control of the rate control unit 117, and thus the bit rate becomes a target value (or is approximated to the target value) set by the rate control unit 117.

In addition, the reversible coding unit 106 acquires information or the like indicating an intra-prediction mode from the intra-prediction unit 114, and acquires information indicating an inter-prediction mode or motion vector information from the motion prediction/compensation unit 115.

The reversible coding unit 106 codes the various information pieces by using any coding method, and uses the coded information as a part of header information of coded data (also referred to as a coded stream) (multiplexes). The reversible coding unit 106 supplies and accumulates coded data which is obtained by the coding to and in the accumulation buffer 107.

For example, variable length coding, arithmetic coding, or the like may be used as a coding method for the reversible coding unit 106. The variable length coding may include, for example, Context-Adaptive Variable Length Coding (CAVLC) defined in the AVC method, or the like. The arithmetic coding may include, for example, Context-Adaptive Binary Arithmetic Coding (CABAC) or the like.

The accumulation buffer 107 temporarily holds the coded data supplied from the reversible coding unit 106. The accumulation buffer 107 outputs the coded data held therein, for example, to a recording device (recording medium) or a transmission path (not illustrated) in a subsequent stage, at a predetermined timing. In other words, the accumulation buffer 107 also functions as a transmission unit which transmits the coded data.

In addition, the transform coefficient quantized in the quantization unit 105 is also supplied to the inverse quantization unit 108. The inverse quantization unit 108 inversely quantizes the quantized transform coefficient in a method corresponding to the quantization in the quantization unit 105. Any method of the inverse quantization may be used as long as the method corresponds to the quantization process in the quantization unit 105. The inverse quantization unit 108 supplies an obtained transform coefficient to the inverse orthogonal transform unit 109.

The inverse orthogonal transform unit 109 performs inverse orthogonal transform on the transform coefficient supplied from the inverse quantization unit 108 in a method corresponding to the orthogonal transform process in the orthogonal transform unit 104. Any method of the inverse orthogonal transform may be used as long as the method corresponds to the orthogonal transform process in the orthogonal transform unit 104. The output which has undergone the inverse orthogonal transform (recovered difference information) is supplied to the calculation unit 110.

The calculation unit 110 adds the prediction image which is supplied from the intra-prediction unit 114 or the motion prediction/compensation unit 115 via the prediction image selection unit 116, to the recovered difference information which is the inverse orthogonal transform result supplied from the inverse orthogonal transform unit 109, thereby obtaining a locally decoded image (decoded image). The decoded image is supplied to the deblock filter 111 or the frame memory 112.

The deblock filter 111 performs an appropriate deblock filter process on the decoded image supplied from the calculation unit 110. For example, the deblock filter 111 performs a deblock filter process on the decoded image so as to remove block distortion from the decoded image.

The deblock filter 111 supplies the filter process result (the decoded image having undergone the filter process) to the frame memory 112. In addition, as described above, the decoded image output from the calculation unit 110 may be supplied to the frame memory 112 without using the deblock filter 111. In other words, the filter process by the deblock filter 111 may be omitted.

The frame memory 112 stores the supplied decoded image, and supplies the stored decoded image to the selection unit 113 as a reference image at a predetermined timing.

The selection unit 113 selects a supply destination of a reference image which is supplied from the frame memory 112. For example, in a case of inter-prediction, the selection unit 113 supplies the reference image supplied from the frame memory 112, to the motion prediction/compensation unit 115.

The intra-prediction unit 114 performs intra-prediction (in-screen prediction) for generating a prediction image with a fundamental prediction unit (PU) as a process unit by using a pixel value in a process target picture which is the reference image supplied from the frame memory 112 via the selection unit 113. The intra-prediction unit 114 performs the intra-prediction in a plurality of intra-prediction modes which are prepared in advance.

The intra-prediction unit 114 generates prediction images in all candidate intra-prediction modes, evaluates a cost function value of each prediction image by using an input image supplied from the screen rearrangement buffer 102, and selects an optimal mode. If an optimal intra-prediction mode is selected, the intra-prediction unit 114 supplies a prediction image which has been generated in the optimal mode, to the prediction image selection unit 116.

In addition, as described above, the intra-prediction unit 114 supplies intra-prediction mode information or the like indicating the employed intra-prediction mode to the reversible coding unit 106 as appropriate so as to allow the information to be coded.

The motion prediction/compensation unit 115 performs motion prediction (inter-prediction) with a fundamental PU as a process unit by using the input image which supplied from the screen rearrangement buffer 102 and the reference image which is supplied from the frame memory 112 via the selection unit 113. Hereinafter, the prediction unit (PU) is also referred to as a prediction region. The motion prediction/compensation unit 115 supplies the detected motion vector to the motion vector coding unit 121, and performs a motion compensation process in accordance with the detected motion vector so as to generate a prediction image (inter-prediction image information). The motion prediction/compensation unit 115 performs the inter-prediction in a plurality of inter-prediction modes which are prepared in advance.

The motion prediction/compensation unit 115 supplies motion vector information of a target prediction region, obtained due to the inter-prediction, to the motion vector coding unit 121. In addition, the motion prediction/compensation unit 115 supplies size information of the PU (prediction region) to the parallel process control unit 122. The size information of the PU is information indicating how a PU forms a CU, that is, a partition size of the PU.

The motion prediction/compensation unit 115 generates a difference motion vector which is a difference between a motion vector of a target prediction region and a prediction motion vector of the target prediction region from the motion vector coding unit 121. In addition, the motion prediction/compensation unit 115 evaluates a cost function value of each prediction image by an input image supplied from the screen rearrangement buffer 102, the information on the generated difference motion vector, and the like, and selects an optimal mode. If an optimal inter-prediction mode is selected, the motion prediction/compensation unit 115 supplies a prediction image which has been generated in the optimal mode, to the prediction image selection unit 116.

The motion prediction/compensation unit 115 supplies information indicating the employed inter-prediction mode, information required to perform a process in the inter-prediction mode when coded data is decoded, or the like, to the reversible coding unit 106 so as to allow the information to be coded. The necessary information includes, for example, information on generated difference motion vector, prediction motion vector information including a flag indicating an index of a prediction motion vector, and the like.

The prediction image selection unit 116 selects a supply source of a prediction image which is to be supplied to the calculation unit 103 or the calculation unit 110. For example, in a case of inter-coding, the prediction image selection unit 116 selects the motion prediction/compensation unit 115 as a supply source of a prediction image, and supplies a prediction image which is supplied from the motion prediction/compensation unit 115, to the calculation unit 103 or the calculation unit 110.

The rate control unit 117 controls a rate of the quantization operation of the quantization unit 105 on the basis of a bit rate of coded data accumulated in the accumulation buffer 107 so that overflow or underflow does not occur.

The motion vector coding unit 121 stores the motion vector obtained by the motion prediction/compensation unit 115. The motion vector coding unit 121 predicts a motion vector of a target prediction region. In other words, the motion vector coding unit 121 generates a prediction motion vector (predictor) used to code or decode a motion vector.

Here, as the kinds of prediction motion vectors, there are a temporal prediction motion vector (temporal predictor) and a spatial prediction motion vector (spatial predictor). The temporal prediction motion vector is a prediction motion vector which is generated by using a motion vector of a temporally adjacent region which is temporally adjacent to a target prediction region. The spatial prediction motion vector is a prediction motion vector which is generated by using a motion vector of a spatially adjacent region which is spatially adjacent to a target prediction region.

Specifically, the motion vector coding unit 121 generates a temporal prediction motion vector by using a motion vector of a temporally adjacent region which is temporally adjacent to a target prediction region. In addition, the motion vector coding unit 121 generates a spatial prediction motion vector by using a motion vector of a spatially adjacent region which is spatially adjacent to a target prediction region. At this time, the spatial prediction motion vector is generated by using an adjacent region which is designated by a control signal from the parallel process control unit 122. The motion vector coding unit 121 supplies an optimal prediction motion vector which is regarded to be optimum among generated prediction motion vectors, to the motion prediction/compensation unit 115.

The parallel process control unit 122 sets a spatially adjacent PU of a target PU. The parallel process control unit 122 sets a spatially adjacent PU of a target PU so that a prediction motion vector generation process of a target prediction region is performed in parallel, particularly, in a case where a coding region (CU) is formed by a plurality of prediction regions (PUs). In addition, setting a spatially adjacent PU of a target PU is the same meaning as setting a motion vector of the spatially adjacent PU of the target PU, used to generate a prediction motion vector.

Specifically, the parallel process control unit 122 supplies, to the motion vector coding unit 121, a control signal (an address or the like) for setting a spatially adjacent PU of a target PU on the basis of a position of a prediction region in a coding region by referring to information on a PU size from the motion prediction/compensation unit 115.

In addition, in the present embodiment, a description will be made that prediction of a motion vector indicates a process of generating a prediction motion vector, and coding of a motion vector indicates a process of generating a prediction motion vector and obtaining a difference motion vector by using the generated prediction motion vector. In other words, a coding process of a motion vector includes a prediction process of the motion vector. Similarly, a description will be made that decoding of a motion vector indicates a process of generating a prediction motion vector and reconstructing a motion vector by using the generated prediction motion vector. In other words, a decoding process of a motion vector includes a prediction process of the motion vector.

In addition, the above-described adjacent region which is adjacent to the target prediction region is also a neighboring region located around the target region, and, hereinafter, a description will be made assuming that both regions have the same meaning.

[¼ pixel accuracy motion prediction]

Figures 2, 3:
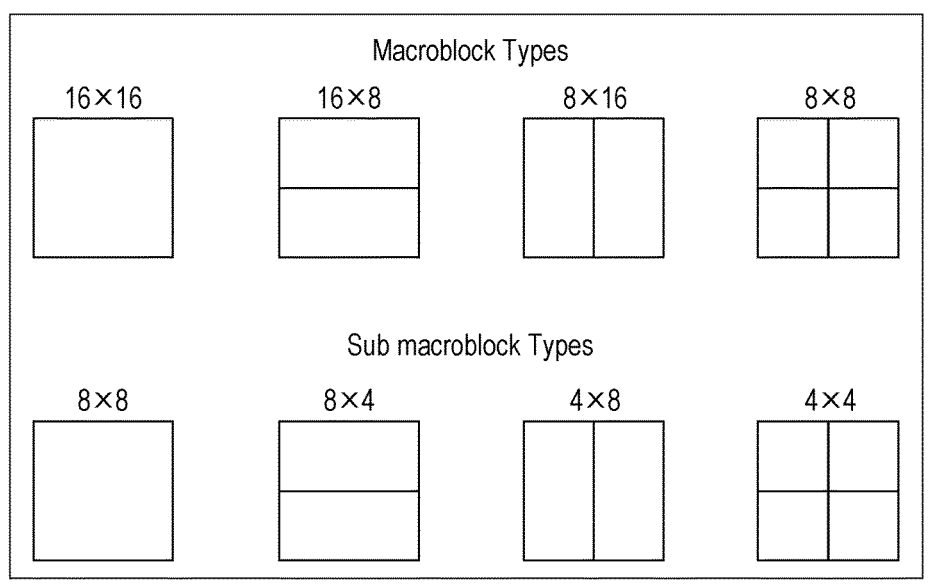
FIG. 2 is a diagram illustrating an example of a motion prediction/compensation process with decimal point pixel accuracy.
FIG. 3 is a diagram illustrating an example of a macroblock.

FIG. 2 is a diagram illustrating an example of a case of a motion prediction/compensation process with ¼ pixel accuracy defined in the AVC method. In FIG. 2, each square indicates a pixel. In the squares, A indicates a position of an integer accuracy pixel stored in the frame memory 112; b, c, and d indicate positions of ½ accuracy pixel; and e1, e2, and e3 indicate positions of ¼ accuracy pixel.

Hereinafter, a function Clip1 ( ) is defined as in the following Expression (1).

[Math 1]

$$\text{Clip1}(a) = \begin{cases} 0; \text{ if } (a < 0) \\ a; \text{ otherwise} \\ \text{max\_pix; if } (a > \text{max\_pix}) \end{cases} \quad (1)$$

For example, in a case where an input image has 8-bit accuracy, a value of max_pix of Expression (1) is 255.

Pixel values at positions of b and d are generated as in the following Expressions (2) and (3) by using a six-tap FIR filter.

[Math 2]

$$F = A_{-2} - 5 \cdot A_{-1} + 20 \cdot A_0 + 20 \cdot A_1 - 5 \cdot A_2 + A_3 \quad (2)$$

[Math 3]

$$b, d = \text{Clip1}((F+16) \gg 5) \quad (3)$$

A pixel value at a position of c is generated as in the following Expressions (4) to (6) by applying the six-tap FIR filter in a horizontal direction and a vertical direction.

[Math 4]

$$F = b_{-2} - 5 \cdot b_{-1} + 20 \cdot b_0 + 20 \cdot b_1 - 5 \cdot b_2 + b_3 \quad (4), \text{ or}$$

[Math 5]

$$F = d_{-2} - 5 \cdot d_{-1} + 20 \cdot d_0 + 20 \cdot d_1 - 5 \cdot d_2 + d_3 \quad (5)$$

[Math 6]

$$c = \text{Clip1}((F+512) \gg 10) \quad (6)$$

In addition, a clip process is performed once last after a product-sum process is performed in both of the horizontal direction and vertical direction.

e1 to e3 are generated through linear interpolation as in the following Expressions (7) to (9).

[Math 7]

$$e_1 = (A+b+1) \gg 1 \quad (7)$$

[Math 8]

$$e_2 = (b+d+1) \gg 1 \quad (8)$$

[Math 9]

$$e_3 = (b+c+1) \gg 1 \quad (9)$$

[Macroblock]

FIG. 3 is a diagram illustrating an example of a macroblock in the AVC method.

In MPEG2, in relation to a unit of a motion prediction/compensation process, the motion prediction/compensation process is performed in the unit of 16×16 pixels in a case of a frame motion compensation mode. In addition, the motion prediction/compensation process is performed in the unit of 16×8 pixels for each of a first field and a second field in a case of a field motion compensation mode.

In contrast, in the AVC method, as illustrated in FIG. 3, a single macroblock formed by 16×16 pixels can be split into partitions of any one of 16×16, 16×8, 8×16, and 8×8. In addition, respective sub-macroblocks are allowed to have motion vector information independently from each other. Further, as for an 8×8 partition, as illustrated in FIG. 3, the partition can be split into sub-macroblocks of any one of 8×8, 8×4, 4×8, and 4×4, which are allowed to have independent motion vector information.

However, if such a motion prediction/compensation process is performed in the AVC method in the same manner as in MPEG2, there is a concern that a large amount of motion vector information may be generated. In addition, if the generated motion vector information is coded as it is, there is a concern that coding efficiency may be lowered.

[Median Prediction of Motion Vector]

As a technique for solving the problems, reducing in coded information of a motion vector is realized by using the following technique in the AVC method.

Figure 4:
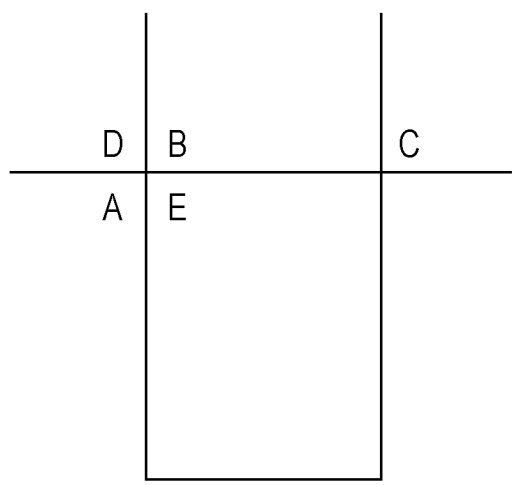
FIG. 4 is a diagram illustrating a median operation.

Each straight line illustrated in FIG. 4 indicates a boundary of a motion compensation block. In addition, in FIG. 4, E indicates a corresponding motion compensation block which is to be coded from now on, and A to D indicate motion compensation blocks which have already been coded and are adjacent to E.

Here, motion vector information of X is set to mvx at X=A, B, C, D, and E.

First, prediction motion vector information pmvE on the motion compensation block E is generated as in the following Expression (10) on the basis of a median operation by using motion vector information regarding the motion compensation blocks A, B and C.

[Math 10]

$$pmv_E = \text{med}(mv_A, mv_B, mv_C) \tag{10}$$

In a case where information regarding the motion compensation block C is unavailable for a reason such as an end of a sum range, the information is replaced with information regarding the motion compensation block D.

Data mvdE which is coded as motion vector information of the motion compensation block E is generated as in the following Expression (11) in the image compression information by using pmvE.

[Math 11]

$$MVd_E = mv_E - pmv_E \tag{11}$$

In addition, in a practical process, a process is performed independently on respective components of the motion vector information in the horizontal direction and the vertical direction.

[Multi-Reference Frame]

In the AVC method, a method called a multi-reference frame is prescribed which is not prescribed in an image coding method of the related art such as MPEG2 or H.263.

Figure 5:
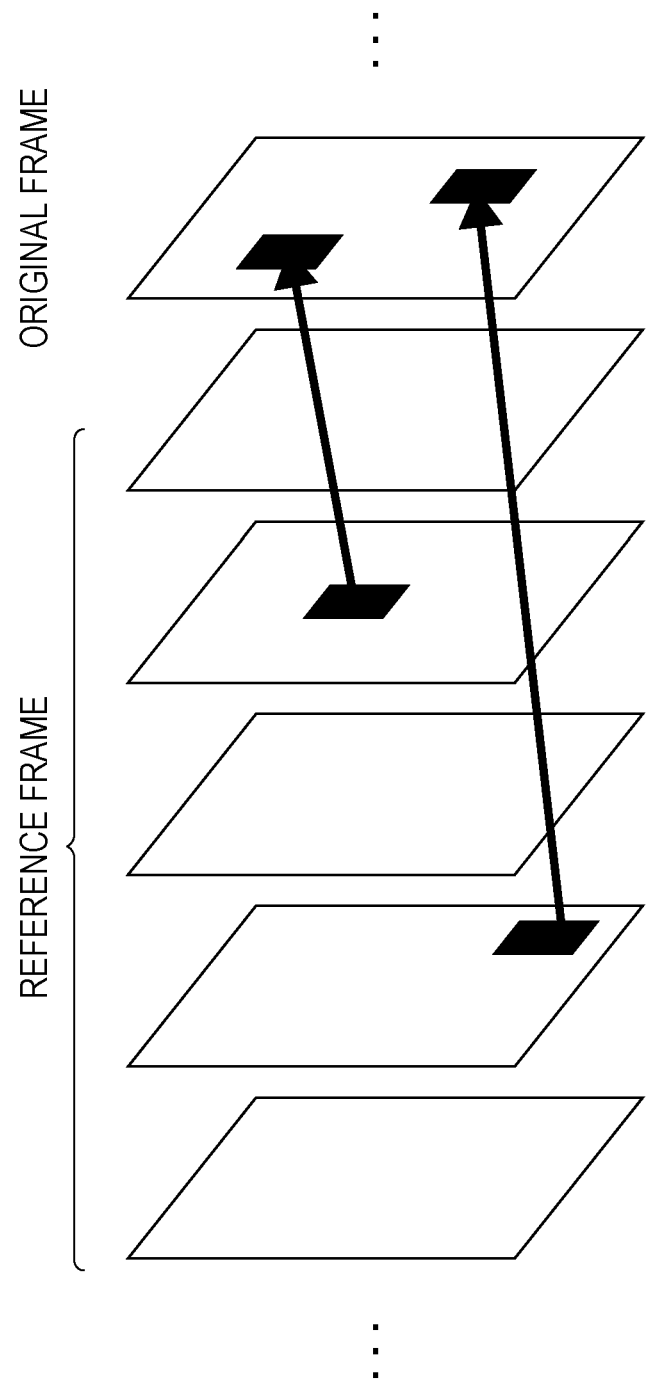
FIG. 5 is a diagram illustrating a multi-reference frame.

With reference to FIG. 5, a description will be made of the multi-reference frame which is prescribed in the AVC method.

In other words, in MPEG-2 or H.263, in a case where of a P picture, a motion prediction/compensation process is performed by referring to only a single reference frame stored in a frame memory. In contrast, in the AVC method, as illustrated in FIG. 5, a plurality of reference frames are stored in memories, and thus a different memory can be referred to for each macroblock.

[Direct Mode]

Next, a direct mode will be described. There is a large amount of motion vector information in a B picture, but a mode called a direct mode is prepared in the AVC method.

In the direct mode, motion vector information is not stored in image compression information. In an image decoding device, motion vector information of a corresponding block is calculated from motion vector information of a neighboring block, or motion vector information of a co-located block which is a block at the same position as a process target block in a reference frame.

The direct mode includes two types of spatial direct mode and temporal direct mode, which can be changed for each slice.

In the spatial direct mode, motion vector information mvE on the motion compensation block E which is a process target is calculated as indicated in the following Expression (12).

$$mvE = pmvE \tag{12}$$

In other words, motion vector information generated through median prediction is applied to the corresponding block.

Hereinafter, with reference to FIG. 6, the temporal direct mode will be described.

Figure 6:
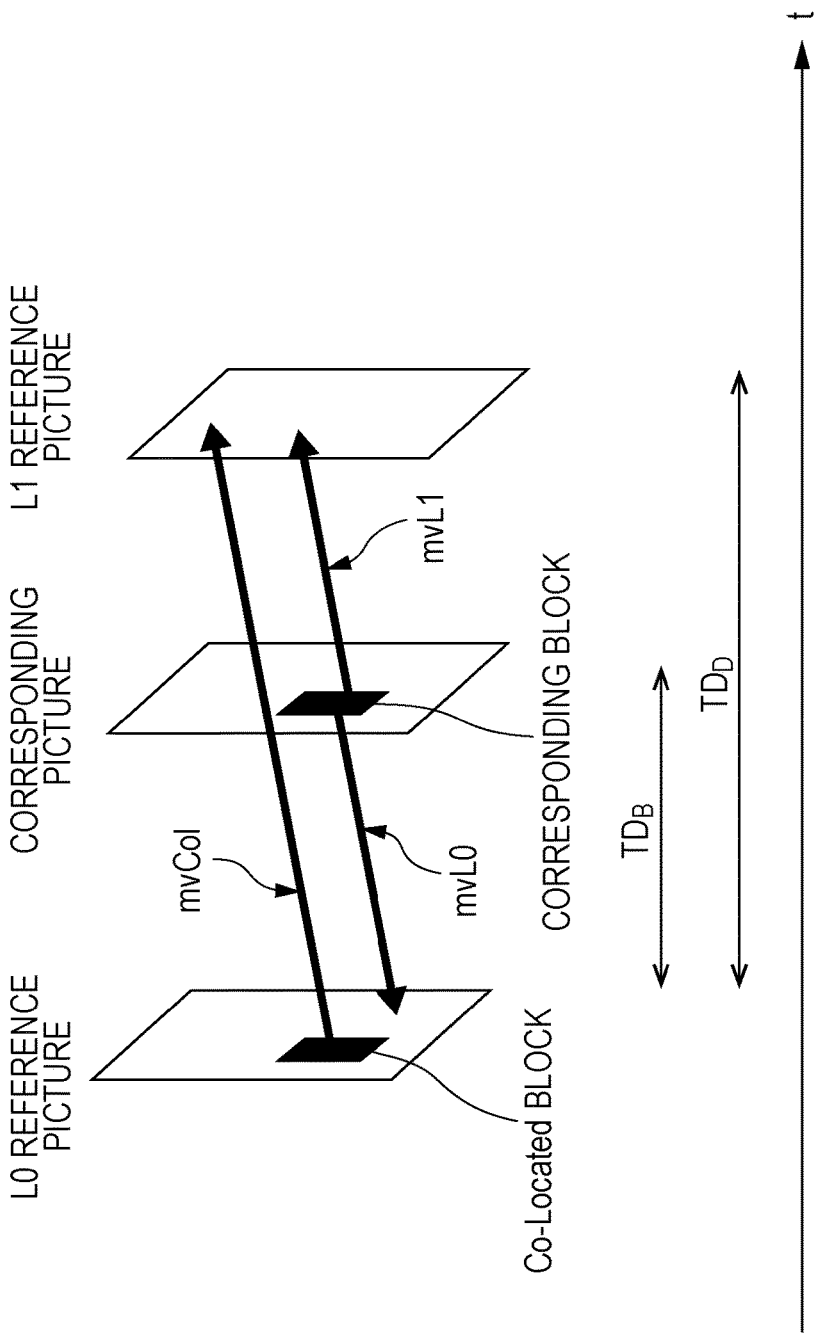
FIG. 6 is a diagram illustrating a temporary direct mode.

In FIG. 6, a block which is located at the same spatial address as a corresponding block is used as a co-located block in a L0 reference picture, and motion vector information in the co-located block is set to mvcol. In addition, a distance on a time axis between the corresponding picture and the L0 reference picture is set to TDB, and a distance on the time axis between the L0 reference picture and the L1 reference picture is set to TDD.

In this case, motion vector information mvL0 on L0 and motion vector information mvL1 on L1 are calculated as in the following Expressions (13) and (14).

[Math 12]

$$mv_{L0} = \frac{TD_B}{TD_D} mv_{col} \tag{13}$$

[Math 13]

$$mv_{L1} = \frac{TD_D - TD_B}{TD_D} mv_{col} \tag{14}$$

In addition, since there is no information TD indicating a distance on the time axis in AVC image compression information, the above Expressions (12) and (13) are assumed to be calculated by using picture order count (POC).

Further, in the AVC image compression information, the direct mode can be defined in the 16×16-pixel macroblock unit or the 8×8-pixel macroblock unit.

[Selection of Prediction Mode]

Next, a description will be made of selection of a prediction mode in the AVC method. In the AVC method, it is important to select a suitable prediction mode if higher coding efficiency is to be achieved.

As an example of a selection method, there is a method mounted in reference software (published on http://iphome.hhi.de/suehring/tml/index.htm) in the AVC method, called Joint Model (JM).

In JM, two mode determination methods including a high complexity mode and a low complexity mode described below may be selected. In both modes, a cost function value regarding each prediction mode is calculated, and a prediction mode which leads the cost function value to a minimal value is selected as a corresponding sub-macroblock or an optimal mode for a corresponding macroblock.

A cost function in the high complexity mode is expressed as in the following Equation (15).

$$\text{Cost(Mode} \in \Omega) = D + \lambda * R \tag{15}$$

Here, Ω indicates a universal set of candidate modes for coding a corresponding block or macroblock, and D indicates a difference energy between a decoded image and an input image when coding is performed in a corresponding mode. λ indicates a Lagrange undefined multiplier which is given as a function of a quantized parameter. R indicates a total bit rate including an orthogonal transform coefficient when coding is performed in the corresponding mode.

In other words, since the parameters D and R are calculated in order to perform coding in the high complexity mode, temporary encoding processes are required to be performed once in all candidate modes, and thus a larger amount of calculation is necessary.

A cost function in the low complexity mode is expressed as in the following Equation (16).

$$\text{Cost}(\text{Mode } \epsilon\Omega) = D + \text{QP2Quant}(QP) * \text{HeaderBit} \quad (16)$$

Here, D indicates a difference energy between a prediction image and an input image unlike in a case of the high complexity mode. QP2-Quant (QP) is given as a function of a quantized parameter QP, and HeaderBit indicates a bit rate regarding information included in a header, which does not include an orthogonal transform coefficient, such as a motion vector or a mode.

In other words, in the low complexity mode, a prediction process is required to be performed in relation to each candidate mode, but a decoded image is not necessary, and thus a coding process is not required to be performed. For this reason, the low complexity mode can be realized in a smaller amount of calculation than in the high complexity mode.

[MV Competition of Motion Vector]

Next, coding of a motion vector will be described. As described with reference to FIG. 4, the following method is proposed in NPL 1 in order to improve coding of a motion vector using median prediction.

In other words, either of "temporal predictor (temporal prediction motion vector)" and "spatio-temporal predictor (spatial and temporal prediction motion vector)" is allowed to be adaptively used as prediction motion vector information in addition to "spatial predictor (spatial prediction motion vector)" which is defined in the AVC method and is obtained through the median prediction. This proposed method is called MV competition in the AVC method. In contrast, in the HEVC method, this is called advance motion vector prediction (AMVP), and, in the following, this proposed method is referred to as AMVP which will be described.

Figure 7:
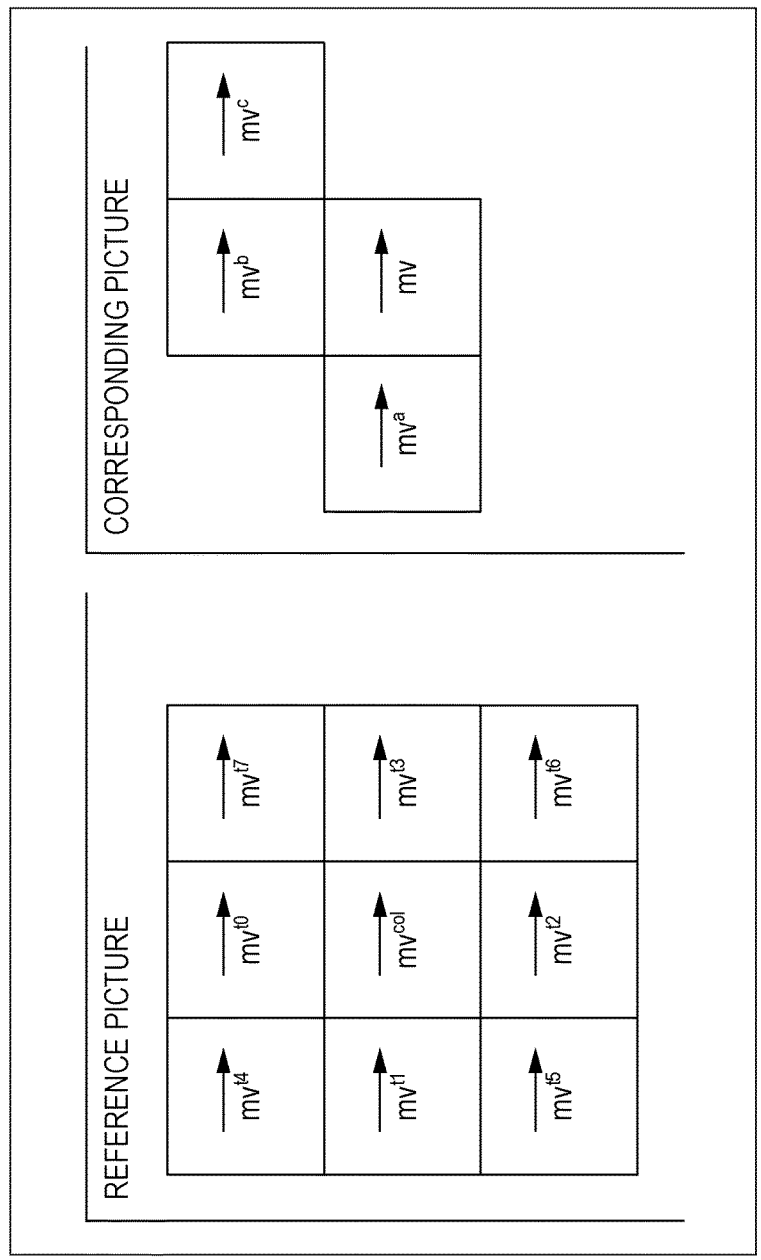
FIG. 7 is a diagram illustrating a motion vector coding method.

In FIG. 7, "mvcol" indicates motion vector information of a co-located block for a corresponding block. In addition, mvtk (where k is 0 to 8) indicates motion vector information of a neighboring block thereof, and each piece of prediction motion vector information (predictor) is defined by the following Expressions (17) to (19). In addition, the co-located block for the corresponding block is a block which has the same xy coordinates as the corresponding block in a reference picture which is referred to by a corresponding picture.

Temporal Predictor:
[Math 14]

$$mv_{tm5} = \text{median}\{mv_{col}, mv_{t0}, \ldots, mv_{t3}\} \quad (17)$$

[Math 15]

$$mv_{tm9} = \text{median}\{mv_{col}, mv_{t0}, \ldots, mv_{t8}\} \quad (18)$$

Spatio-Temporal Predictor:
[Math 16]

$$mv_{spt} = \text{median}\{mv_{col}, mv_{col}, mv_a, mv_b, mv_c\} \quad (19)$$

In the image coding device 100, a cost function value when each prediction motion vector information piece is used for each block is calculated, and optimal prediction motion vector information is selected. In image compression information, a flag indicating information (index) regarding which prediction motion vector information is used for each block is transmitted.

[Coding Unit]

Next, a coding unit prescribed in the HEVC method will be described. A macroblock size of 16 pixels×16 pixels is not optimum for a large picture frame such as Ultra High Definition (UHD; 4000 pixels×2000 pixels) which will become a target of a next-generation coding method.

Figure 8:
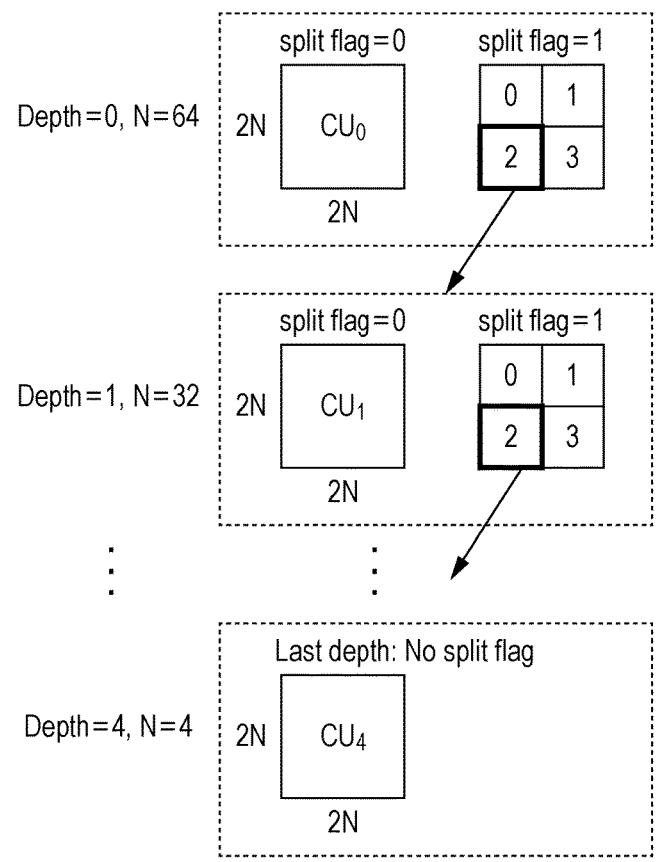
FIG. 8 is a configuration example of a coding unit.

Therefore, in the AVC method, as described in FIG. 3, a layer structure by a macroblock and a sub-macroblock is prescribed, but, for example, in the HEVC method, a coding unit (CU) is prescribed as illustrated in FIG. 8.

The CU, which is also called a coding tree block (CTB), is a partial region of an image in a picture unit and has the same function as that of the macroblock in the AVC. Whereas the latter is fixed to a size of 16×16 pixels, the former is not fixed to a size, and is designated in image compression information in each sequence.

For example, in a sequence parameter set (SPS) included in coded data which is an output, the largest coding unit (LCU) and the smallest coding unit (SCU) of the CU are prescribed.

Each LCU is set to split-flag=1 in a range in which the LCU is not smaller than the SCU, and thus can be split into the CUs with a smaller size. In the example of FIG. 8, a size of the LCU is 128, and the maximal layer depth is 5. The CU with a size of 2N×2N is split into the CUs with a size of N×N, which are a one-order-lower layer when a value of split_flag is "1".

Further, the CU is split into prediction units (PUs) which are regions (partial regions of an image in a picture unit) serving as a process unit for intra-prediction or inter-prediction. In addition, the PU is split into transform units (TU) which are regions (partial regions of an image in a picture unit) serving as a process unit for orthogonal transform. At present, in the HEVC method, 16×16 and 32×32 orthogonal transform can be used in addition to 4×4 and 8×8.

In an inter-PU, in a case where a single CU has a size of 2N×2N, the size can be split into sizes with any one of 2N×2N, 2N×N, N×2N, and N×N. In addition, in the above-described sequence parameter set, inter_4×4_enable_flag is defined, and when a value thereof is set to 0, an inter-CU with a 4×4 block size can be prevented from being used.

In a case of a coding method in which the CU is defined and various processes are performed with the CU as a process unit as in the above HEVC method, a macroblock in the AVC method may be considered to correspond to the LCU, and a block (sub-block) may be considered to correspond to a CU. In addition, a motion compensation block in the AVC method may be considered to be a PU. However, since the CU has a layer structure, a size of the LCU in the highest-order layer is set to be larger than that of the macroblock in the AVC method, for example, as in 128×128 pixels.

Therefore, hereinafter, the LCU is assumed to also include a macroblock in the AVC method, and the CU is assumed to also include a block (sub-block) in the AVC method.

[Merging of Motion Partition]

Figure 9:
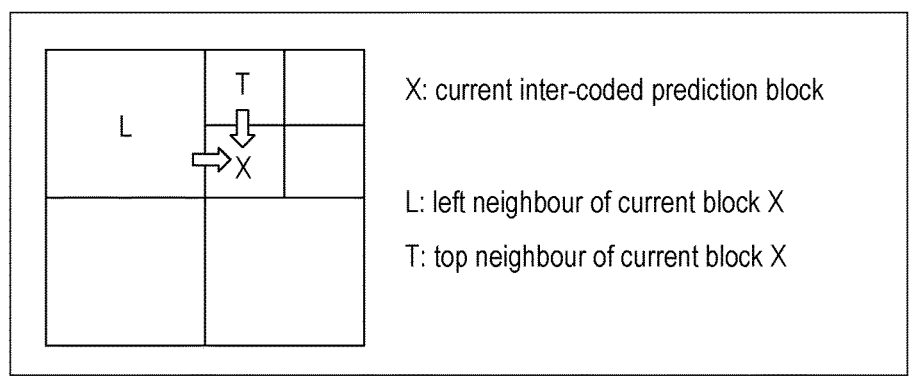
FIG. 9 is a diagram illustrating motion partition merging.

Next, a merge mode in the HEVC method will be described. As one of coding methods of the motion vector described with reference to FIG. 7, a method (merge mode) called motion partition merging as illustrated in FIG. 9 has been proposed. In this method, two flags including Merge_Flag and Merge_Left_Flag are transmitted as merge information which is information regarding the merge mode.

Merge_Flag=1 indicates that motion information of a corresponding region X is the same as a neighboring region T which is a top neighbor of the corresponding region or a neighboring region L which is a left neighbor of the corresponding region. At this time, merge information includes Merge_Left_Flag and is transmitted. Merge_Flag=0 indicates that motion information of the corresponding region X is different from both of the neighboring region T and the neighboring region L. In this case, the motion information of the corresponding region X is transmitted.

In a case where the motion information of the corresponding region X is the same as motion information of the neighboring region L, Merge_Flag is set to 1, and Merge_Left_Flag is set to 1. In a case where the motion information of the corresponding region X is the same as motion information of the neighboring region T, Merge_Flag is set to 1, and Merge_Left_Flag is set to 0.

In other words, also in the merge mode, a spatial prediction motion vector and a temporal prediction motion vector are obtained from neighboring blocks, and an optimal prediction motion vector is determined thereamong. In addition, in the merge mode, only flag information is transmitted in a case where the determined prediction motion vector is the same as motion information of the corresponding block.

[Spatial Prediction Motion Vector (Spatial Predictor)]

Next, in the AMVP described with reference to FIG. 7 or the merge mode described with reference to FIG. 9, a spatial prediction motion vector (spatial predictor) and a temporal prediction motion vector (temporal predictor) are generated as candidates of a prediction motion vector. Of the two vectors, a process of generating the spatial prediction motion vector will be described with reference to FIG. 10.

Figure 10:
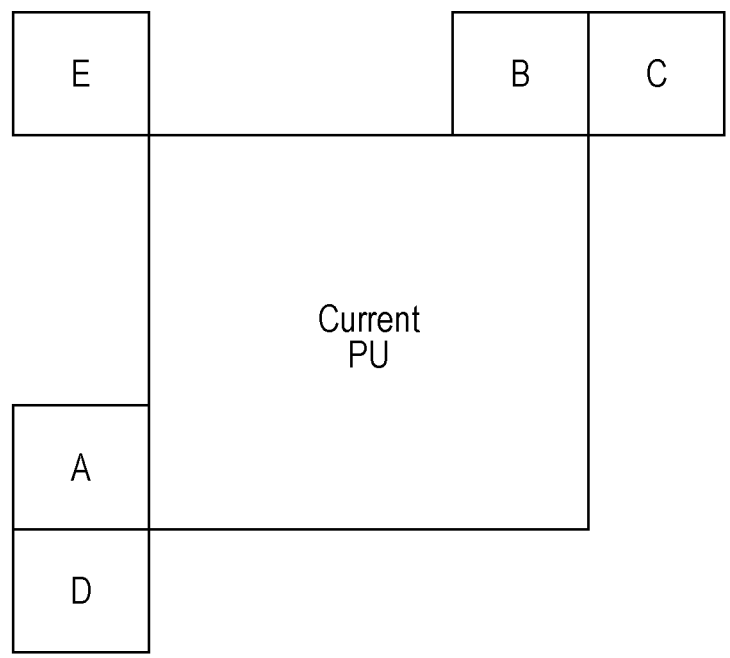
FIG. 10 is a method of generating a spatial prediction motion vector in an HEVC method.

In an example of FIG. 10, a current PU (corresponding PU) which is a process target region, and A to E which are PUs adjacent to the corresponding PU in a predetermined relationship, are illustrated.

A is a PU which is located at the lowermost position among PUs adjacent to the left side of the corresponding PU. B is a PU which is located at the leftmost position among PUs adjacent to the upper side of the corresponding PU. C is a PU which is adjacent to the upper right side of the corresponding PU and is adjacent to the left side of B. D is a PU which is adjacent to the lower left side of the corresponding PU and is adjacent to the lower side of A. E is a PU which is adjacent to the upper left side of the corresponding PU.

In the HEVC, the following scanning process is performed on the adjacent PUs of A to E as candidates of a spatial prediction motion vector of the corresponding PU in an order of C, D, A, B, and E, and a spatial prediction motion vector for the CPU is determined.

Procedures of the scanning will be described. To being with, first, scanning is performed for searching for whether or not there is a vector for which motion vector information of the CPU is the same as a list and reference frame information. Second, scanning is performed for searching for whether or not there is a vector for which the motion vector information of the corresponding PU is the same as the list but is the same as the reference frame information.

Third, scanning is performed for searching for whether or not there is a vector for which the motion vector information of the corresponding PU is the same as the list but is different from the reference frame information. Fourth, scanning is performed for searching for whether or not there is a vector for which the motion vector information of the corresponding PU is different from the list and the reference frame information.

The above-described first to fourth scannings are finished at the time when two vectors which are equivalent to the motion vector information of the corresponding PU are detected. In other words, if two vectors are detected in the first scanning, the second and subsequent scannings are not performed. An optimal vector of the two vectors detected in this way is determined as a spatial prediction motion vector for the corresponding PU.

Figure 11:
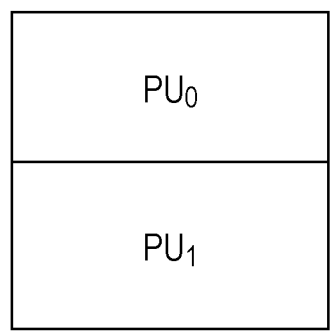
FIG. 11 is a method of generating a spatial prediction motion vector in the HEVC method.

However, there is a case where a CU which is a single coding region is formed by, for example, PUs which are two prediction regions, as illustrated in FIG. 11, that is, the CU is split into PUs of 2N×N. Hereinafter, the PU as illustrated in FIG. 11 is referred to as a 2N×N PU.

Even in this case, a spatial prediction motion vector is determined as described above. Therefore, unless motion vector information regarding $PU_0$ located on the upper side in the CU is fixed, coding/decoding (that is, generation of a prediction motion vector) of a motion vector regarding $PU_1$ located on the lower side in the CU cannot be performed. For this reason, motion vector information pieces regarding $PU_0$ and $PU_1$ cannot be performed in parallel. In addition, it can be said that this is also the same for a case where the CU is split into PUs of N×2N (that is, in a case of an N×2N PU).

[Generation Method of Spatial Prediction Motion Vector of Present Technology]

Therefore, in the motion vector coding unit 121, the generation method of a spatial prediction motion vector described with reference to FIG. 10 is applied to a 2N×2N PU.

Figure 12:
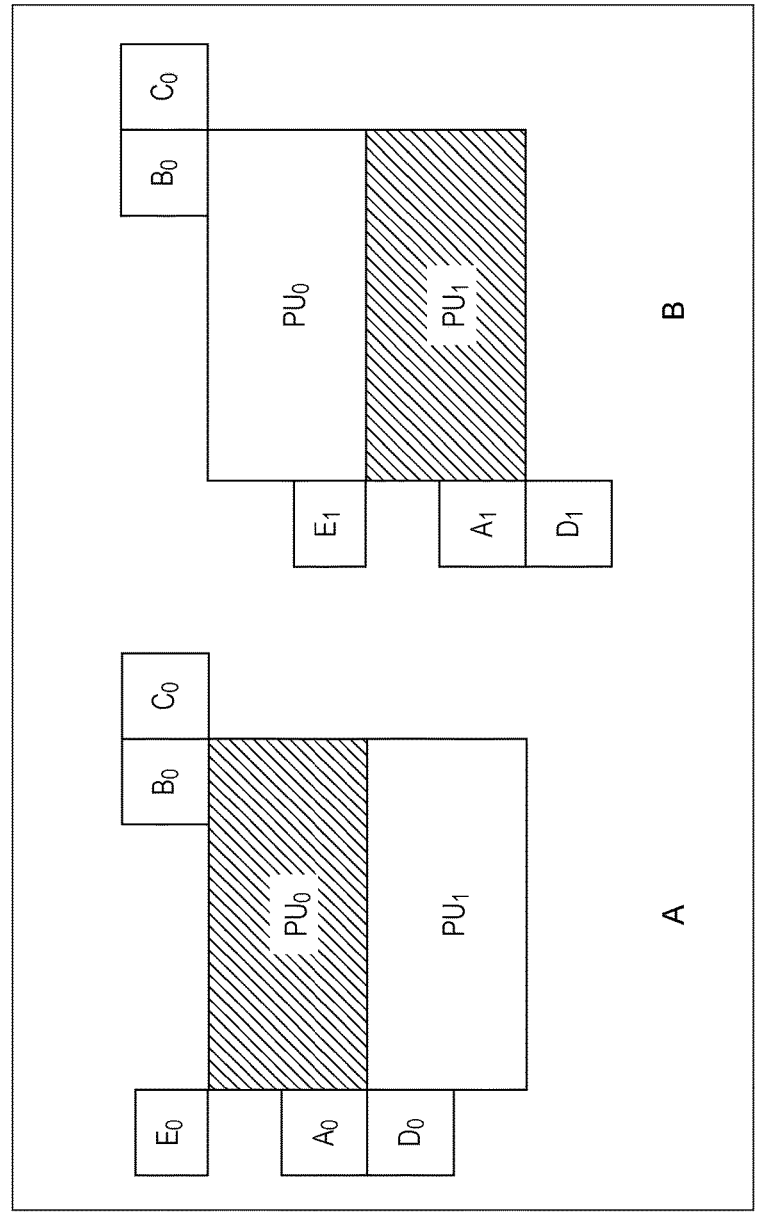
FIG. 12 is a diagram illustrating a method of generating a spatial prediction motion vector of the present technology in a 2N×N PU.
Figure 13:
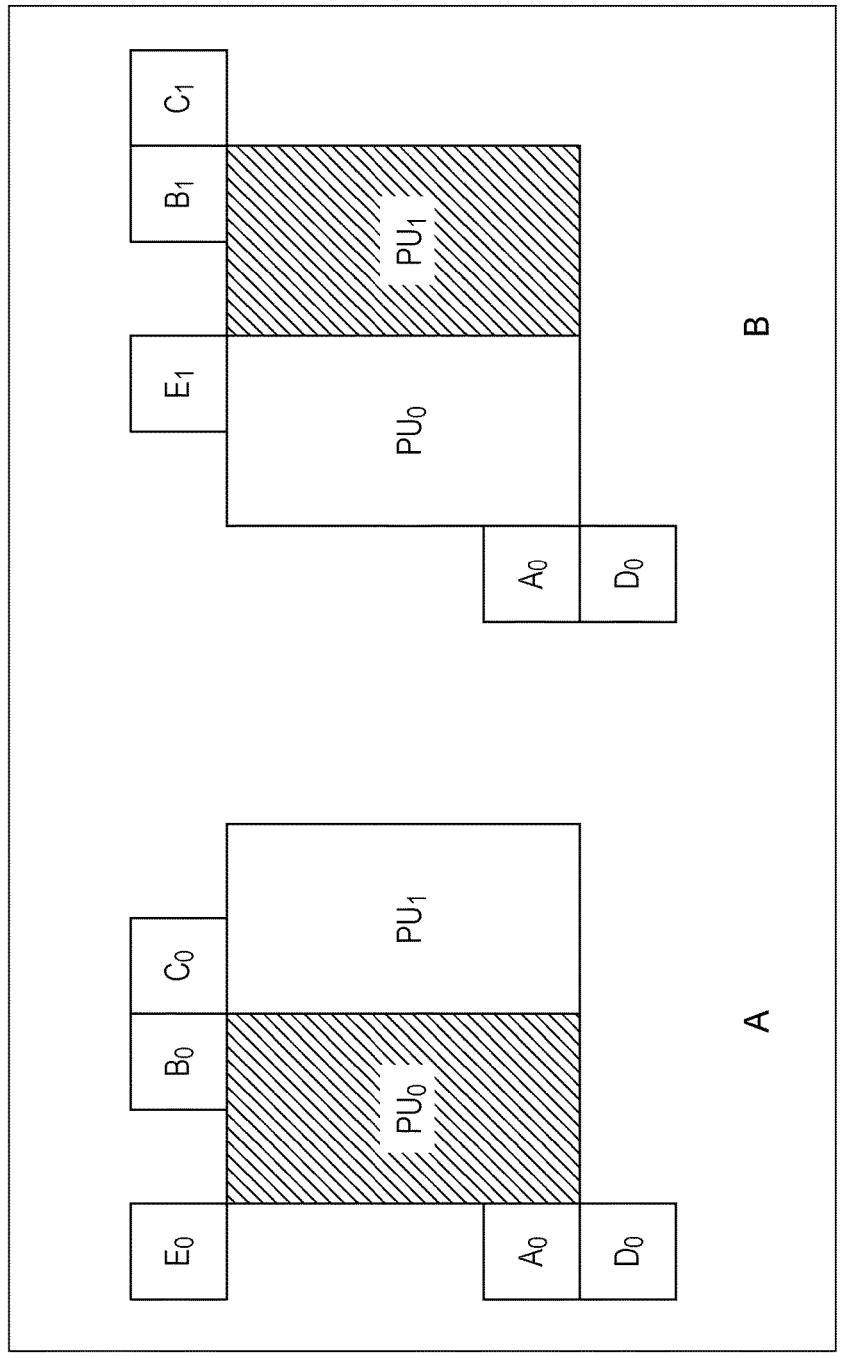
FIG. 13 is a diagram illustrating a method of generating a spatial prediction motion vector of the present technology in an N×2N PU.

In contrast, in relation to a 2N×N PU or an N×2N PU, as illustrated in FIGS. 12 and 13, different processes are performed on a first PU which is located on the upper or left side in the CU and a second PU which is located on the lower or right side in the CU.

A of FIG. 12 is a diagram illustrating adjacent regions which are referred to in generating a spatial prediction vector of $PU_0$ which is the first PU located on the upper side in the CU in a case where a PU has a size of 2N×N. The generation method of a spatial prediction motion vector described with reference to FIG. 10 is applied to $PU_0$. In other words, motion vector information pieces of $A_0$ to $E_0$ which are PUs adjacent to the corresponding PU in the following positional relationship are regarded as candidates, and a prediction motion vector on the corresponding $PU_0$ is determined.

$A_0$ is a PU which is located at the lowermost position among PUs adjacent to the left side of corresponding $PU_0$. $B_0$ is a PU which is located at the leftmost position among PUs adjacent to the upper side of corresponding $PU_0$. $C_0$ is a PU which is adjacent to the upper right side of the corresponding PU and is adjacent to the left side of $B_0$. $D_0$ is a PU which is adjacent to the lower left side of corresponding $PU_0$ and is adjacent to the lower side of $A_0$. $E_0$ is a PU which is adjacent to the upper left side of corresponding $PU_0$.

B of FIG. 12 is a diagram illustrating adjacent regions which are referred to in generating a spatial prediction vector of $PU_1$ which is the second PU located on the lower side in the CU in a case where a PU has a size of 2N×N. In a case of corresponding $PU_1$, there is a use of motion vector information pieces of $A_1$, $D_1$, and $E_1$ which are adjacent to corresponding $PU_1$ in the following positional relationship, and $B_0$ and $C_0$ which are adjacent to $PU_0$ located on corresponding $PU_1$ in the CU in the following positional relationship.

$A_1$ is a PU which is located at the lowermost position among PUs adjacent to the left side of corresponding $PU_1$.

$B_0$ is a PU which is located at the leftmost position among PUs adjacent to the upper side of $PU_0$ located on corresponding $PU_1$. $C_0$ is a PU which is adjacent to the upper right side of $PU_0$ located on corresponding $PU_1$ and is adjacent to the left side of $B_0$. $D_1$ is a PU which is adjacent to the lower left side of corresponding $PU_1$ and is adjacent to the lower side of $A_1$. $E_1$ is a PU which is adjacent to the upper left side of corresponding $PU_1$.

In other words, since a PU corresponding to $B_1$ is $PU_0$ in relation to corresponding $PU_1$, it is necessary to wait for a process on $PU_0$ to be completed when a process on corresponding $PU_1$ is performed, and thus this impedes a parallel process. Therefore, $B_0$ is set instead of $B_1$ as an adjacent region of corresponding $PU_1$. In addition, $C_0$ adjacent to $B_0$ may be further set instead of $C_1$ adjacent to $B_1$ as an adjacent region of corresponding $PU_1$.

A of FIG. 13 is a diagram illustrating adjacent regions which are referred to in generating a spatial prediction vector of $PU_0$ which is the first PU located on the left side in the CU in a case where a PU has a size of N×2N. The generation method of a spatial prediction motion vector described with reference to FIG. 10 is applied to $PU_0$. In other words, motion vector information pieces of $A_0$ to $E_0$ which are PUs adjacent to the corresponding PU in the following positional relationship are regarded as candidates, and a prediction motion vector on corresponding $PU_0$ is determined.

$A_0$ is a PU which is located at the lowermost position among PUs adjacent to the left side of corresponding $PU_0$. $B_0$ is a PU which is located at the leftmost position among PUs adjacent to the upper side of corresponding $PU_0$. $C_0$ is a PU which is adjacent to the upper right side of corresponding $PU_0$ and is adjacent to the left side of $B_0$. $D_0$ is a PU which is adjacent to the lower left side of corresponding $PU_0$ and is adjacent to the lower side of $A_0$. $E_0$ is a PU which is adjacent to the upper left side of corresponding $PU_0$.

B of FIG. 13 is a diagram illustrating adjacent regions which are referred to in generating a spatial prediction vector of $PU_1$ which is the second PU located on the right side in the CU in a case where a PU has a size of 2N×N. In a case of corresponding $PU_1$, there is a use of motion vector information pieces of $B_1$, $C_1$, and $E_1$ which are adjacent to corresponding $PU_1$ in the following positional relationship, and $A_0$ and $D_0$ which are adjacent to $PU_0$ located on corresponding $PU_1$ in the CU in the following positional relationship.

$A_0$ is a PU which is located at the lowermost position among PUs adjacent to the left side of $PU_0$ located on corresponding $PU_1$. $B_1$ is a PU which is located at the leftmost position among PUs adjacent to the upper side of corresponding $PU_1$. $C_1$ is a PU which is adjacent to the upper right side of corresponding $PU_1$ and is adjacent to the left side of $B_1$. $D_0$ is a PU which is adjacent to the lower left side of $PU_0$ located on corresponding $PU_1$ and is adjacent to the lower side of $A_0$. $E_1$ is a PU which is adjacent to the upper left side of corresponding $PU_1$.

In other words, since a PU corresponding to $A_1$ is $PU_0$ in relation to corresponding $PU_1$, it is necessary to wait for a process on $PU_0$ to be completed when a process on corresponding $PU_1$ is performed, and thus this impedes a parallel process. Therefore, $A_0$ is set instead of $A_1$ as an adjacent region of corresponding $PU_1$. In addition, $D_0$ adjacent to $A_0$ may be further set instead of $D_1$ adjacent to $A_1$ as an adjacent region of corresponding $PU_1$.

As mentioned above, an adjacent region is set on the basis of a size (2N×N, N×2N, 2N×2N) of a PU, and thus a parallel process using motion vectors in a plurality of PUs in a CU can be performed, thereby improving process efficiency.

In addition, in the HEVC, prediction can be performed by using an N×N PU only in a case where a CU size is 4×4. However, this is limited to a case where a value of inter_4×4_enable_flag in the sequence parameter set is 1.

Figure 14:
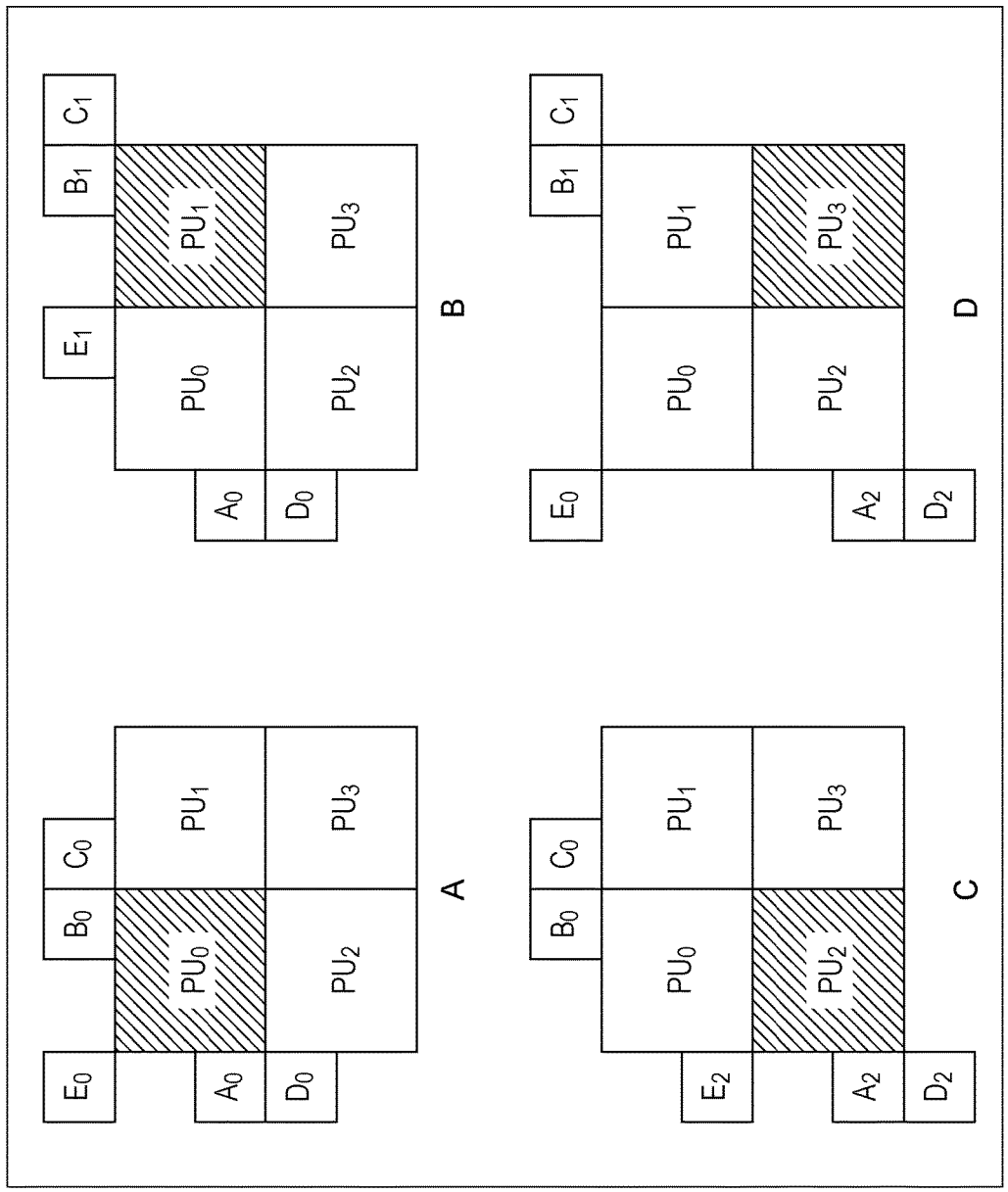
FIG. 14 is a diagram illustrating a method of generating a spatial prediction motion vector of the present technology in a 2N×2N PU.

Generation of a spatial prediction motion vector in this case is performed as illustrated in FIG. 14 on the basis of a position in a CU.

A of FIG. 14 is a diagram illustrating adjacent regions which are referred to in generating a spatial prediction vector of $PU_0$ which is the first PU located on the upper left side in the CU in a case where a PU has a size of N×N. The generation method of a spatial prediction motion vector described with reference to FIG. 10 is applied to $PU_0$. In other words, motion vector information pieces of $A_0$ to $E_0$ which are PUs adjacent to corresponding $PU_0$ in the following positional relationship are regarded as candidates, and a prediction motion vector on corresponding $PU_0$ is determined.

$A_0$ is a PU which is located at the lowermost position among PUs adjacent to the left side of corresponding $PU_0$. $B_0$ is a PU which is located at the leftmost position among PUs adjacent to the upper side of corresponding $PU_0$. $C_0$ is a PU which is adjacent to the upper right side of corresponding PU and is adjacent to the left side of $B_0$. $D_0$ is a PU which is adjacent to the lower left side of corresponding $PU_0$ and is adjacent to the lower side of $A_0$. $E_0$ is a PU which is adjacent to the upper left side of corresponding $PU_0$.

B of FIG. 14 is a diagram illustrating adjacent regions which are referred to in generating a spatial prediction vector of $PU_1$ which is the second PU located on the upper right side in the CU in a case where a PU has a size of N×N. In a case of corresponding $PU_1$, there is a use of motion vector information pieces of $B_1$, $C_1$, and $E_1$ which are PUs adjacent to corresponding $PU_1$ in the following positional relationship, and $A_0$ and $D_0$ which are adjacent to $PU_0$ located on corresponding $PU_1$ in the CU in the following positional relationship.

$A_0$ is a PU which is located at the lowermost position among PUs adjacent to the left side of $PU_0$ located on corresponding $PU_1$. $B_1$ is a PU which is located at the leftmost position among PUs adjacent to the upper side of corresponding $PU_1$. $C_1$ is a PU which is adjacent to the upper right side of corresponding $PU_1$ and is adjacent to the left side of $B_1$. $D_0$ is a PU which is adjacent to the lower left side of $PU_0$ located on corresponding $PU_1$ and is adjacent to the lower side of $A_0$. $E_1$ is a PU which is adjacent to the upper left side of corresponding $PU_1$.

In other words, the example of B of FIG. 14 is the same as the example of B of FIG. 13. Since a PU corresponding to $A_1$ is $PU_0$ in relation to corresponding $PU_1$, it is necessary to wait for a process on $PU_0$ to be completed when a process on corresponding $PU_1$ is performed, and thus this impedes a parallel process. Therefore, $A_0$ is set instead of $A_1$ as an adjacent region of corresponding $PU_1$. In addition, $D_0$ adjacent to $A_0$ may be further set instead of $D_1$ adjacent to $A_1$ as an adjacent region of corresponding $PU_1$.

C of FIG. 14 is a diagram illustrating adjacent regions which are referred to in generating a spatial prediction vector of $PU_2$ which is the second PU located on the lower left side in the CU in a case where a PU has a size of N×N. In a case of corresponding $PU_2$, there is a use of motion vector information pieces of $A_2$, $D_2$, and $E_2$ which are adjacent to corresponding $PU_2$ in the following positional relationship, and $B_0$ and $C_0$ which are adjacent to $PU_0$ located on corresponding $PU_2$ in the CU in the following positional relationship.

$A_2$ is a PU which is located at the lowermost position among PUs adjacent to the left side of corresponding $PU_2$. $B_0$ is a PU which is located at the leftmost position among PUs adjacent to the upper side of $PU_0$ located on corresponding $PU_2$. $C_0$ is a PU which is adjacent to the upper right side of $PU_0$ located on corresponding $PU_2$ and is adjacent to the left side of $B_0$. $D_2$ is a PU which is adjacent to the lower left side of corresponding $PU_2$ and is adjacent to the lower side of $A_2$. $E_2$ is a PU which is adjacent to the upper left side of corresponding $PU_2$.

In other words, the example of C of FIG. 14 is the same as the example of B of FIG. 12. Since a PU corresponding to $B_2$ is $PU_0$ in relation to corresponding $PU_2$, it is necessary to wait for a process on $PU_0$ to be completed when a process on corresponding $PU_2$ is performed, and thus this impedes a parallel process. Therefore, $B_0$ is set instead of $B_2$ as an adjacent region of corresponding $PU_2$. In addition, $C_0$ adjacent to $B_0$ may be further set instead of $C_2$ adjacent to $B_2$ as an adjacent region of corresponding $PU_2$.

D of FIG. 14 is a diagram illustrating adjacent regions which are referred to in generating a spatial prediction vector of $PU_3$ which is the second PU located on the lower right side in the CU in a case where a PU has a size of N×N. In a case of corresponding $PU_3$, there is a use of motion vector information pieces of $A_2$ and $D_2$ which are adjacent to $PU_2$ located on the left side of corresponding $PU_3$ in the CU in the following positional relationship. In addition, there is a use of motion vector information pieces of $B_1$ and $C_1$ which are adjacent to $PU_1$ located on corresponding $PU_3$ in the CU in the following positional relationship. Further, there is a use of motion vector information of $E_0$ which is adjacent to $PU_0$ located on the upper left side of corresponding $PU_3$ in the CU in the following positional relationship.

$A_2$ is a PU which is located at the lowermost position among PUs adjacent to the left side of $PU_2$ located on the left side of corresponding $PU_3$. $B_1$ is a PU which is located at the leftmost position among PUs adjacent to the upper side of $PU_1$ located on corresponding $PU_3$. $C_1$ is a PU which is adjacent to the upper right side of $PU_1$ located on corresponding $PU_3$ and is adjacent to the left side of $B_1$. $D_2$ is a PU which is adjacent to the lower left side of $PU_2$ located on the left side of corresponding $PU_3$ and is adjacent to the lower side of $A_2$. $E_2$ is a PU which is adjacent to the upper left side of $PU_0$ located on the upper left side of corresponding $PU_3$.

In other words, the example of D of FIG. 14 includes the example of B of FIG. 12 and the example of B of FIG. 13. In relation to corresponding $PU_3$, a PU corresponding to $B_3$ is $PU_1$, a PU corresponding to $A_3$ is $PU_2$, and a PU corresponding to $E_3$ is $PU_0$. For this reason, it is necessary to wait for processes on $PU_0$, $PU_1$, and $PU_2$ to be completed when a process on corresponding $PU_3$ is performed, and thus this impedes a parallel process.

Therefore, as adjacent regions of corresponding $PU_2$, $B_1$ is set instead of $B_3$, $A_2$ is set instead of $A_3$, and $E_0$ is set instead of $E_3$. In addition, as adjacent regions of corresponding $PU_3$, $C_1$ adjacent to $B_1$ may be further set instead of $C_3$ adjacent to $B_3$, and $D_2$ adjacent to $A_2$ may be further set instead of $D_3$ adjacent to $A_3$.

As mentioned above, the present technology can also be applied to a case where a PU has a size of N×N.

Figure 15:
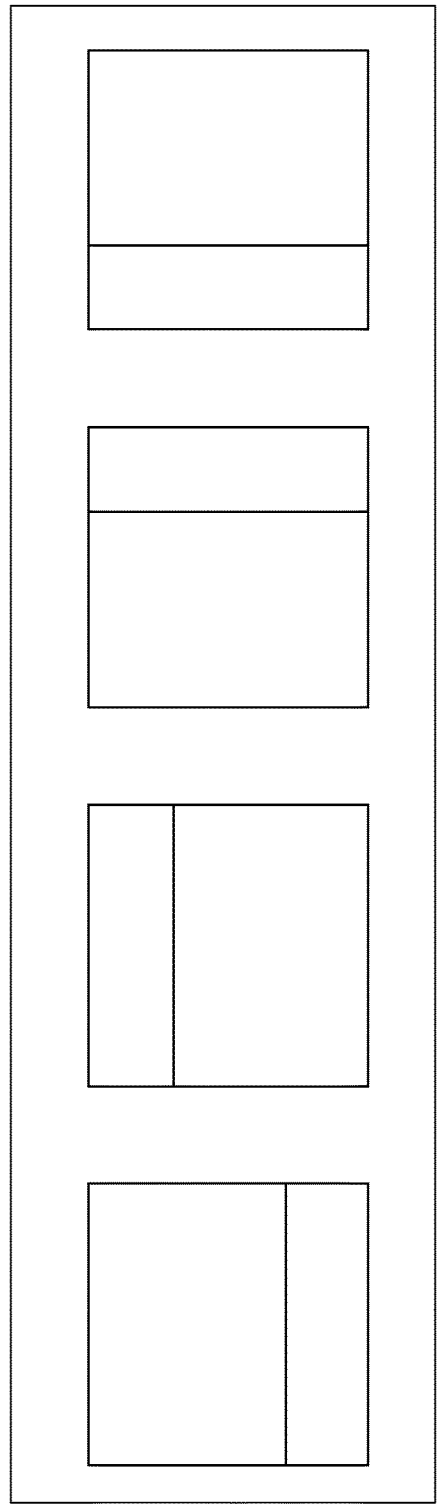
FIG. 15 is a diagram illustrating asymmetric motion partition in the HEVC method.

Further, in the HEVC, as illustrated in FIG. 15, an asymmetric motion partition (AMP) is defined in which sizes of a plurality of PUs forming a CU are different from each other. The present technology can also be applied to a case of the AMP.

[Configuration Example of Motion Vector Coding Unit]

Figure 16:
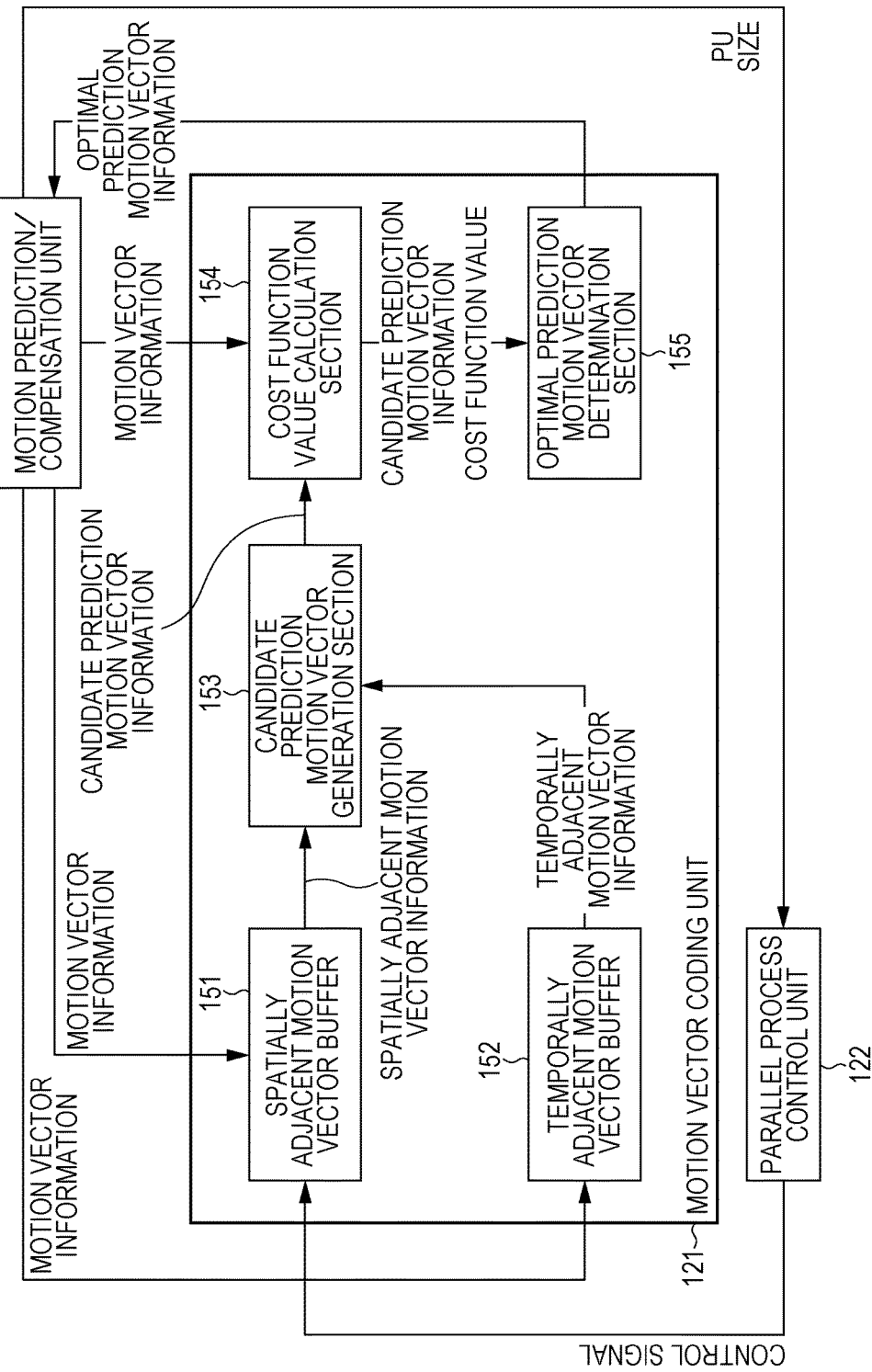
FIG. 16 is a block diagram illustrating a main configuration example of a motion vector coding unit.

FIG. 16 is a block diagram illustrating a main configuration example of the motion vector coding unit 121.

The motion vector coding unit 121 in the example of FIG. 16 includes a spatially adjacent motion vector buffer 151, a temporally adjacent motion vector buffer 152, a candidate prediction motion vector generation section 153, a cost function value calculation section 154, and an optimal prediction motion vector determination section 155.

Information on a motion vector in a determined optimal prediction mode is supplied to the spatially adjacent motion vector buffer 151 and the temporally adjacent motion vector buffer 152 from the motion prediction/compensation unit 115. In addition, information on a motion vector in each prediction mode which has been searched for by the motion prediction/compensation unit 115 is supplied to the cost function value calculation section 154.

Here, the parallel process control unit 122 refers to information on a PU size from the motion prediction/compensation unit 115, and supplies a control signal (an address or the like) for setting a spatially adjacent PU of a target PU to the spatially adjacent motion vector buffer 151 on the basis of a position of a prediction region in a coding region. Accordingly, the respective parts constituting the motion vector coding unit 121 perform a process of generating a prediction motion vector of a target prediction region in parallel in a case where the coding region (CU) is formed by a plurality of prediction regions (PUs).

The spatially adjacent motion vector buffer 151 is formed by a line buffer. The spatially adjacent motion vector buffer 151 accumulates the motion vector information from the motion prediction/compensation unit 115 as information on a motion vector of a spatially adjacent region which is spatially adjacent. The spatially adjacent motion vector buffer 151 reads information indicating a motion vector which has been obtained for a spatially adjacent PU which is spatially adjacent to a corresponding PU. At this time, the spatially adjacent motion vector buffer 151 reads information indicating a motion vector of a PU indicated by the control signal (address) from the parallel process control unit 122. The spatially adjacent motion vector buffer 151 supplies the read information (spatially adjacent motion vector information) to the candidate prediction motion vector generation section 153.

The temporally adjacent motion vector buffer 152 is formed by a memory. The temporally adjacent motion vector buffer 152 accumulates the motion vector information from the motion prediction/compensation unit 115 as information on a motion vector of a temporally adjacent region which is temporally adjacent. In addition, the temporally adjacent region is a region (that is, a co-located PU) which is located at the same spatial address as a corresponding region (corresponding PU) in different pictures on the time axis.

The temporally adjacent motion vector buffer 152 reads information indicating a motion vector which has been obtained for a temporally adjacent PU which is temporally adjacent to the corresponding PU, and supplies the read information (temporally adjacent motion vector information) to the candidate prediction motion vector generation section 153.

The candidate prediction motion vector generation section 153 generates a spatial prediction motion vector serving as a candidate of the corresponding PU by referring to the spatially adjacent motion vector information from the spatially adjacent motion vector buffer 151 on the basis of the method using the AMVP or the merge mode described with reference to FIG. 7 or 9. The candidate prediction motion vector generation section 153 supplies information indicating the generated spatial prediction motion vector to the cost function value calculation section 154 as candidate prediction motion vector information.

The candidate prediction motion vector generation section 153 generates a temporal prediction motion vector serving as a candidate of the corresponding PU by referring to the temporally adjacent motion vector information from the temporally adjacent motion vector buffer 152 on the basis of the method using the AMVP or the merge mode. The candidate prediction motion vector generation section 153 supplies information on the generated temporal prediction motion vector to the cost function value calculation section 154 as candidate prediction motion vector information.

The cost function value calculation section 154 calculates a cost function value regarding each candidate prediction motion vector, and supplies the calculated cost function value to the optimal prediction motion vector determination section 155 along with the candidate prediction motion vector information.

The optimal prediction motion vector determination section 155 determines a candidate prediction motion vector which leads the cost function value from the cost function value calculation section 154 to a minimal value, as an optimal prediction motion vector for the corresponding PU, and supplies information thereon to the motion prediction/compensation unit 115.

In addition, the motion prediction/compensation unit 115 generates a difference motion vector which is a difference from a motion vector by using the information on the optimal prediction motion vector from the optimal prediction motion vector determination section 155, and calculates a cost function value for each prediction mode. The motion prediction/compensation unit 115 determines a prediction method which leads the cost function value to a minimal value thereamong as an inter-optimal prediction mode.

The motion prediction/compensation unit 115 supplies a prediction image in the inter-optimal prediction mode to the prediction image selection unit 116. The motion prediction/compensation unit 115 supplies a motion vector in the inter-optimal prediction mode to the spatially adjacent motion vector buffer 151 and the temporally adjacent motion vector buffer 152. In addition, the motion prediction/compensation unit 115 supplies the generated difference motion vector information to the reversible coding unit 106 so as to allow the information to be coded.

[Flow of Coding Process]

Next, a description will be made of a flow of each process performed by the above-described image coding device 100. First, with reference to a flowchart of FIG. 17, an example of a flow of a coding process will be described.

In step S101, the A/D conversion unit 101 A/D converts an input image. In step S102, the screen rearrangement buffer 102 stores the A/D converted image, and rearranges a display order of pictures to a coding order. In step S103, the intra-prediction unit 114 performs an intra-prediction process in an intra-prediction mode.

In step S104, the motion prediction/compensation unit 115, the motion vector coding unit 121, and the parallel process control unit 122 performs an inter-motion prediction process in which motion prediction or motion compensation is performed in an inter-prediction mode. The inter-motion prediction process will be described later in detail with reference to FIG. 18.

A motion vector of the corresponding PU is searched for due to the process in step S104, and each prediction motion vector of the corresponding PU is generated. In relation to a spatial prediction motion vector among the prediction motion vectors, in a case where a CU is formed by a plurality of PUs, motion vector information of a spatially adjacent PU set on the basis of a position of the PU in the CU is regarded as a candidate, and the spatial prediction motion vector is generated. In addition, a prediction motion vector which is the optimum to the corresponding PU is determined from the generated temporal prediction motion vector and spatial prediction motion vector, so as to allow an optimal inter-prediction mode to be determined, and a prediction image is generated in the optimal inter-prediction mode.

The prediction image in the determined optimal inter-prediction mode and the cost function value are supplied to the motion prediction/compensation unit 115 and the prediction image selection unit 116. In addition, information on the determined optimal inter-prediction mode, information regarding the prediction motion vector which is regarded to be the optimum, and information indicating a difference between the prediction motion vector and the motion vector are also supplied to the reversible coding unit 106 in step S114 described later, so as to be reversely coded.

In step S105, the prediction image selection unit 116 determines an optimal mode on the basis of respective cost function values which are output from the intra-prediction unit 114 and the motion prediction/compensation unit 115. In other words, the prediction image selection unit 116 selects either of a prediction image generated by the intra-prediction unit 114 and a prediction image generated by the motion prediction/compensation unit 115.

In step S106, the calculation unit 103 calculates a difference between the image rearranged due to the process in step S102 and the prediction image selected due to the process in step S105. A data amount of the difference data is smaller than that of original image data. Therefore, a data amount can be compressed as compared with when an image is coded as it is.

In step S107, the orthogonal transform unit 104 performs orthogonal transform on the difference information generated due to the process in step S106. Specifically, orthogonal transform such as discrete cosine transform or Karhunen-Loeve transform is performed, and thus a transform coefficient is output.

In step S108, the quantization unit 105 quantizes the orthogonal transform coefficient obtained due to the process in step S107 by using the quantized parameter from the rate control unit 117.

The difference information quantized due to the process in step S108 is locally decoded as follows. In other words, in step S109, the inverse quantization unit 108 inversely quantizes the quantized orthogonal transform coefficient (also referred to as a quantized coefficient) generated due to the process in step S108 in a characteristic corresponding to a characteristic of the quantization unit 105. In step S110, the inverse orthogonal transform unit 109 performs inverse orthogonal transform on the orthogonal transform coefficient obtained due to the process in step S109 in a characteristic corresponding to a characteristic of the orthogonal transform unit 104.

In step S111, the calculation unit 110 adds the prediction image to the locally decoded difference information so as to generate a locally decoded image (an image corresponding to an input to the calculation unit 103). In step S112, the deblock filter 111 performs an appropriate deblock filter process on the locally decoded image obtained due to the process in step S111.

In step S113, the frame memory 112 stores the decoded image having undergone the deblock filter process due to the process in step S112. In addition, the frame memory 112 also stores an image which has not undergone the filter process in the deblock filter 111, supplied from the calculation unit 110.

In step S114, the reversible coding unit 106 codes the transform coefficient quantized due to the process in step S108. In other words, reversible coding such as variable length coding or arithmetic coding is performed on the difference image.

In addition, at this time, the reversible coding unit 106 codes information regarding a prediction mode of the prediction image selected due to the process in step S105, and adds the coded result to a coded data which is obtained by coding the difference image. In other words, the reversible coding unit 106 also codes optimal intra-prediction mode information supplied from the intra-prediction unit 114, information corresponding to an optimal inter-prediction mode supplied from the motion prediction/compensation unit 115, or the like, and adds the coded result to the coded data.

Further, in a case where the prediction image in the inter-prediction mode is selected due to the process in step S106, information on the difference motion vector or a flag indicating an index of the prediction motion vector calculated in step S105 is also coded.

In step S115, the accumulation buffer 107 accumulates the coded data obtained due to the process in step S114. The coded data accumulated in the accumulation buffer 107 is read and is transmitted to a decoding side via a transmission path or a recording medium as appropriate.

In step S116, the rate control unit 117 controls a rate of a quantization operation of the quantization unit 105 on the basis of a bit rate (generated bit rate) of the coded data accumulated in the accumulation buffer 107 due to the process in step S115 so that overflow or underflow does not occur.

If the process in step S116 is completed, the coding process finishes.

[Flow of Inter-Motion Prediction Process]

Next, a description will be made of an example of a flow of the inter-motion prediction process performed in step S104 of FIG. 17 with reference to a flowchart of FIG. 18.

In step S151, the motion prediction/compensation unit 115 performs a motion search in each inter-prediction mode. Motion vector information which has been searched for by the motion prediction/compensation unit 115 is supplied to the cost function value calculation section 154.

In step S152, the candidate prediction motion vector generation section 153 generates a prediction motion vector serving as a candidate of the corresponding PU on the basis of the method using the AMVP or the merge mode described with reference to FIG. 7 or 9. A detailed description of the prediction motion vector generation process will be described later with reference to FIG. 19.

Due to the process in step S152, a spatial prediction motion vector serving as a candidate of the corresponding PU is generated by referring to the spatially adjacent motion vector information from the spatially adjacent motion vector buffer 151. At this time, in a case where a CU is formed by a plurality of PUs, motion vector information of a spatially adjacent PU set on the basis of a position of the PU in the CU is regarded as a candidate, and the spatial prediction motion vector is generated. In addition, a temporal prediction motion vector serving as a candidate of the corresponding PU is generated by referring to the temporally adjacent motion vector information from the temporally adjacent motion vector buffer 152.

An optimal vector of the generated spatial prediction motion vector and the adjusted temporal prediction motion vector is determined as an optimal prediction motion vector which is supplied to the motion prediction/compensation unit 115.

The motion prediction/compensation unit 115 calculates a cost function value regarding each inter-prediction mode in step S153.

In other words, the motion prediction/compensation unit 115 generates a difference motion vector which is a difference between the optimal prediction motion vector from the optimal prediction motion vector determination section 155 and the motion vector. In addition, the motion prediction/compensation unit 115 calculates a cost function value regarding each inter-prediction mode on the basis of the above Expression (15) or (16) by using the generated difference motion vector information, the input image from the screen rearrangement buffer 102, or the like. Further, in a case of the merge mode, the difference motion vector is not generated.

In step S154, the motion prediction/compensation unit 115 determines a prediction mode which leads the cost function value to a minimal value among the respective prediction modes, as an optimal inter-prediction mode. In step S155, the motion prediction/compensation unit 115 generates a prediction image in the optimal inter-prediction mode, and supplies the prediction image to the prediction image selection unit 116.

In step S156, the motion prediction/compensation unit 115 supplies information regarding the optimal inter-prediction mode to the reversible coding unit 106 so that the information regarding the optimal inter-prediction mode is coded.

Further, the information regarding the optimal inter-prediction mode is, for example, information on the optimal inter-prediction mode, difference motion vector information of the optimal inter-prediction mode, reference picture information of the optimal inter-prediction mode, information regarding a prediction motion vector, and the like. The information regarding a prediction motion vector includes, for example, a flag indicating an index of the prediction motion vector.

Figure 17:
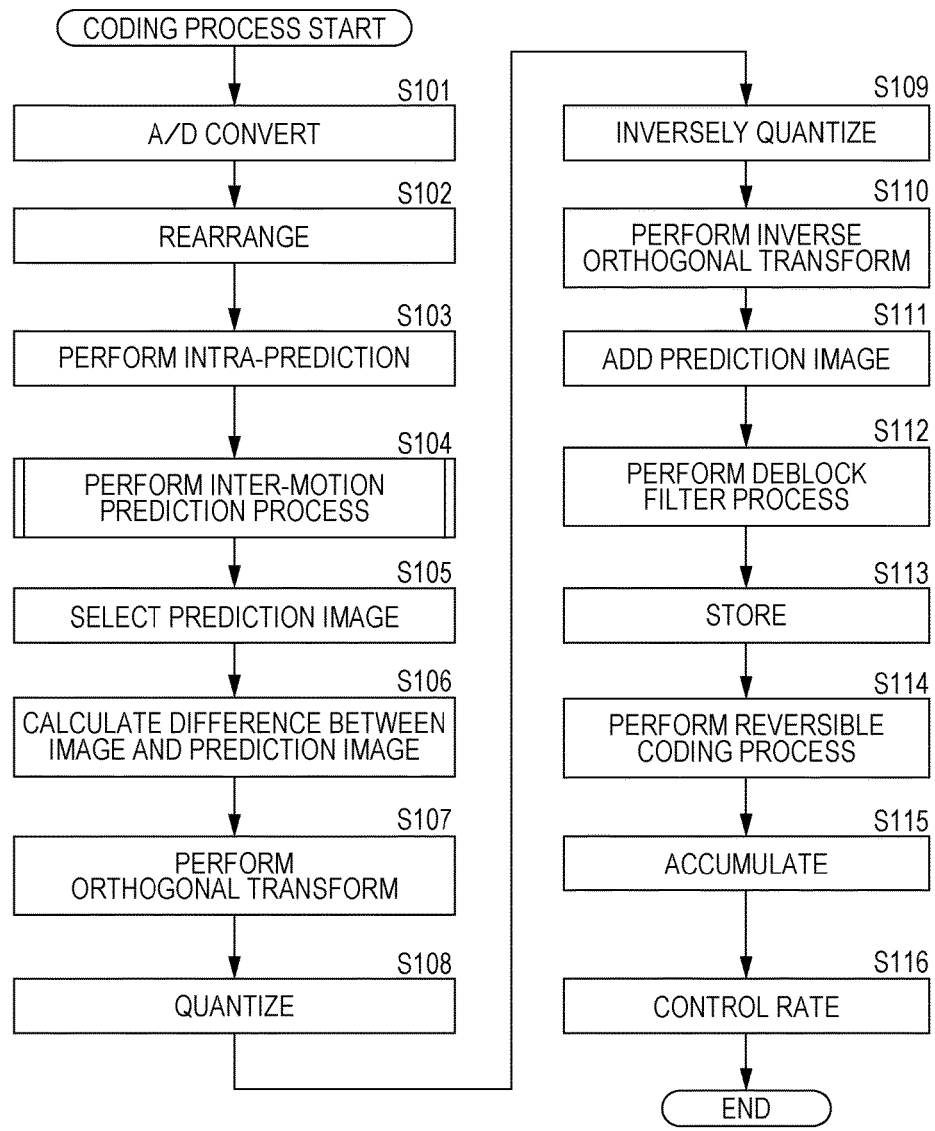
FIG. 17 is a flowchart illustrating an example of a flow of a coding process.
Figure 18:
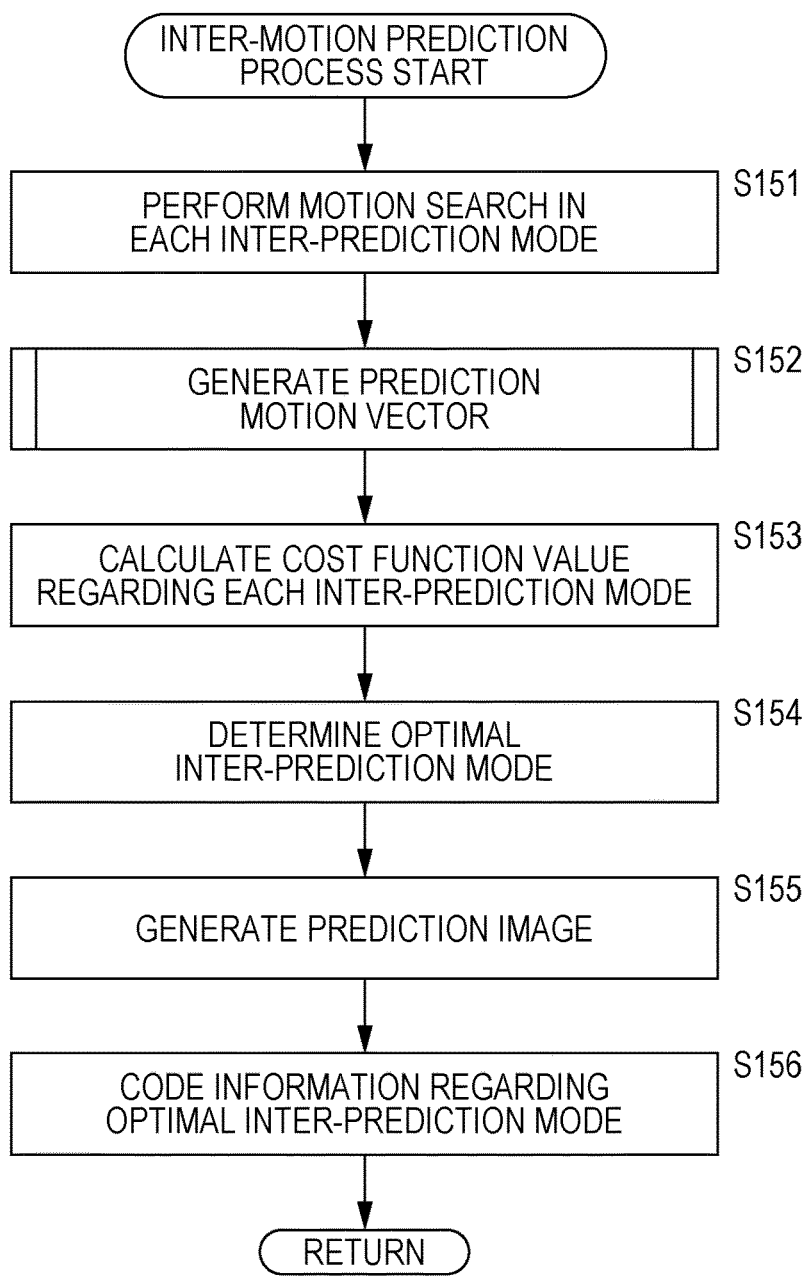
FIG. 18 is a flowchart illustrating an example of a flow of an inter-motion prediction process.

These information pieces supplied so as to correspond to the process in step S156 are coded in step S114 of FIG. 17.

[Flow of Prediction Motion Vector Generation Process]

Figure 19:
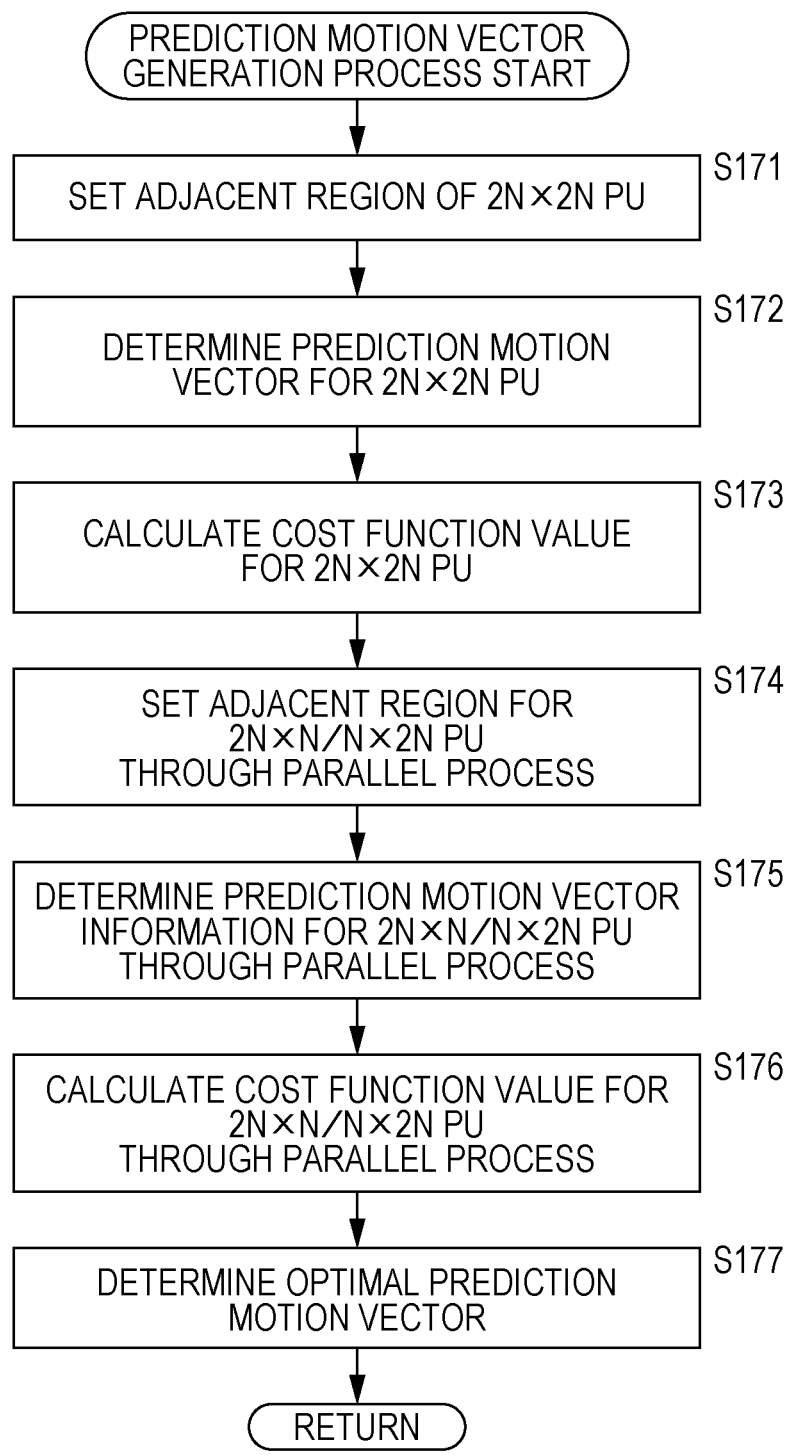
FIG. 19 is a flowchart illustrating an example of a flow of a prediction motion vector generation process.

Next, with reference to a flowchart of FIG. 19, a description will be made of the prediction motion vector generation process in step S152 of FIG. 18. In addition, in an example of FIG. 19, a generation process of only a spatial prediction motion vector is described, but, in practice, temporal prediction motion vector information is also generated, a cost function value is calculated, and an optimal prediction motion vector is determined from thereamong. Further, in the example of FIG. 19, a description of an N×N PU is omitted.

Information indicating a partition size (2N×2N PU) of a PU which is a process target is supplied from the motion prediction/compensation unit 115 to the parallel process control unit 122.

In step S171, the parallel process control unit 122 sets adjacent regions for referring to motion vector information for the 2N×2N PU. The parallel process control unit 122 sets, for example, A, B, C, D, and E illustrated in FIG. 10 as adjacent regions, and supplies addresses thereof to the spatially adjacent motion vector buffer 151 as a control signal.

The spatially adjacent motion vector buffer 151 reads information indicating a motion vector of a PU indicated by the control signal (address) from the parallel process control unit 122, and supplies information indicating the read motion vector to the candidate prediction motion vector generation section 153.

In step S172, the candidate prediction motion vector generation section 153 generates and determines a spatial prediction motion vector for the 2N×2N PU.

In other words, the candidate prediction motion vector generation section 153 performs a scanning process by referring to the spatially adjacent motion vector information of the A, B, C, D, and E of FIG. 10, so as to generate and determine a spatial prediction motion vector serving as a candidate of the 2N×2N PU. The candidate prediction motion vector generation section 153 supplies information on the determined spatial prediction motion vector to the cost function value calculation section 154 as candidate prediction motion vector information.

In step S173, the cost function value calculation section 154 calculates a cost function value regarding the candidate prediction motion vector of the 2N×2N PU, and supplies the calculated cost function value to the optimal prediction motion vector determination section 155 along with the candidate prediction motion vector information.

Information indicating a partition size (2N×N/N×2N PU) of a PU which is a process target is supplied from the motion prediction/compensation unit 115 to the parallel process control unit 122.

In step S174, the parallel process control unit 122 sets adjacent regions for referring to motion vector information for the 2N×N/N×2N PU through a parallel process.

In a case of the 2N×N PU, the parallel process control unit 122 sets, for example, $A_0$, $B_0$, $C_0$, $D_0$, and $E_0$ illustrated in A of FIG. 12 as adjacent regions of $PU_0$ which is the first PU, and supplies addresses thereof to the spatially adjacent motion vector buffer 151 as a control signal. In parallel thereto, the parallel process control unit 122 sets, for example, $A_1$, $B_0$, $C_0$, $D_1$, and $E_1$ illustrated in B of FIG. 12 as adjacent regions of $PU_1$ which is the second PU, and supplies addresses thereof to the spatially adjacent motion vector buffer 151 as a control signal.

In a case of the N×2N PU, the parallel process control unit 122 sets, for example, $A_0$, $B_0$, $C_0$, $D_0$, and $E_0$ illustrated in A of FIG. 13 as adjacent regions of $PU_0$ which is the first PU, and supplies addresses thereof to the spatially adjacent motion vector buffer 151 as a control signal. In parallel thereto, the parallel process control unit 122 sets, for example, $A_0$, $B_1$, $C_1$, $D_0$, and $E_1$ illustrated in B of FIG. 13 as adjacent regions of $PU_1$ which is the second PU, and supplies addresses thereof to the spatially adjacent motion vector buffer 151 as a control signal.

The spatially adjacent motion vector buffer 151 reads information indicating a motion vector of a PU indicated by the control signal (address) from the parallel process control unit 122, and supplies information indicating the read motion vector to the candidate prediction motion vector generation section 153.

In step S175, the candidate prediction motion vector generation section 153 generates and determines a spatial prediction motion vector for the 2N×N/N×2N PU through a parallel process.

In other words, in a case of the 2N×N PU, the candidate prediction motion vector generation section 153 performs a scanning process by referring to the spatially adjacent motion vector information of the $A_0$, $S_0$, $C_0$, $D_0$, and $E_0$ of A of FIG. 12, so as to generate and determine a spatial prediction motion vector serving as a candidate of the 2N×N $PU_0$. In parallel thereto, the candidate prediction motion vector generation section 153 performs a scanning process by referring to the spatially adjacent motion vector information of the $A_1$, $S_0$, $C_0$, $D_1$, and $E_1$ of B of FIG. 12, so as to generate and determine a spatial prediction motion vector serving as a candidate of the 2N×N $PU_1$.

In a case of the N×2N PU, the candidate prediction motion vector generation section 153 performs a scanning process by referring to the spatially adjacent motion vector information of the $A_0$, $B_0$, $C_0$, $D_0$, and $E_0$ of A of FIG. 13, so as to generate and determine a spatial prediction motion vector serving as a candidate of the N×2N $PU_0$. In parallel thereto, the candidate prediction motion vector generation section 153 performs a scanning process by referring to the spatially adjacent motion vector information of the $A_0$, $B_1$, $C_1$, $D_0$, and $E_1$ of B of FIG. 13, so as to generate and determine a spatial prediction motion vector serving as a candidate of the N×2N $PU_1$.

The candidate prediction motion vector generation section 153 supplies information on the determined spatial prediction motion vector to the cost function value calculation section 154 as candidate prediction motion vector information.

In step S176, the cost function value calculation section 154 calculates a cost function value regarding the candidate prediction motion vector of the 2N×N/N×2N PU, and supplies the calculated cost function value to the optimal prediction motion vector determination section 155 along with the candidate prediction motion vector information.

In step S177, the optimal prediction motion vector determination section 155 determines an optimal prediction motion vector from among the candidate prediction motion vectors. In other words, the optimal prediction motion vector determination section 155 determines a candidate prediction motion vector which leads the cost function value from the cost function value calculation section 154 to a minimal value, as an optimal prediction motion vector for the corresponding PU, and supplies the information to the motion prediction/compensation unit 115.

As mentioned above, in the image coding device 100, in a case where the coding region (CU) is formed by a plurality of prediction regions (PUs), an adjacent region for referring to a motion vector is set on the basis of a position of a prediction region in the coding region. Accordingly, a prediction motion vector generation process of a PU can be performed in parallel and thus it is possible to improve process efficiency.

2. Second Embodiment

[Image Decoding Device]

Figure 20:
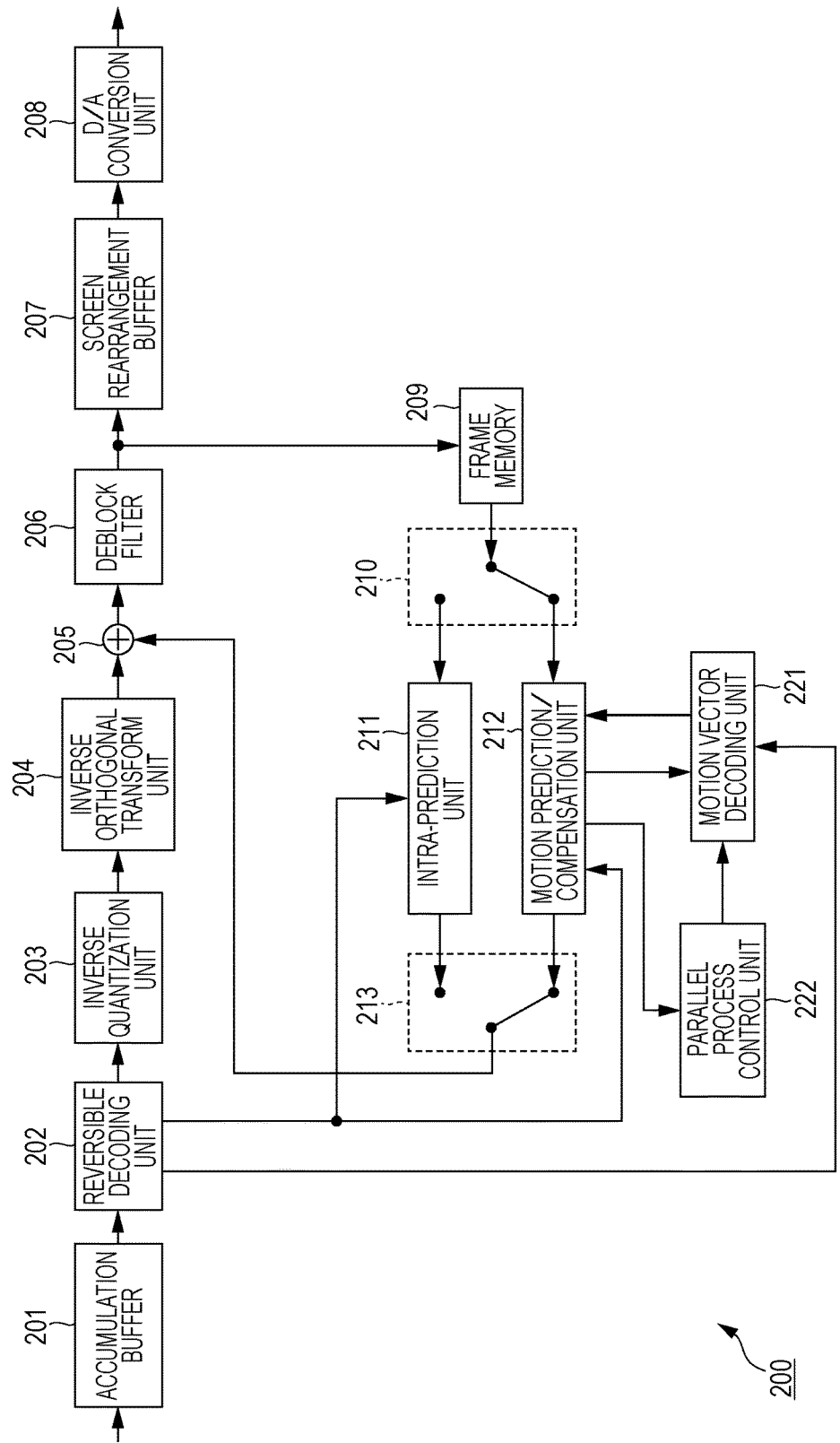
FIG. 20 is a block diagram illustrating a main configuration example of an image decoding device.

Next, a description will be made of decoding of coded data (coded stream) which has been coded as described above. FIG. 20 is a block diagram illustrating a main configuration example of an image decoding device corresponding to the image coding device 100 of FIG. 1.

An image decoding device 200 illustrated in FIG. 20 decodes coded data generated by the image coding device 100 by using a decoding method corresponding to the coding method. In addition, the image decoding device 200 is assumed to perform inter-prediction for each prediction unit (PU) in the same manner as the image coding device 100.

As illustrated in FIG. 20, the image decoding device 200 includes an accumulation buffer 201, a reversible decoding unit 202, an inverse quantization unit 203, an inverse orthogonal transform unit 204, a calculation unit 205, a deblock filter 206, a screen rearrangement buffer 207, and a D/A conversion unit 208. In addition, the image decoding device 200 includes a frame memory 209, a selection unit 210, an intra-prediction unit 211, a motion prediction/compensation unit 212, and a selection unit 213.

Further, the image decoding device 200 includes a motion vector decoding unit 221 and a parallel process control unit 222.

The accumulation buffer 201 is a reception unit which receives coded data which is transmitted. The accumulation buffer 201 receives and accumulates the coded data which is transmitted, and supplies the coded data to the reversible decoding unit 202 at a predetermined timing. Information necessary in decoding, such as prediction mode information, motion vector difference information, and prediction motion vector information, is added to the coded data. The reversible decoding unit 202 decodes the information which is supplied from the accumulation buffer 201 and has been coded by the reversible coding unit 106 of FIG. 1, by using a method corresponding to the coding method in the reversible coding unit 106. The reversible decoding unit 202 supplies quantized coefficient data of a difference image obtained through the decoding, to the inverse quantization unit 203.

In addition, the reversible decoding unit 202 determines whether an intra-prediction mode or an inter-prediction mode is selected as an optimal prediction mode. The reversible decoding unit 202 supplies information regarding the optimal prediction mode to a mode side which is determined as being selected, of the intra-prediction unit 211 and the motion prediction/compensation unit 212. In other words, for example, in a case where the inter-prediction mode is selected as an optimal prediction mode in the image coding device 100, information regarding the optimal prediction mode is supplied to the motion prediction/compensation unit 212.

Further, the reversible decoding unit 202 supplies the information necessary to decode a motion vector, such as the motion vector difference information and prediction motion vector information, to the motion vector decoding unit 221. Furthermore, although not illustrated in FIG. 20, partition size information of a PU from the reversible decoding unit 202 is supplied to the parallel process control unit 222.

The inverse quantization unit 203 inversely quantizes the quantized coefficient data which has been decoded and obtained by the reversible decoding unit 202, by using a method corresponding to the quantization method in the quantization unit 105 of FIG. 1, and supplies obtained coefficient data to the inverse orthogonal transform unit 204.

The inverse orthogonal transform unit 204 performs inverse orthogonal transform on the coefficient data supplied from the inverse quantization unit 203 by using a method corresponding to the orthogonal transform method in the orthogonal transform unit 104 of FIG. 1. Due to the inverse orthogonal transform process, the inverse orthogonal transform unit 204 obtains decoded remainder data corresponding to remainder data before undergoing orthogonal transform in the image coding device 100. The decoded remainder data obtained through the inverse orthogonal transform is supplied to the calculation unit 205. In addition, a prediction image is supplied to the calculation unit 205 from the intra-prediction unit 211 or the motion prediction/compensation unit 212 via the selection unit 213.

The calculation unit 205 adds the decoded remainder data to the prediction image, so as to obtain decoded image data corresponding to image data from which the prediction image is not subtracted by the calculation unit 103 of the image coding device 100. The calculation unit 205 supplies the decoded image data to the deblock filter 206.

The deblock filter 206 performs an appropriate deblock filter process on the supplied decoded image, and supplies a result thereof to the screen rearrangement buffer 207. The deblock filter 206 or the loop filter 206 performs the deblock filter process on the decoded image so as to remove block distortion from the decoded image.

The deblock filter 206 supplies the filter process result (the decoded image having undergone the filter process) to the screen rearrangement buffer 207 and the frame memory 209. In addition, the decoded image output from the calculation unit 205 may be supplied to the screen rearrangement buffer 207 or the frame memory 209 without using the deblock filter 206. In other words, the filter process by the deblock filter 206 may be omitted.

The screen rearrangement buffer 207 rearranges the images. In other words, an order of frames which has been rearranged to the coding order by the screen rearrangement buffer 102 of FIG. 1 is rearranged to the original display order. The D/A conversion unit 208 D/A coverts the image supplied from the screen rearrangement buffer 207, and outputs and displays the D/A converted image to and on a display (not illustrated).

The frame memory 209 stores the decoded image, and supplies the stored decoded image to the selection unit 210 as a reference image, at a predetermined timing or on the basis of a request from an external element such as the intra-prediction unit 211 or the motion prediction/compensation unit 212.

The selection unit 210 selects a supply destination of the reference image which is supplied from the frame memory 209. In a case where an intra-coded image is decoded, the selection unit 210 supplies the reference image supplied from the frame memory 209, to the intra-prediction unit 211. In addition, in a case where an inter-coded image is decoded, the selection unit 210 supplies the reference image supplied from the frame memory 209, to the motion prediction/compensation unit 212.

Information or the like indicating an intra-prediction mode which is obtained by decoding header information included in the coded data is appropriately supplied to the intra-prediction unit 211 from the reversible decoding unit 202. The intra-prediction unit 211 performs intra-prediction by using the reference image acquired from the frame memory 209, in the intra-prediction mode which has been used in the intra-prediction unit 114 of FIG. 1, so as to generate a prediction image. The intra-prediction unit 211 supplies the generated prediction image to the selection unit 213.

The motion prediction/compensation unit 212 acquires, from the reversible decoding unit 202, information (optimal prediction mode information, reference frame information, and the like) obtained by decoding the header information.

The motion prediction/compensation unit 212 performs inter-prediction by using the reference image acquired from the frame memory 209, in the inter-prediction mode indicated by the optimal prediction mode information acquired from the reversible decoding unit 202, so as to generate a prediction image. In addition, at this time, the motion prediction/compensation unit 212 performs the inter-prediction by using motion vector information which is reconstructed by the motion vector decoding unit 221.

The selection unit 213 supplies the prediction image from the intra-prediction unit 211 or the prediction image from the motion prediction/compensation unit 212 to the calculation unit 205. In addition, the calculation unit 205 adds the prediction image which is generated by using the motion vector to the decoded remainder data (difference image information) from the inverse orthogonal transform unit 204, so as to decode an original image. In other words, the motion prediction/compensation unit 212, the reversible decoding unit 202, the inverse quantization unit 203, the inverse orthogonal transform unit 204, and the calculation unit 205 function as a decoding unit which decodes the coded data by using the motion vector so as to generate an original image.

The motion vector decoding unit 221 acquires information on an index of the prediction motion vector and information on the difference motion vector from among information pieces obtained by decoding the header information, from the reversible decoding unit 202. Here, the index of the prediction motion vector is information indicating by using a motion vector of which adjacent region a prediction process (generation of a prediction motion vector) of a motion vector is performed among adjacent regions which are temporally and spatially adjacent to each PU. The information regarding the difference motion vector is information indicating a value of the difference motion vector.

In a case where the prediction motion vector is a temporal prediction motion vector, the motion vector decoding unit 221 reconstructs the prediction motion vector by using a motion vector of an adjacent PU indicated by an index of the prediction motion vector. In a case where the prediction motion vector is a spatial prediction motion vector, the motion vector decoding unit 221 reconstructs the prediction motion vector by using a motion vector of an adjacent PU indicated by an index of the prediction motion vector among adjacent PUs designated by the control signal from the parallel process control unit 122.

The motion vector decoding unit 221 adds the reconstructed prediction motion vector to the difference motion vector from the reversible decoding unit 202 so as to reconstruct a motion vector.

The parallel process control unit 222 is fundamentally configured in the same manner as the parallel process control unit 122 of FIG. 1, and sets a spatially adjacent PU of a target PU. The parallel process control unit 222 sets a spatially adjacent PU of a target PU so that a prediction motion vector generation process of a target prediction region is performed in parallel, particularly, in a case where a coding region (CU) is formed by a plurality of prediction regions (PUs). In addition, setting a spatially adjacent PU of a target PU is the same meaning as setting a motion vector of the spatially adjacent PU of the target PU, used to generate a prediction motion vector.

Specifically, the parallel process control unit 222 supplies, to the motion vector decoding unit 221, a control signal (an address or the like) for setting a spatially adjacent PU of a target PU on the basis of a position of a prediction region in a coding region by referring to information on a PU size from the motion prediction/compensation unit 212.

In addition, a fundamental operation principle related to the present technology in the motion vector decoding unit 221 and the parallel process control unit 222 are the same as that in the motion vector coding unit 121 and the parallel process control unit 122 of FIG. 1. However, there are 2N×N and N×2N as PUs serving as a candidate in the image coding device 100 of FIG. 1, and the method according to the present technology is applied to a case of generating spatial prediction motion vectors thereof.

Meanwhile, in the image decoding device 200 of FIG. 20, information regarding what kind of prediction motion vector is determined for the corresponding PU is transmitted from the coding side. In a case where a CU is coded by a 2N×N/N×2N PU and a spatial prediction motion vector is applied thereto during coding, the method according to the present technology is applied.

[Configuration Example of Motion Vector Decoding Unit]

Figure 21:
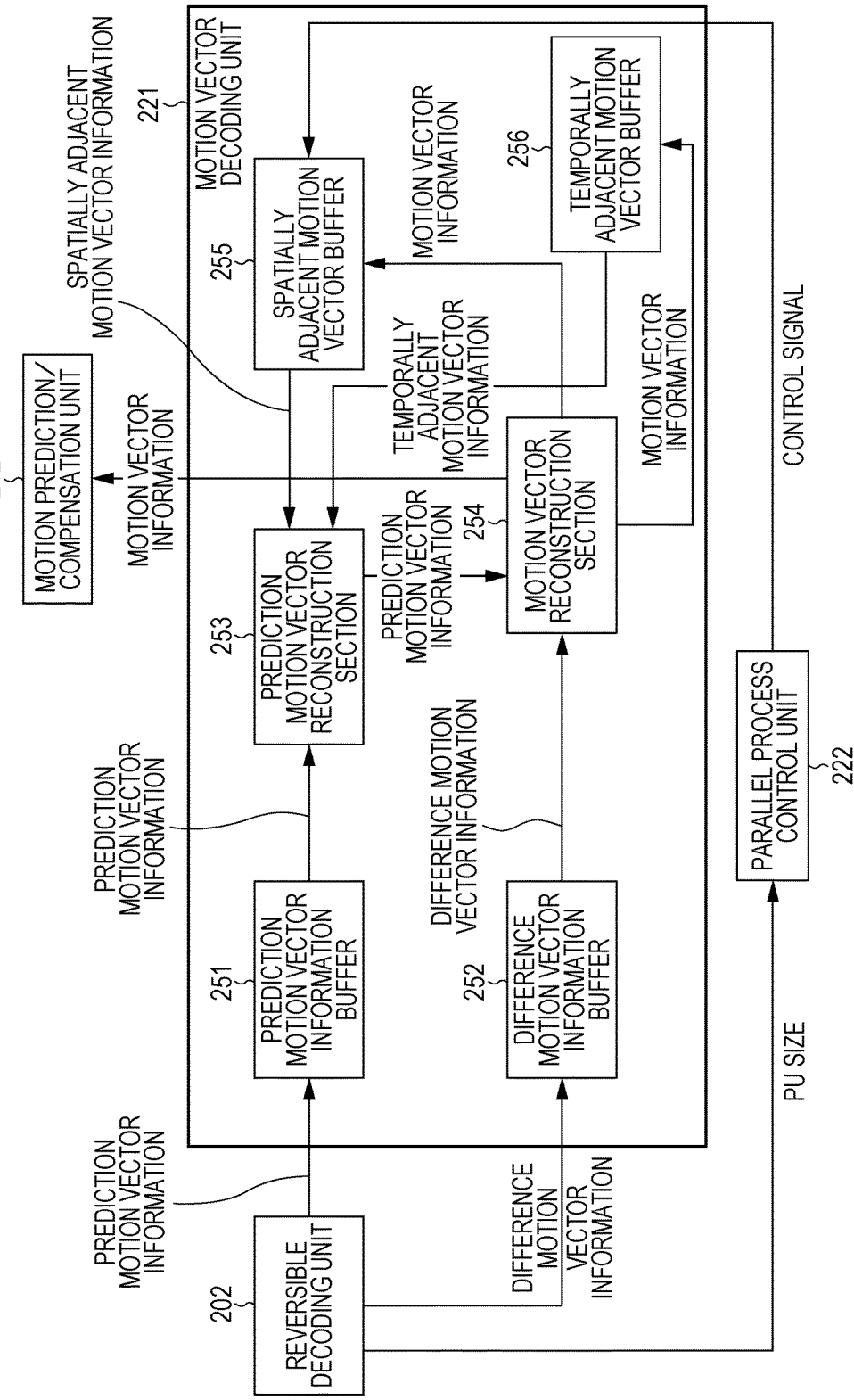
FIG. 21 is a block diagram illustrating a main configuration example of a motion vector decoding unit.

FIG. 21 is a block diagram illustrating a main configuration example of the motion vector decoding unit 221.

In an example of FIG. 21, the motion vector decoding unit 221 includes a prediction motion vector information buffer 251, a difference motion vector information buffer 252, a prediction motion vector reconstruction section 253, and a motion vector reconstruction section 254. The motion vector decoding unit 221 further includes a spatially adjacent motion vector buffer 255 and a temporally adjacent motion vector buffer 256.

The prediction motion vector information buffer 251 accumulates information (hereinafter, referred to as information on a prediction motion vector) including an index and the like of a prediction motion vector of a target region (PU) which has been decoded by the reversible decoding unit 202. The prediction motion vector information buffer 251 reads the prediction motion vector information of the corresponding PU, and supplies the read information to the prediction motion vector reconstruction section 253.

The difference motion vector information buffer 252 accumulates information on a difference motion vector of the target region (PU) which has been decoded by the reversible decoding unit 202. The difference motion vector information buffer 252 reads the information on a difference motion vector of the target PU, and supplies the read information to the motion vector reconstruction section 254.

The prediction motion vector reconstruction section 253 determines whether the prediction motion vector of the corresponding PU indicated by the information from the prediction motion vector information buffer 251 is a spatial prediction motion vector or a temporal prediction motion vector.

In a case where the prediction motion vector of the corresponding PU is a temporal prediction motion vector, the prediction motion vector reconstruction section 253 makes the temporally adjacent motion vector buffer 256 read motion vector information of the corresponding PU indicated by the information from the prediction motion vector information buffer 251. In addition, the prediction motion vector reconstruction section 253 generates and reconstructs the prediction motion vector of the corresponding PU on the basis of the method using the AMVP or the merge mode by using the read motion vector information. The prediction motion vector reconstruction section 253 supplies information on the reconstructed prediction motion vector to the motion vector reconstruction section 254.

In a case where the prediction motion vector of the corresponding PU is a spatial prediction motion vector, the prediction motion vector reconstruction section 253 makes the spatially adjacent motion vector buffer 255 read motion vector information of the corresponding PU indicated by the index from the prediction motion vector information buffer 251. In addition, the prediction motion vector reconstruction section 253 generates and reconstructs the prediction motion vector of the corresponding PU on the basis of the method using the AMVP or the merge mode by using the read motion vector information. The prediction motion vector reconstruction section 253 supplies information on the reconstructed prediction motion vector to the motion vector reconstruction section 254.

The motion vector reconstruction section 254 adds a difference motion vector of the corresponding PU indicated by the information from the difference motion vector information buffer 252 to the prediction motion vector of the corresponding PU from the prediction motion vector reconstruction section 253, so as to reconstruct a motion vector. The motion vector reconstruction section 254 supplies information on the reconstructed motion vector to the motion prediction/compensation unit 212, the spatially adjacent motion vector buffer 255, and the temporally adjacent motion vector buffer 256.

In addition, the motion prediction/compensation unit 212 performs inter-prediction using the reference image in the inter-prediction mode indicated by the optimal prediction mode information acquired from the reversible decoding unit 202 by using the motion vector reconstructed by the motion vector reconstruction section 254, so as to generate a prediction image.

Here, the parallel process control unit 222 refers to the information on a partition size of a PU from the reversible decoding unit 202, and supplies a control signal (an address or the like) for setting a spatially adjacent PU of a target PU to the spatially adjacent motion vector buffer 255 on the basis of a position of a prediction region in a coding region. Accordingly, the respective parts constituting the motion vector decoding unit 221 perform a process of generating a prediction motion vector of a target prediction region in parallel in a case where the coding region (CU) is formed by a plurality of prediction regions (PUs).

The spatially adjacent motion vector buffer 255 is formed by a line buffer in the same manner as the spatially adjacent motion vector buffer 151 of FIG. 16. The spatially adjacent motion vector buffer 255 accumulates the motion vector information reconstructed by the motion vector reconstruction section 254 as spatially adjacent motion vector information for prediction motion vector information of subsequent PUs in the same picture. The spatially adjacent motion vector buffer 255 reads motion vector information of a PU which corresponds to the index from the prediction motion vector reconstruction section 253, among PUs indicated by the control signal (addresses) from the parallel process control unit 122.

The temporally adjacent motion vector buffer 256 is formed by a memory in the same manner as the temporally adjacent motion vector buffer 152 of FIG. 16. The temporally adjacent motion vector buffer 256 accumulates the motion vector information reconstructed by the motion vector reconstruction section 254 as temporally adjacent motion vector information for prediction motion vector information of PUs of other pictures. The temporally adjacent motion vector buffer 256 reads motion vector information of a PU which corresponds to the index from the prediction motion vector reconstruction section 253.

[Flow of Decoding Process]

Next, a description will be made of a flow of each process performed by the above-described image decoding device 200. First, with reference to a flowchart of FIG. 22, an example of a flow of a decoding process will be described.

When the decoding process starts, in step S201, the accumulation buffer 201 accumulates transmitted coded data (coded stream). In step S202, the reversible decoding unit 202 decodes the coded data (coded difference image information) supplied from the accumulation buffer 201. In other words, an I picture, a P picture, and a B picture which have been coded by the reversible coding unit 106 of FIG. 1 are decoded.

At this time, various information pieces other than the difference image information included in the coded stream, such as header information, are decoded. The reversible decoding unit 202 acquires information or the like including, for example, prediction mode information, information on a difference motion vector, and an index of a prediction motion vector. The reversible decoding unit 202 supplies the acquired information to a corresponding unit.

In step S203, the inverse quantization unit 203 inversely quantizes the quantized orthogonal transform coefficient obtained due to the process in step S202. In addition, a quantized parameter obtained due to a process in step S208 described later is used in this inverse quantization process. In step S204, the inverse orthogonal transform unit 204 performs inverse orthogonal transform on the orthogonal transform coefficient which is inversely quantized in step S203.

In step S205, the reversible decoding unit 202 determines whether or not coded data which is a process target is intra-coded on the basis of information regarding the optimal prediction mode decoded in step S202. If it is determined that the coded data is intra-coded, the process proceeds to step S206.

In step S206, the intra-prediction unit 211 acquires intra-prediction mode information. In step S207, the intra-prediction unit 211 performs intra-prediction by using the intra-prediction mode information acquired in step S206 so as to generate a prediction image.

In addition, if it is determined that the coded data which is a process target is not intra-coded, that is, the coded data is inter-coded in step S206, the process proceeds to step S208.

In step S208, the motion vector decoding unit 2212 performs a motion vector reconstruction process. Details of the motion vector reconstruction process will be described later with reference to FIG. 23.

Due to the process in step S208, information regarding the decoded prediction motion vector is referred to, and thus the prediction motion vector of the corresponding PU is reconstructed. At this time, in a case where the prediction motion vector of the corresponding PU is a spatial prediction motion vector, when a CU is formed by a plurality of PUs, the prediction motion vector is reconstructed by using motion vector information of a spatially adjacent PU set on the basis of a position of the PU in the CU. In addition, a motion vector is reconstructed by using the reconstructed prediction motion vector of the corresponding PU, and the reconstructed motion vector is supplied to the motion prediction/compensation unit 212.

In step S209, the motion prediction/compensation unit 212 performs an inter-motion prediction process by using the motion vector reconstructed due to the process in step S208, so as to generate a prediction image. The generated prediction image is supplied to the selection unit 213.

In step S210, the selection unit 213 selects the prediction image generated in step S207 or step S209. In step S211, the calculation unit 205 adds the prediction image selected in step S210 to the difference image information obtained through the inverse orthogonal transform in step S204. Accordingly, an original image is decoded. In other words, the prediction image is generated by using the motion vector, and the generated prediction image is added to the difference image information from the inverse orthogonal transform unit 204 so that the original image is decoded.

In step S212, the deblock filter 206 performs an appropriate deblock filter process on the decoded image obtained in step S211.

In step S213, the screen rearrangement buffer 207 rearranges the images which undergo the filter process in step S212. In other words, an order of frames which has been rearranged to the coding order by the screen rearrangement buffer 102 of the image coding device 100 is rearranged to the original display order.

In step S214, the D/A conversion unit 208 D/A converts the images whose order is rearranged in step S213. These images are output to a display (not illustrated), and the images are displayed.

In step S215, the frame memory 209 stores the image which undergo the filter process in step S212.

If the process in step S215 is completed, the decoding process finishes.

[Flow of Motion Vector Reconstruction Process]

Next, with reference to a flowchart of FIG. 23, a description will be made of an example of a flow of the motion vector reconstruction process performed in step S208 of FIG. 22. In addition, the motion vector reconstruction process is a process of decoding a motion vector by using information which is transmitted from the coding side and is decoded by the reversible decoding unit 202.

Figure 22:
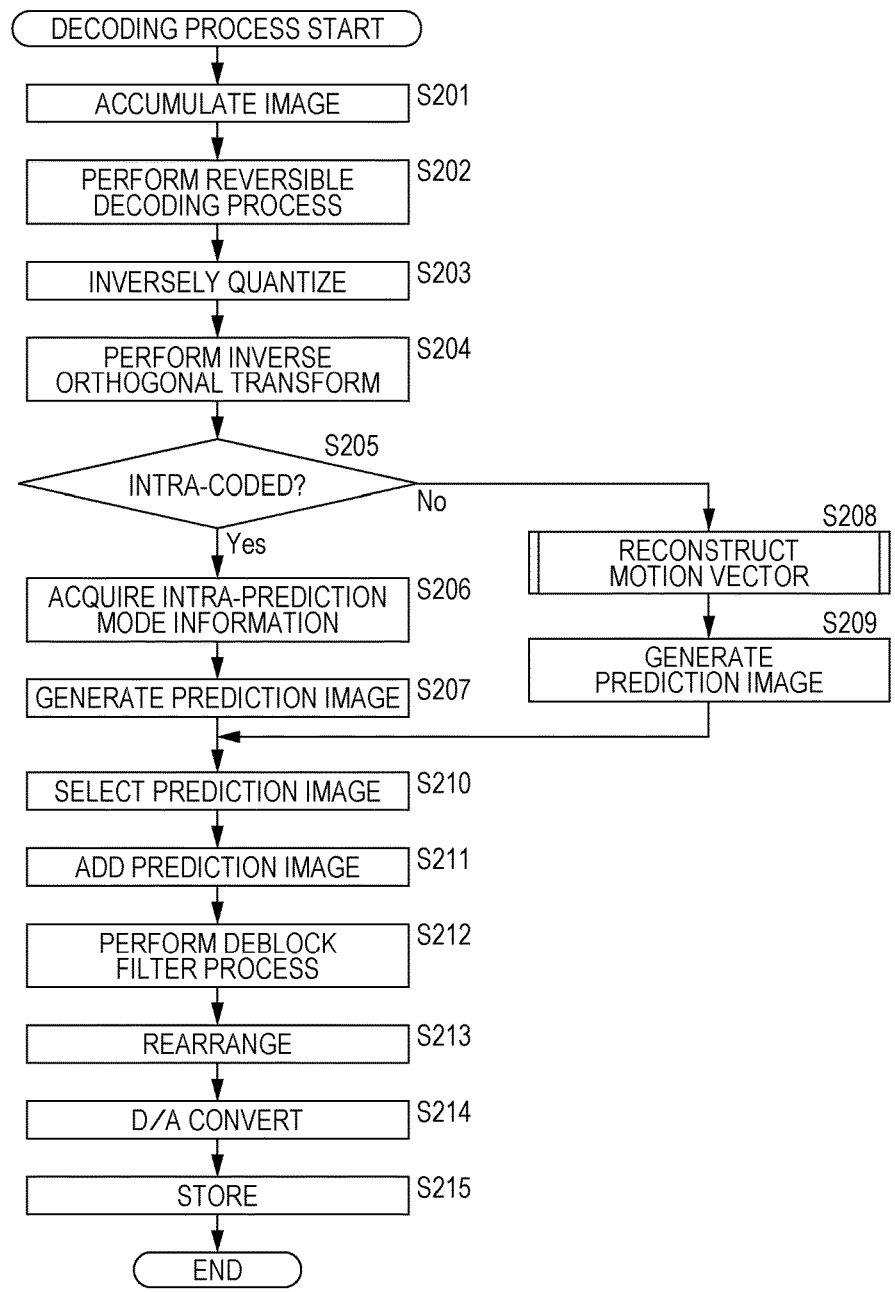
FIG. 22 is a flowchart illustrating an example of a flow of a decoding process.

In step S202 of FIG. 22, the reversible decoding unit 202 acquires information or the like on a decoded parameter, and supplies the acquired information to a corresponding unit.

In step S251, the difference motion vector information buffer 252 acquires the difference motion vector information from the reversible decoding unit 202, and supplies the acquired information to the motion vector reconstruction section 254.

In step S252, the prediction motion vector information buffer 251 acquires the prediction motion vector information from the reversible decoding unit 202, and supplies the acquired information to the prediction motion vector reconstruction section 253. At this time, the parallel process control unit 222 acquires the information indicating a PU size (partition size) from the reversible decoding unit 202.

In step S253, the parallel process control unit 222 determines whether or not the corresponding PU is a 2N×2N PU by referring to the acquired PU size. If the corresponding PU is a 2N×2N PU in step S253, the process proceeds to step S254.

In step S254, the parallel process control unit 222 sets adjacent regions for referring to motion vector information in relation to the 2N×2N PU. The parallel process control unit 222 sets, for example, A, B, C, D, and E illustrated in FIG. 10 as adjacent regions, and supplies addresses thereof to the spatially adjacent motion vector buffer 255 as a control signal.

In step S255, the prediction motion vector reconstruction section 253 reconstructs a prediction motion vector.

In other words, the prediction motion vector reconstruction section 253 supplies the prediction motion vector information (index) from the prediction motion vector information buffer 251, to the spatially adjacent motion vector buffer 255. The spatially adjacent motion vector buffer 255 reads motion vector information of an adjacent region indicated by the index from the prediction motion vector reconstruction section 253 among the adjacent regions set by the parallel process control unit 222, and supplies the read information to the prediction motion vector reconstruction section 253. The prediction motion vector reconstruction section 253 generates and reconstructs the prediction motion vector of the corresponding PU on the basis of the method using the AMVP or the merge mode by using the motion vector information read from the spatially adjacent motion vector buffer 255. The reconstructed prediction motion vector information is supplied to the motion vector reconstruction section 254.

On the other hand, if it is determined that the corresponding PU is not the 2N×2N PU, that is, the corresponding PU is a 2N×N or N×2N PU in step S253, the process proceeds to step S256.

In step S256, the parallel process control unit 222 sets adjacent regions for referring to motion vector information through a parallel process of the first PU and the second PU in relation to the 2N×N/N×2N PU.

In a case of the 2N×N PU, the parallel process control unit 222 sets, for example, $A_0$, $B_0$, $C_0$, $D_0$, and $E_0$ illustrated in A of FIG. 12 as adjacent regions of $PU_0$ which is the first PU, and supplies addresses thereof to the spatially adjacent motion vector buffer 255 as a control signal. In parallel thereto, the parallel process control unit 222 sets, for example, $A_1$, $B_0$, $C_0$, $D_1$, and $E_1$ illustrated in B of FIG. 12 as adjacent regions of $PU_1$ which is the second PU, and supplies addresses thereof to the spatially adjacent motion vector buffer 255 as a control signal.

In a case of the N×2N PU, the parallel process control unit 222 sets, for example, $A_0$, $B_0$, $C_0$, $D_0$, and $E_0$ illustrated in A of FIG. 13 as adjacent regions of $PU_0$ which is the first PU, and supplies addresses thereof to the spatially adjacent motion vector buffer 255 as a control signal. In parallel thereto, the parallel process control unit 222 sets, for example, $A_0$, $B_1$, $C_1$, $D_0$, and $E_1$ illustrated in B of FIG. 13 as adjacent regions of $PU_1$ which is the second PU, and supplies addresses thereof to the spatially adjacent motion vector buffer 255 as a control signal.

In step S255, the prediction motion vector reconstruction section 253 reconstructs a prediction motion vector through a parallel process of the first PU and the second PU.

In other words, the prediction motion vector reconstruction section 253 supplies the prediction motion vector information (index) from the prediction motion vector information buffer 251, to the spatially adjacent motion vector buffer 255. The spatially adjacent motion vector buffer 255 reads motion vector information of an adjacent region indicated by the index from the prediction motion vector reconstruction section 253 among the adjacent regions set by the parallel process control unit 222, and supplies the read information to the prediction motion vector reconstruction section 253. The prediction motion vector reconstruction section 253 generates and reconstructs the prediction motion vector of the corresponding PU on the basis of the method using the AMVP or the merge mode by using the motion vector information read from the spatially adjacent motion vector buffer 255. The reconstructed prediction motion vector information is supplied to the motion vector reconstruction section 254. This process is performed through a parallel process of the first PU and the second PU, and thus the prediction motion vector information pieces of the first PU and the second PU are simultaneously supplied to the motion vector reconstruction section 253.

In step S257, the motion vector reconstruction section 254 reconstructs a motion vector of the corresponding PU.

In other words, the motion vector reconstruction section 254 adds a difference motion vector of the corresponding PU indicated by the information from the difference motion vector information buffer 252 to the prediction motion vector of the corresponding PU from the prediction motion vector reconstruction section 253, so as to reconstruct a motion vector. The motion vector reconstruction section 254 supplies information on the reconstructed motion vector to the motion prediction/compensation unit 212, the spatially adjacent motion vector buffer 255, and the temporally adjacent motion vector buffer 256.

Figure 23:
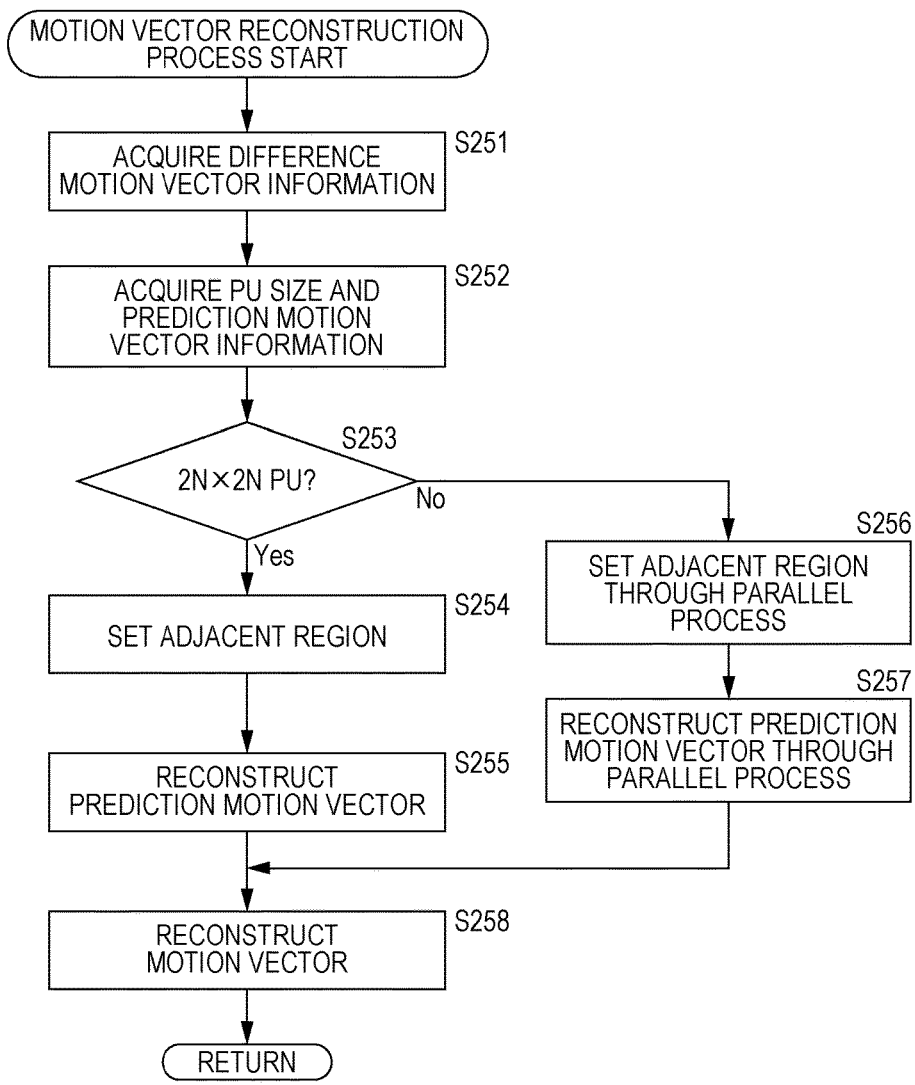
FIG. 23 is a flowchart illustrating an example of a flow of a motion vector reconstruction process.

In addition, FIG. 23 illustrates a case of the method using the AMVP. In a case of the merge mode, the difference motion vector information is not transmitted from the coding side, and thus step S251 is omitted. In addition, in a case of the merge mode, in step S257, the prediction motion vector of the corresponding PU from the prediction motion vector reconstruction section 253 becomes a motion vector of the corresponding PU.

In addition, in the example of FIG. 23, the generation process of only a spatial prediction motion vector is described, but, in practice, it is determined whether the prediction motion vector information indicates a spatial prediction motion vector or a temporal prediction motion vector. In addition, if the prediction motion vector information indicates a temporal prediction motion vector, temporal prediction motion vector information is reconstructed, and then a motion vector is reconstructed. Further, in the example of FIG. 23, description of an N×N PU is omitted.

The image decoding device 200 can correctly decode the coded data which has been coded by the image coding device 100 by performing each process as described above, and thus it is possible to realize improvement in process efficiency.

In other words, also in the image decoding device 200, in a case where a coding region (CU) is formed by a plurality of prediction regions (PUs), adjacent regions for referring to a motion vector are set on the basis of a position of the prediction region in the coding region. Accordingly, a prediction motion vector reconstruction process of the PUs can be performed in parallel, and thus it is possible to improve process efficiency.

In addition, although, in the above description, the description has been made of an example in which the parallel process control unit 122 and the parallel process control unit 222 are operated at all times, for example, in the parallel process control unit 122 on the coding side, On and Off states of parallel process control (adjacent region setting) may be set, and the parallel process control (adjacent region setting) may be performed only in a case of the On state.

The setting on the coding side is set as an On/Off flag in a syntax element such as a sequence parameter set of a coded stream, for example, by the reversible coding unit 106, and is transmitted from the accumulation buffer 107 to the decoding side. In addition, on the decoding side, the On/Off flag is received by the accumulation buffer 201 so as to be acquired by the reversible decoding unit 202, and is supplied to the parallel process control unit 222. An On or Off state is set in the parallel process control unit 222 on the basis of the supplied flag, and the parallel process control (adjacent region setting) is performed only in a case of the On state.

Further, the On/Off flag may be set on the basis of a size of a CU or a PU. In other words, in a case where the CU and the PU are split to be smaller, motion vector information of more blocks is required to be processed, and realizing this through a parallel process is advantageous in building a circuit which can perform a process in real time.

On the other hand, in relation to a larger CU or PU, as illustrated in FIGS. 12 and 13, motion vector information of a separate location is used as adjacent information, and thus there is a concern that a correlation with motion information for a corresponding PU may be reduced and this may lead to a reduction in coding efficiency.

In addition, a necessity for the parallel process is higher for a sequence with a larger size. For this reason, the flag may not be transmitted as described above but may be set on the basis of a profile or a level of a sequence of a coded stream.

In addition, although, in the above description, a case of conforming to the HEVC has been described, the present technology is applicable to an apparatus using other coding methods as long as the apparatus performs a coding process and a decoding process of motion vector information using the AMVP or the merge mode.

Further, the present technology is applicable to an image coding device and an image decoding device which are used when image information (bit stream) which has been compressed through orthogonal transform such as discrete cosine transistor and motion compensation, such as, for example, MPEG or H.26x, is received via a network medium such as satellite broadcast, a cable television, the Internet, or a mobile phone. Further, the present technology is applicable to an image coding device and an image decoding device which are used when a process is performed on storage media such as an optical disc, a magnetic disk, and a flash memory. Furthermore, the present technology is also applicable to a motion prediction compensation device included in the image coding device and the image decoding device.

3. Third Embodiment

[Application to Multi-View Image Coding and Multi-View Image Decoding]

Figure 24:
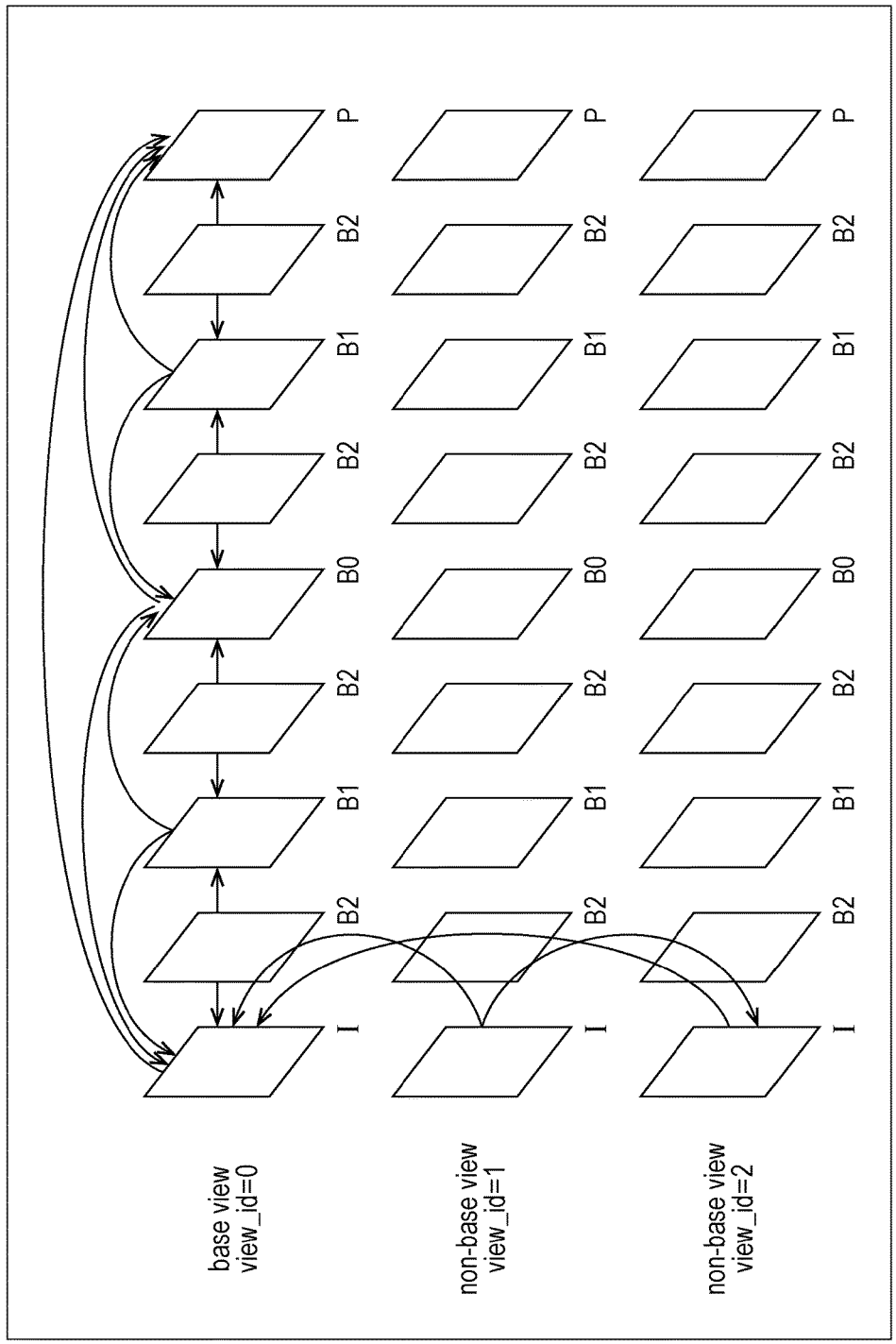
FIG. 24 is a diagram illustrating an example of a multi-view image coding method.

The above-described series of processes may be applied to multi-view image coding and multi-view image decoding. FIG. 24 is a diagram illustrating an example of a multi-view image coding method.

As illustrated in FIG. 24, multi-view images include images at a plurality of views, and an image at a certain view among the plurality of views is designated as a base view image. The images at the respective views other than the base view image are treated as non-base view images.

In a case of performing the multi-view image coding as in FIG. 24, an On/Off flag of the above-described parallel process control (adjacent region setting) may be set in each view (the same view). In addition, an On/Off flag of the parallel process control set in other views may be shared in respective views (different views).

In this case, On/Off flag of the parallel process control set in a base view is used in at least one non-base view. Alternatively, for example, an On/Off flag of the parallel process control set in a non-base view (view_id=i) is used in at least one of a base view and a non-base view (view_id=j).

Accordingly, it is possible to improve process efficiency through a parallel process in coding or decoding of a motion vector.

[Multi-View Image Coding Device]

Figure 25:
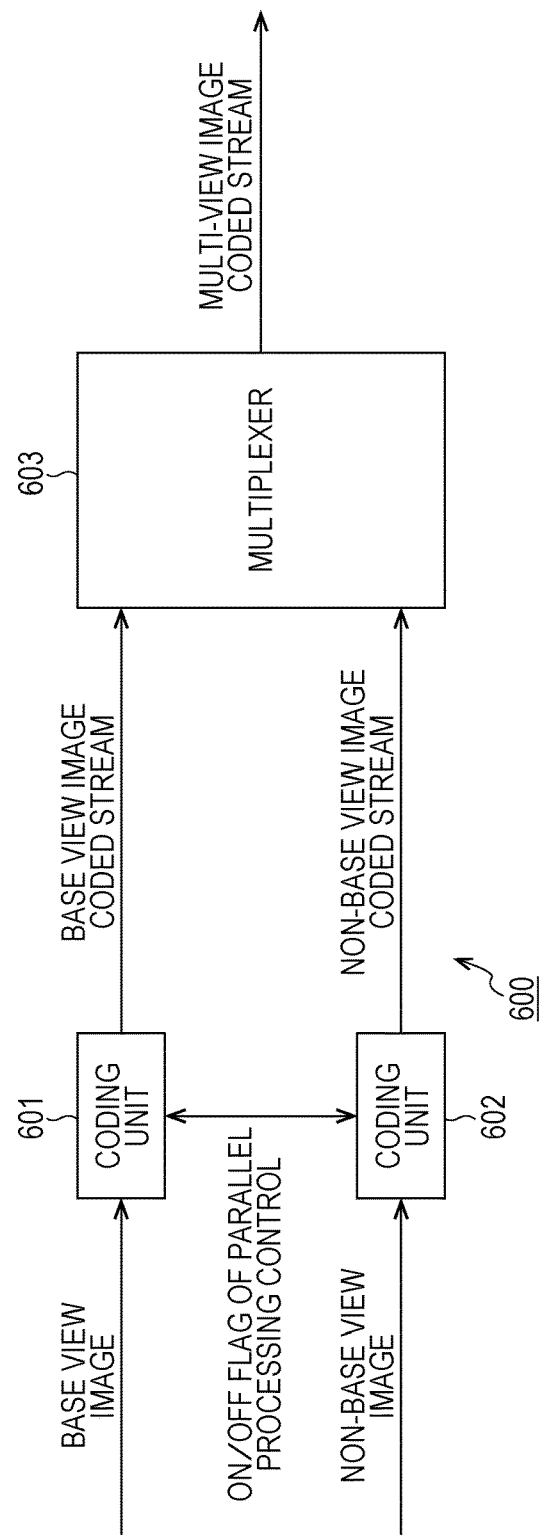
FIG. 25 is a diagram illustrating a main configuration example of a multi-view image coding device to which the present technology is applied.

FIG. 25 is a diagram illustrating a multi-view image coding device which performs the above-described multi-view image coding. As illustrated in FIG. 25, the multi-view image coding device 600 includes a coding unit 601, a coding unit 602, and a multiplexer 603.

The coding unit 601 codes a base view image so as to generate a base view image coded stream. The coding unit 602 codes a non-base view image so as to generate a non-base view image coded stream. The multiplexer 603 multiplexes the base view image coded stream generated in the coding unit 601 and the non-base view image coded stream generated in the coding unit 602, so as to generate a multi-view image coded stream.

The image coding device 100 (FIG. 1) is applicable to the coding unit 601 and the coding unit 602 of the multi-view image coding device 600. In this case, the multi-view image coding device 600 sets and transmits an On/Off flag of the parallel process control set by the coding unit 601 and an On/Off flag of the parallel process control by the coding unit 602.

In addition, as described above, the On/Off flag of the parallel process control set by the coding unit 601 may be set to be shared and used by the coding unit 601 and the coding unit 602 and may be transmitted. Conversely, the On/Off flag of the parallel process control set by the coding unit 602 may be set to be shared and used by the coding unit 601 and the coding unit 602 and may be transmitted.

[Multi-View Image Decoding Device]

Figure 26:
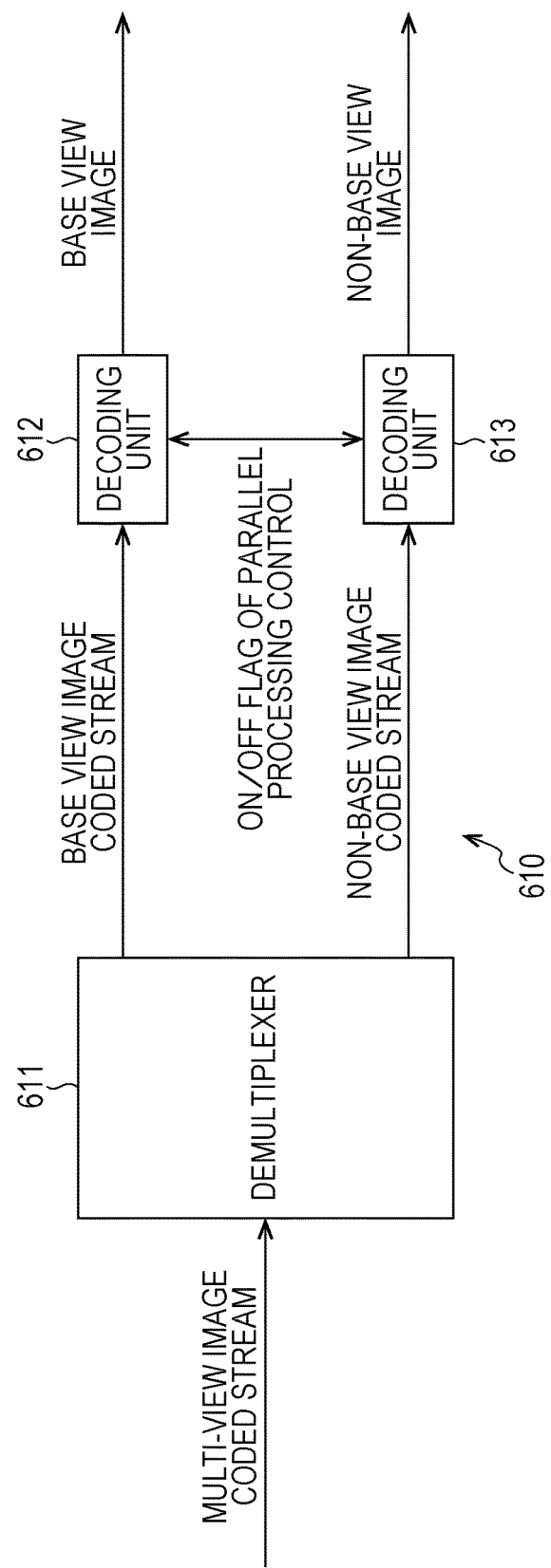
FIG. 26 is a diagram illustrating a main configuration example of a multi-view image decoding device to which the present technology is applied.

FIG. 26 is a diagram illustrating a multi-view image decoding device which performs the above-described multi-view image decoding. As illustrated in FIG. 26, the multi-view image decoding device 610 includes a demultiplexer 611, a decoding unit 612, and a decoding unit 613.

The demultiplexer 611 demultiplexes the multi-view image coded stream into which the base view image coded stream and the non-base view image coded stream are multiplexed, so as to extract the base view image coded stream and the non-base view image coded stream. The decoding unit 612 decodes the base view image coded stream extracted by the demultiplexer 611 so as to obtain a base view image. The decoding unit 613 decodes the non-base view image coded stream extracted by the demultiplexer 611 so as to obtain a non-base view image.

The image decoding device 200 (FIG. 20) is applicable to the decoding unit 612 and the decoding unit 613 of the multi-view image decoding device 610. In this case, the multi-view image decoding device 610 performs a process by using the On/Off flag of the parallel process control which is set by the coding unit 601 and is decoded by the decoding unit 612 and the On/Off flag of the parallel process control which is set by the coding unit 602 and is decoded by the decoding unit 613.

In addition, as described above, there is a case where the On/Off flag of the parallel process control set by the coding unit 601 (or the coding unit 602) is set to be shared and used by the coding unit 601 and the coding unit 602 and may be transmitted. In this case, the multi-view image decoding device 610 performs a process by using the On/Off flag of the parallel process control which is set by the coding unit 601 (or the coding unit 602) and is decoded by the decoding unit 612 (or the decoding unit 613).

4. Fourth Embodiment

[Application to Layer Image Coding and Layer Image Decoding]

Figure 27:
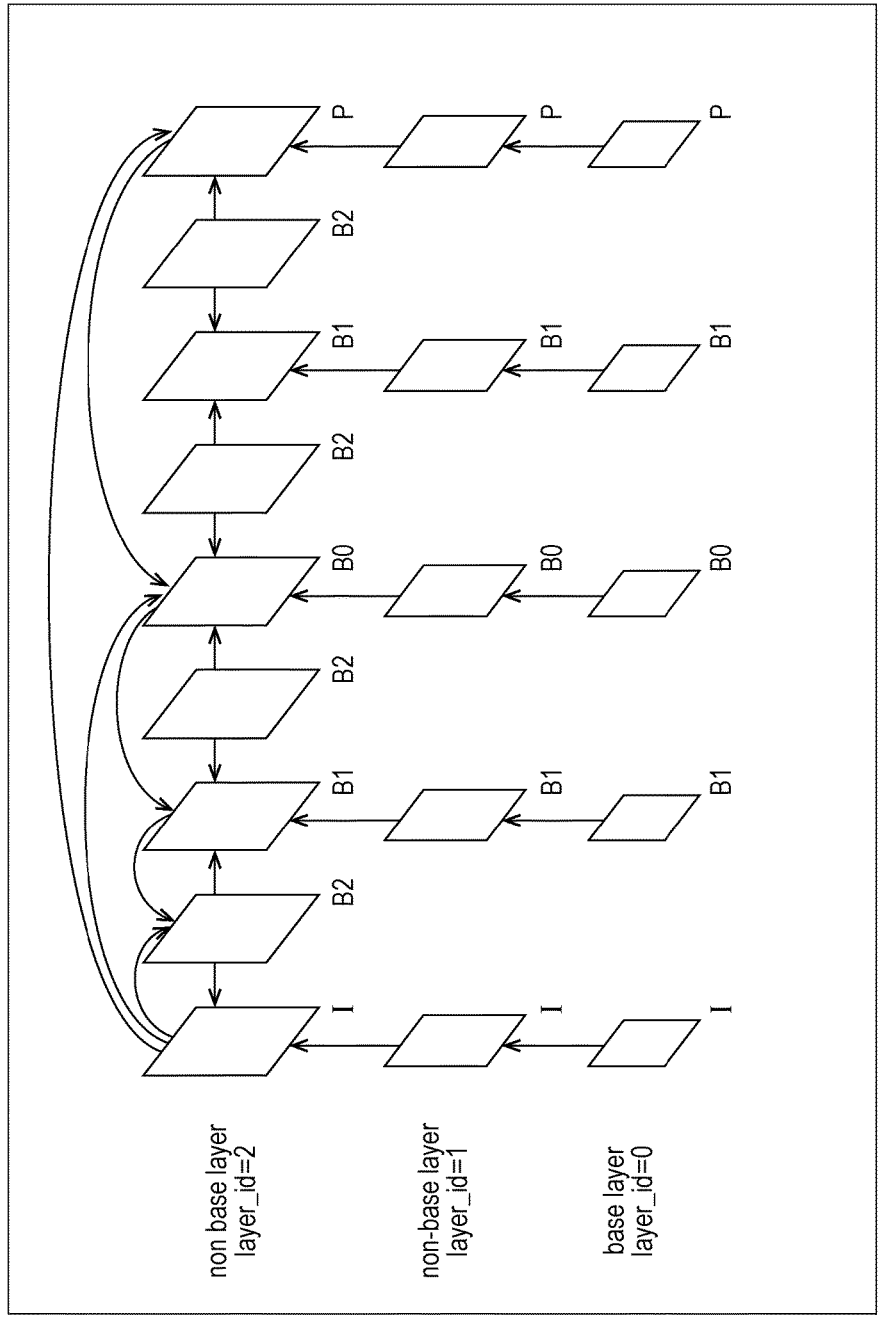
FIG. 27 is a diagram illustrating an example of a layer image coding method.

The above-described series of processes may be applied to layer image coding and layer image decoding. FIG. 27 illustrates an example of a multi-view image coding method.

As illustrated in FIG. 27, layer images include images of a plurality of layers (resolutions), and an image of a certain layer among the plurality of layers is designated as a base layer image. The images of the respective layers other than the base layer image are treated as non-base layer images.

In a case of performing the layer image coding (spatial scalability) as in FIG. 27, an On/Off flag of the above-described parallel process control (adjacent region setting) may be set in each layer (the same layer). In addition, an On/Off flag of the parallel process control set in other views may be shared in respective layers (different layers).

In this case, On/Off flag of the parallel process control set in a base layer is used in at least one non-base layer. Alternatively, for example, On/Off flag of the parallel process control set in a non-base layer (layer_id=i) is used in at least one of a base layer and a non-base layer (layer_id=j).

Accordingly, it is possible to improve process efficiency through a parallel process in coding or decoding of a motion vector.

[Layer Image Coding Device]

Figure 28:
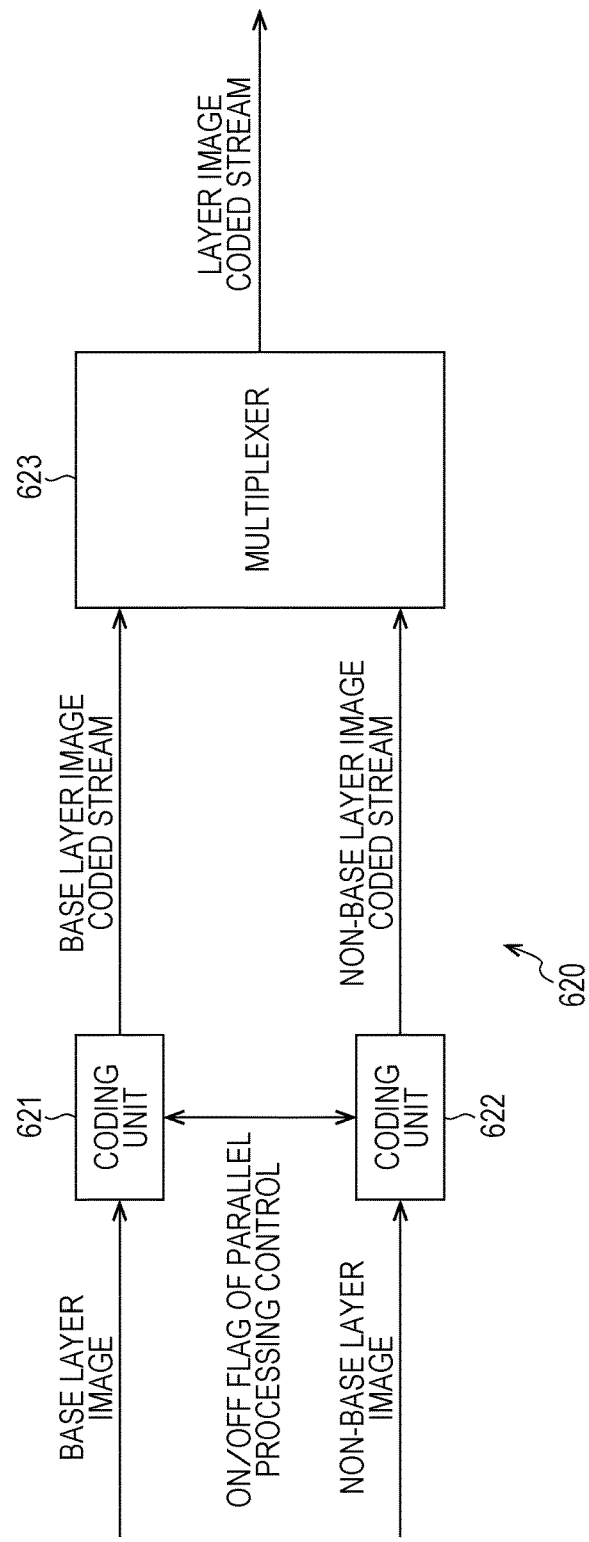
FIG. 28 is a diagram illustrating a main configuration example of a layer image coding device to which the present technology is applied.

FIG. 28 is a diagram illustrating a layer image coding device which performs the above-described layer image coding. As illustrated in FIG. 28, the layer image coding device 620 includes a coding unit 621, a coding unit 622, and a multiplexer 623.

The coding unit 621 codes the base layer image so as to generate a base layer image coded stream. The coding unit 622 codes the non-base layer image so as to generate a non-base layer image coded stream. The multiplexer 623 multiplexes the base layer image coded stream generated in the coding unit 621 and the non-base layer image coded stream generated in the coding unit 622, so as to generate a layer image coded stream.

The image coding device 100 (FIG. 1) is applicable to the coding unit 621 and the coding unit 622 of the layer image coding device 620. In this case, the layer image coding device 620 sets and transmits an On/Off flag of the parallel process control set by the coding unit 621 and an On/Off flag of the parallel process control by the coding unit 602.

In addition, as described above, the On/Off flag of the parallel process control set by the coding unit 621 may be set to be shared and used by the coding unit 621 and the coding unit 622 and may be transmitted. Conversely, the On/Off flag of the parallel process control set by the coding unit 622 may be set to be shared and used by the coding unit 621 and the coding unit 622 and may be transmitted.

[Layer Image Decoding Device]

Figure 29:
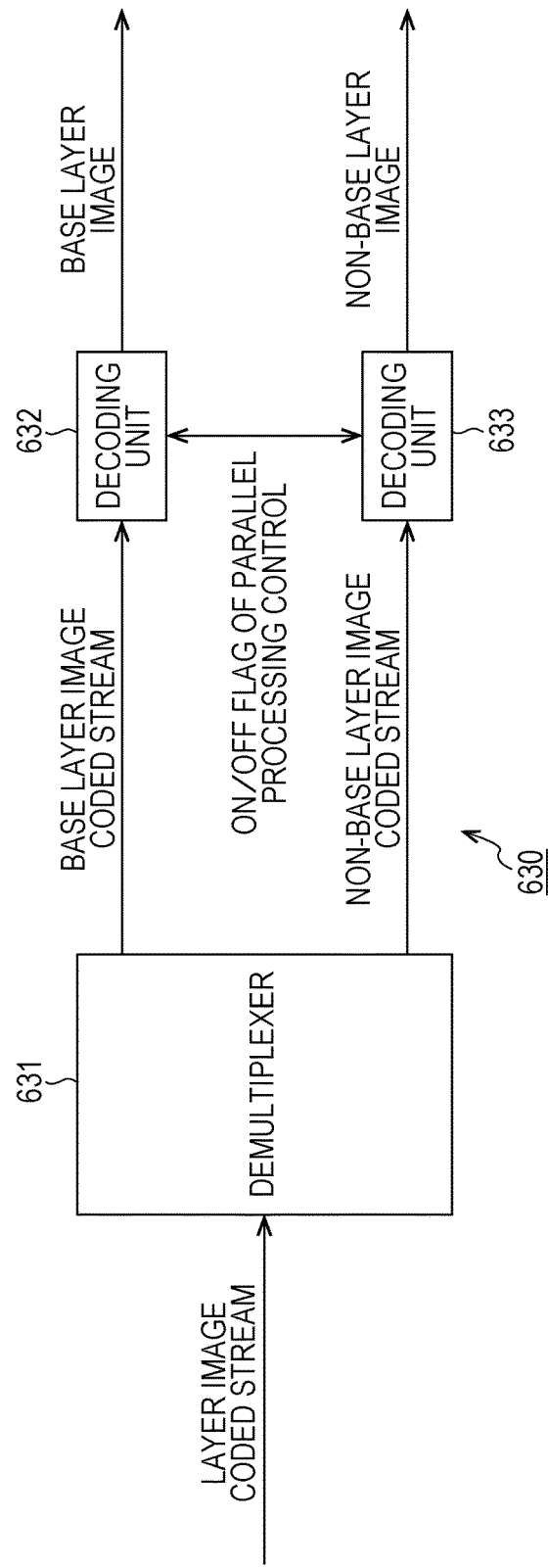
FIG. 29 is a diagram illustrating a main configuration example of a layer image decoding device to which the present technology is applied.

FIG. 29 is a diagram illustrating a layer image decoding device which performs the above-described layer image decoding. As illustrated in FIG. 29, the layer image decoding device 630 includes a demultiplexer 631, a decoding unit 632, and a decoding unit 633.

The demultiplexer 631 demultiplexes the layer image coded stream into which the base layer image coded stream and the non-base layer image coded stream are multiplexed, so as to extract the base layer image coded stream and the non-base layer image coded stream. The decoding unit 632 decodes the base layer image coded stream extracted by the demultiplexer 631 so as to obtain a base layer image. The decoding unit 633 decodes the non-base layer image coded stream extracted by the demultiplexer 631, so as to obtain a non-base layer image.

The image decoding device 200 (FIG. 20) is applicable to the decoding unit 632 and the decoding unit 633 of the layer image decoding device 630. In this case, the layer image decoding device 630 performs a process by using the On/Off flag of the parallel process control which is set by the coding unit 621 and is decoded by the decoding unit 632 and the On/Off flag of the parallel process control which is set by the coding unit 622 and is decoded by the decoding unit 633.

In addition, as described above, there is a case where the On/Off flag of the parallel process control set by the coding unit 621 (or the coding unit 622) is set to be shared and used by the coding unit 621 and the coding unit 622 and may be transmitted. In this case, the layer image decoding device 630 performs a process by using the On/Off flag of the parallel process control which is set by the coding unit 621 (or the coding unit 622) and is decoded by the decoding unit 632 (or the decoding unit 633).

5. Fifth Embodiment

[Computer]

The above-described series of processes may be performed by hardware or software. When the above-described series of processes is performed by the software, programs constituting the software are installed in a computer. Here, the computer includes a computer incorporated into dedicated hardware, or a general purpose personal computer or the like which can execute various kinds of functions by installing various kinds of programs.

Figure 30:
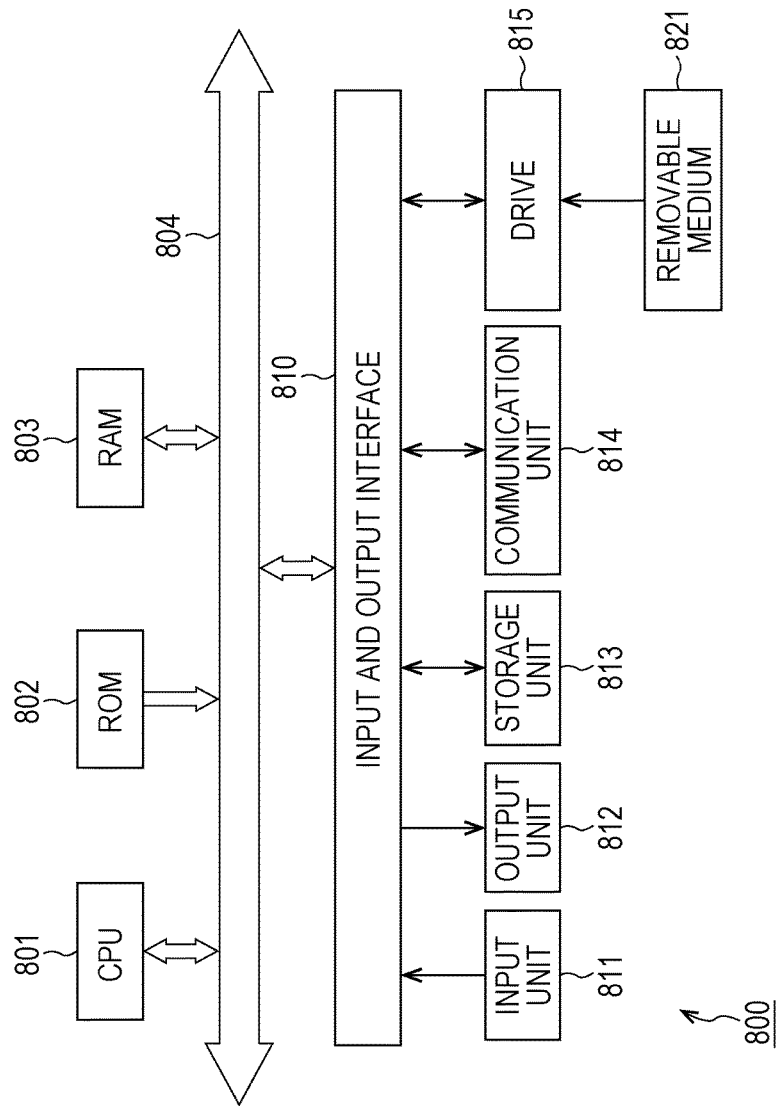
FIG. 30 is a block diagram illustrating a main configuration example of a computer.

FIG. 30 is a block diagram illustrating a configuration example of hardware of a computer which performs the above-described series of processes according to a program.

In the computer 800, a central processing unit (CPU) 801, a read only memory (ROM) 802, and a random access memory (RAM) 803 are connected to each other via a bus 804.

The bus 804 is also connected to an input and output interface 805. The input and output interface 805 is connected to an input unit 806, an output unit 807, a storage unit 508, a communication unit 509, and a drive 810.

The input unit 806 includes a keyboard, a mouse, a microphone, and the like. The output unit 807 includes a display, a speaker, and the like. The storage unit 808 includes a hard disk, a nonvolatile memory, or the like. The communication unit 809 includes a network interface or the like. The drive 810 drives a removable medium 811 such as a magnetic disk, an optical disc, a magneto-optical disc, a semiconductor memory, or the like.

In the computer configured in this way, the CPU 801 performs the above-described series of processes, for example, by loading the program stored in the storage unit 808 to the RAM 803 via the input and output interface 805 and the bus 804 and executing the program.

The program executed by the computer 800 (the CPU 801) may be recorded on the removable medium 811, for example, as a package medium, and may be provided. In addition, the program may be provided via a wired or wireless transmission medium such as a local area network, the Internet, or a digital satellite broadcast.

In the computer, the program may be installed in the storage unit 808 via the input and output interface 805 by installing the removable medium 811 in the drive 810. In addition, the program may be received by the communication unit 809 via a wired or wireless transmission medium and may be installed in the storage unit 808. Further, the program may be installed in the ROM 802 or the storage unit 808 in advance.

In addition, the program executed by the computer may be a program which performs processes in a time series according to the order described in the present specification, and may be a program which performs processes in parallel or at a necessary timing such as when accessed.

Further, in the present specification, the steps for describing programs recorded on a recording medium include not only processes performed in a time series according to the described order, but also processes performed in parallel or separately even if not necessarily performed in the time series.

In addition, in the present specification, the system refers to the entire apparatus including a plurality of devices.

Further, in the above description, a configuration described as a single device (or a processing unit) may be divided and formed by a plurality of devices (or processing units). Conversely, in the above description, configurations described as a plurality of devices (or processing units) may be formed by a single device (or a processing unit) altogether. In addition, configurations other than those described above may be added to the configuration of each device (or each processing unit). Further, a part of the configuration of one device (or a processing unit) may be included in the configuration of another device (or another processing unit) as long as the configuration and operations of the overall system are substantially the same. In other words, the present technology is not limited to the above-described embodiments but may have various modifications in the scope without departing from the spirit of the present technology.

The image coding device and the image decoding device according to the above-described embodiment is applicable to various electronic apparatuses such as a transmitter or a receiver in delivery on satellite broadcasting, cable broadcasting such as cable TV, and the Internet, and delivery to a terminal by cellular communication, a recording apparatus which records images on media such as an optical disc, a magnetic disk, and a flash memory, and a reproduction apparatus which reproduces images from the storage media. Hereinafter, four application examples will be described.

6. Application Examples

[First Application Example: Television Receiver]

Figure 31:
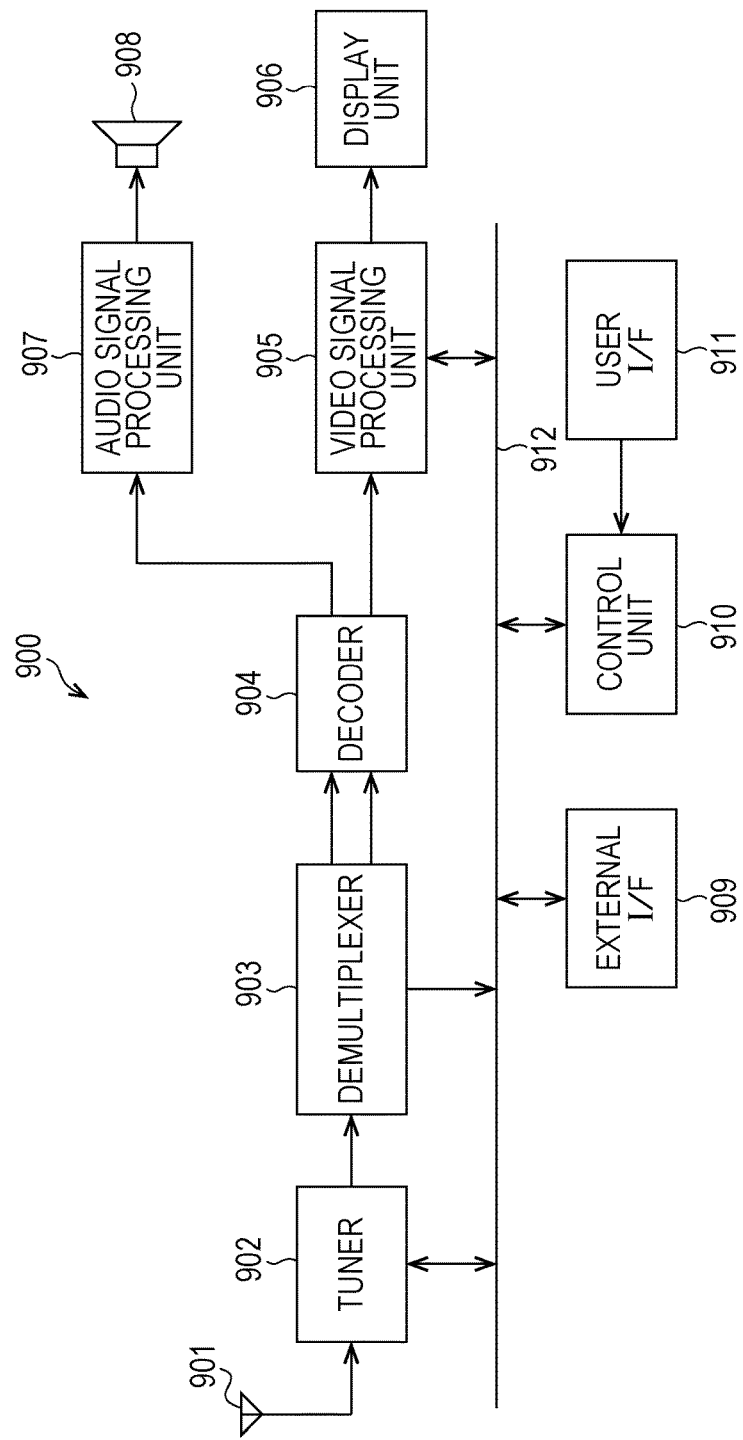
FIG. 31 is a block diagram illustrating an example of a schematic configuration of a television apparatus.

FIG. 31 illustrates an example of a schematic configuration of a television apparatus to which the above-described embodiment is applied. The television apparatus 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from a broadcast signal which is received via the antenna 901, and demodulates the extracted signal. In addition, the tuner 902 outputs a coded bit stream which is obtained through the demodulation, to the demultiplexer 903. In other words, the tuner 902 functions as transmission means in the television apparatus 900, for receiving the coded stream in which an image is coded.

The demultiplexer 903 demultiplexes a video stream and an audio stream of a viewing target program from the coded stream, and outputs the demultiplexed streams to the decoder 904. In addition, the demultiplexer 903 extracts auxiliary data such as electronic program guide (EPG) from the coded bit stream, and supplies the extracted data to the control unit 910. Further, the demultiplexer 903 may perform descrambling when the coded bit stream is scrambled.

The decoder 904 decodes the image stream and the audio stream which are input from the demultiplexer 903. In addition, the decoder 904 outputs image data which is generated due to the decoding process, to the video signal processing unit 905. Further, the decoder 904 outputs audio data which is generated due to the decoding process, to the audio signal processing unit 907.

The video signal processing unit 905 reproduces the image data input from the decoder 904 so that an image is displayed on the display unit 906. In addition, the video signal processing unit 905 may display an application screen which is supplied via a network, on the display unit 906.

Further, the video signal processing unit 905 may perform an additional process such as, for example, noise removal, on the image data, in accordance with settings thereof. Furthermore, the video signal processing unit 905 may generate a graphical user interface (GUI) image such as, for example, a menu, a button, or a cursor, and may superimpose the generated image on the output image.

The display unit 906 is driven by a driving signal which is supplied from the video signal processing unit 905, and displays a video or an image on a screen of a display device (for example, a liquid crystal display, a plasma display, or an organic electroluminescence display (OLED)).

The audio signal processing unit 907 performs reproduction processes such as D/A conversion and amplification on the audio data which is input from the decoder 904, so as to allow sound to be output from the speaker 908. In addition, the audio signal processing unit 907 may perform an additional process such as noise removal on the audio data.

The external interface 909 is an interface which connects the television apparatus 900 to an external apparatus or the network. For example, a video stream or an audio stream which is received via the external interface 909 may be decoded by the decoder 904. In other words, the external interface 909 also functions as transmission means in the television apparatus 900, for receiving a coded stream in which an image is coded.

The control unit 910 includes a processor such as a CPU, and memories such as a RAM and a ROM. The memories store a program executed by the CPU, program data, EPG data, data acquired via the network, and the like. The program stored in the memories is read and executed by the CPU, for example, when the television apparatus 900 is started. The CPU executes the program, and thus controls an operation of the television apparatus 900 in response to, for example, an operation signal which is input from the user interface 911.

The user interface 911 is connected to the control unit 910. The user interface 911 includes, for example, buttons and switches which allow a user to operate the television apparatus 900, a reception unit of a remote control signal, and the like. The user interface 911 generates an operation signal by detecting an operation performed by a user via these constituent elements, and outputs the generated operation signal to the control unit 910.

The bus 912 connects the tuner 902, the demultiplexer 903, the decoder 904, the video signal processing unit 905, the audio signal processing unit 907, the external interface 909, and the control unit 910, to each other.

In the television apparatus 900 with the above configuration, the decoder 904 has a function of the image decoding device according to the above-described embodiment. Accordingly, when an image is decoded in the television apparatus 900, it is possible to improve process efficiency through a parallel process during decoding of a motion vector.

[Second Application Example: Mobile Phone]

Figure 32:
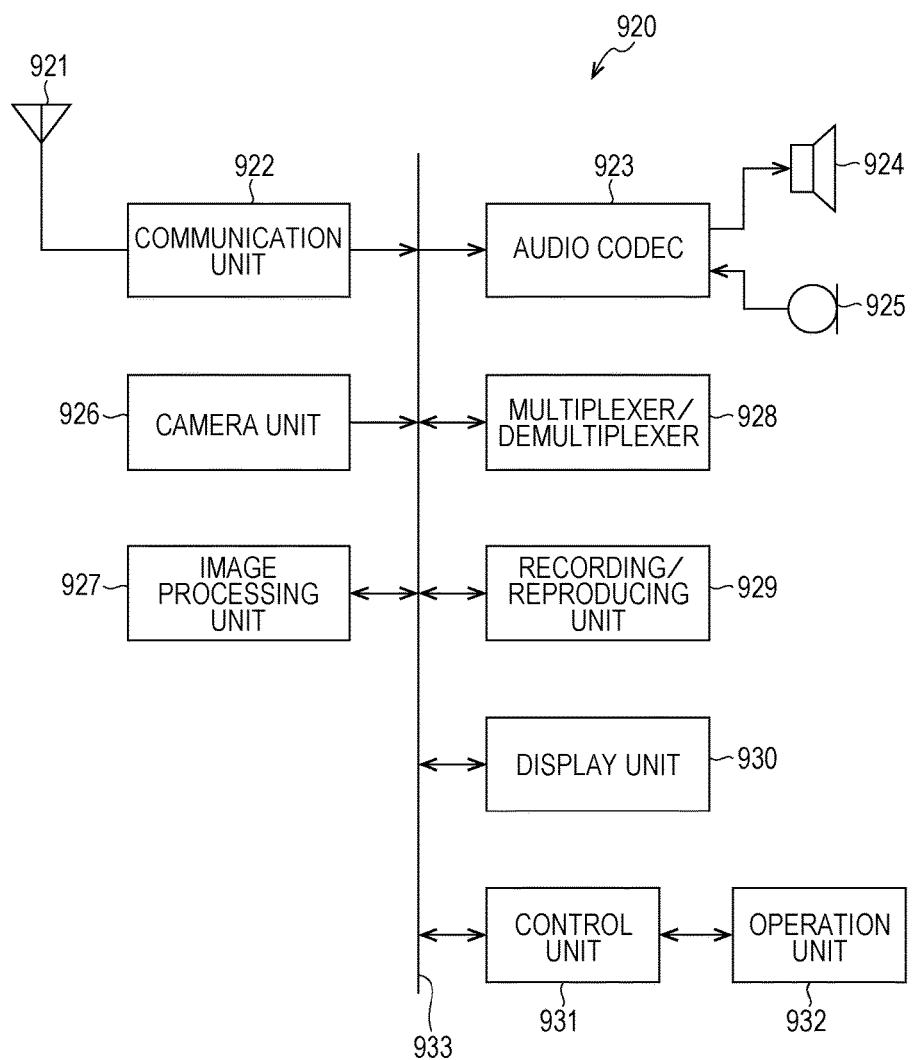
FIG. 32 is a block diagram illustrating an example of a schematic configuration of a mobile phone.

FIG. 32 illustrates an example of a schematic configuration of a mobile phone to which the above-described embodiment is applied. The mobile phone 920 includes an antenna 921, a communication unit 922, an audio codec 923, a speaker 924, a microphone 925, a camera unit 926, an image processing unit 927, a multiplexer/demultiplexer 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 connects the communication unit 922, the audio codec 923, the camera unit 926, the image processing unit 927, the multiplexer/demultiplexer 928, the recording/reproducing unit 929, the display unit 930, and the control unit 931, to each other.

The mobile phone 920 performs operations such as transmission and reception of audio signals, transmission and reception of electronic mails or image data, capturing of an image, and recording of data in various operation modes including a speech mode, a data communication mode, a photographing mode, and a videophone mode.

In the speech mode, an analog audio signal generated by the microphone 925 is supplied to the audio codec 923. The audio codec 923 converts the analog audio signal into audio data, and compresses the converted audio data through A/D conversion. In addition, the audio codec 923 outputs the compressed audio data to the communication unit 922. The communication unit 922 codes and modulates the audio data so as to generate a transmission signal. Further, the communication unit 922 transmits the generated transmission signal to a base station (not illustrated) via the antenna 921. Furthermore, the communication unit 922 amplifies a wireless signal which is received via the antenna 921 and converts a frequency thereof, so as to acquire a received signal. Moreover, the communication unit 922 demodulates and decodes the received signal so as to generate audio data, and outputs the generated audio data to the audio codec 923. The audio codec 923 decompresses and D/A converts the audio data so as to generate an analog audio signal. In addition, the audio codec 923 supplies the generated audio signal to the speaker 924 so as to output a sound.

Further, in the data communication mode, for example, the control unit 931 generates text data forming an electronic mail in response to an operation performed by a user using the operation unit 932. Furthermore, the control unit 931 displays text on the display unit 930. Moreover, the control unit 931 generates electronic mail data in response to a transmission instruction made by the user by using the operation unit 932, and outputs the generated electronic mail data to the communication unit 922. The communication unit 922 codes and modulates the electronic mail data so as to generate a transmission signal. In addition, the communication unit 922 transmits the generated transmission signal to the base station (not illustrated) via the antenna 921. Further, the communication unit 922 amplifies a wireless signal which is received via the antenna 921 and converts a frequency thereof so as to acquire a received signal. Furthermore, the communication unit 922 demodulates and decodes the received signal so as to recover electronic mail data, and outputs the recovered electronic mail data to the control unit 931. The control unit 931 displays content of the electronic mail on the display unit 930 and stores the electronic mail data on a recording medium of the recording/reproducing unit 929.

The recording/reproducing unit 929 includes any readable and writable storage medium. For example, the storage medium may be a built-in storage medium such as a RAM or a flash memory, and may be an externally attached storage medium such as a hard disk, a magnetic disk, a magneto-optical disc, an optical disc, an unallocated space bitmap (USB) memory, or a memory card.

In addition, in the photographing mode, for example, the camera unit 926 images a subject so as to generate image data, and outputs the generated image data to the image processing unit 927. The image processing unit 927 codes the image data which is input from the camera unit 926, and stores the coded stream on the storage medium of the recording/reproducing unit 929.

Further, in the videophone mode, for example, the multiplexer/demultiplexer 928 multiplexes the image stream which has been coded by the image processing unit 927 and the audio stream which is input from the audio codec 923, and outputs the multiplexed stream to the communication unit 922. The communication unit 922 codes and modulates the stream so as to generate a transmission signal. Furthermore, the communication unit 922 transmits the generated transmission signal to the base station (not illustrated) via the antenna 921. In addition, the communication unit 922 amplifies a wireless signal which is received via the antenna 921 and converts a frequency thereof so as to acquire a received signal. A coded stream may be included in the transmission signal and received signal. Further, the communication unit 922 demodulates and decodes the received signal so as to recover a stream, and outputs the recovered stream to the multiplexer/demultiplexer 928. The multiplexer/demultiplexer 928 demultiplexes an image stream and an audio stream from the input stream, and outputs the video stream to the image processing unit 927 and the audio stream to the audio codec 923. The image processing unit 927 decodes the image stream so as to generate image data. The image data is supplied to the display unit 930 so as to allow a series of images to be displayed on the display unit 930. The audio codec 923 decompresses and D/A converts the audio stream so as to generate an analog audio signal. Furthermore, the audio codec 923 supplies the generated audio signal to the speaker 924 so as to output a sound.

In the mobile phone 920 with the above configuration, the image processing unit 927 has functions of the image coding device and the image decoding device according to the above-described embodiment. Accordingly, when an image is coded and decoded in the mobile phone 920, it is possible to improve process efficiency through a parallel process during coding or decoding of a motion vector.

[Third Application Example: Recording/Reproducing Apparatus]

Figure 33:
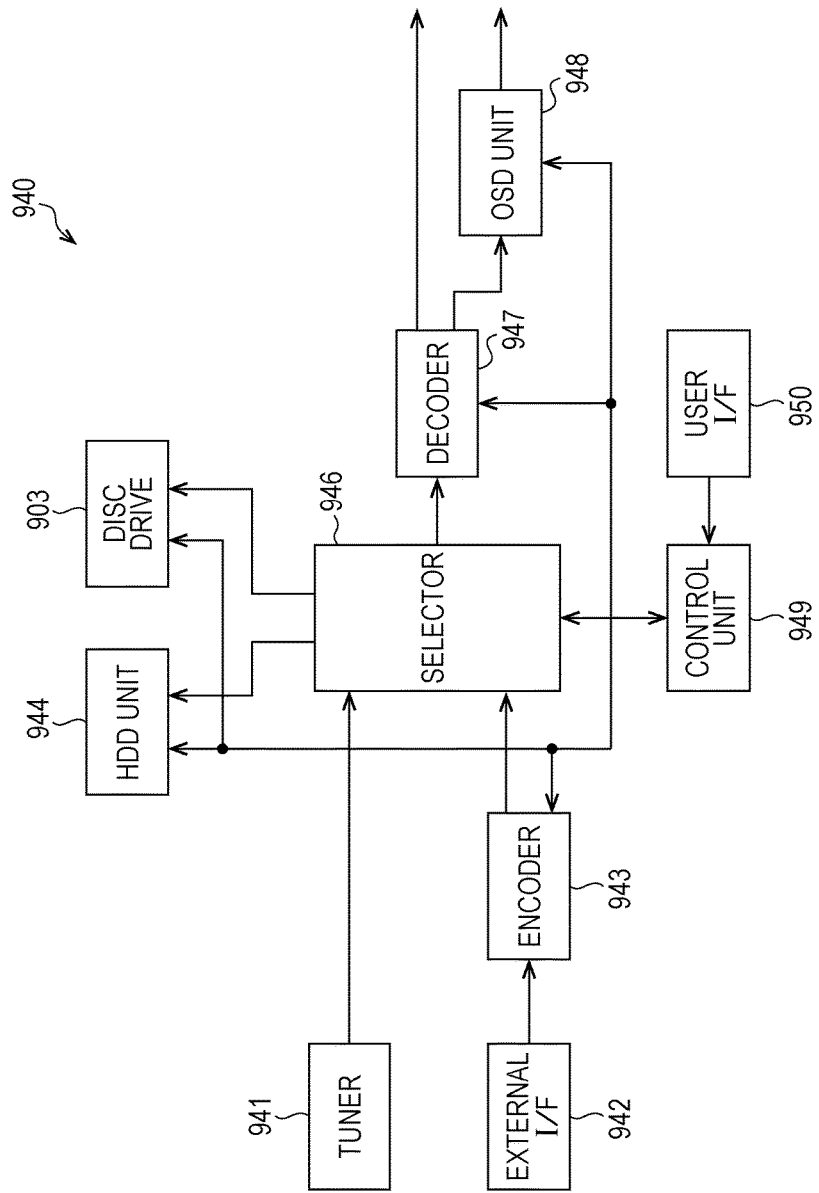
FIG. 33 is a block diagram illustrating an example of a schematic configuration of a recording/reproducing apparatus.

FIG. 33 illustrates an example of a schematic configuration of a recording/reproducing apparatus to which the above-described embodiment is applied. The recording/reproducing apparatus 940 codes, for example, audio data and image data of a received broadcast program, and records the coded data on a recording medium. In addition, the recording/reproducing apparatus 940 may code, for example, audio data and image data which are acquired from other apparatuses, and may record the coded data on the recording medium. Further, the recording/reproducing apparatus 940 reproduces the data recorded on the recording medium on a monitor and a speaker, for example, in response to an instruction from a user. At this time, the recording/reproducing apparatus 940 decodes the audio data and the video data.

The recording/reproducing apparatus 940 includes a tuner 941, an external interface 942, an encoder 943, a hard disk drive (HDD) 944, a disc drive 945, a selector 946, a decoder 947, an on-screen display (OSD) 948, a control unit 949, and a user interface 950.

The tuner 941 extracts a signal of a desired channel from a broadcast signal which is received via an antenna (not illustrated), and demodulates the extracted signal. In addition, the tuner 941 outputs a coded bit stream which is obtained through the demodulation, to the selector 946. In other words, the tuner 941 functions as transmission means in the recording/reproducing apparatus 940.

The external interface 942 is an interface which connects the recording/reproducing apparatus 940 to an external apparatus or a network. The external interface 942 may be, for example, an IEEE 1394 interface, a network interface, a USB interface, a flash memory interface, or the like. For example, image data and audio data which are received via the external interface 942 are input to the encoder 943. In other words, the external interface 942 functions as transmission means in the recording/reproducing apparatus 940.

The encoder 943 codes the image data and the audio data in a case where the video data and the audio data input from the external interface 942 are not coded. In addition, the encoder 943 outputs the coded bit stream to the selector 946.

The HDD 944 records a coded bit stream in which content data such as a video and a sound is compressed, various programs, and other data in an internal hard disk. In addition, the HDD 944 reads the data from the hard disk when the video and the sound are reproduced.

The disc drive 945 records and reads data on and from a recording medium which is installed therein. The recording medium installed in the disc drive 945 may be, for example, a DVD disc (DVD-Video, DVD-RAM, DVD-R, DVD-RW, DVD+R, DVD+RW, or the like), a Blu-ray (registered trademark) disc, or the like.

When a video and a sound are recorded, the selector 946 selects a coded bit stream which is input from the tuner 941 or the encoder 943, and outputs the selected coded bit stream to the HDD 944 or the disc drive 945. In addition, when a video and a sound are reproduced, the selector 946 outputs a coded bit stream which is input from the HDD 944 or the disc drive 945, to the decoder 947.

The decoder 947 decodes the coded bit stream so as to generate video data and audio data. In addition, the decoder 947 outputs the generated video data to the OSD 948. Further, the decoder 904 outputs the generated audio data to an external speaker.

The OSD 948 reproduces the video data which is input from the decoder 947 so as to display an image. In addition, the OSD 948 may superimpose a GUI image such as, for example, a menu, a button, or a cursor on the displayed image.

The control unit 949 includes a processor such as a CPU, and memories such as a RAM and a ROM. The memories store a program executed by the CPU, program data, and the like. The program stored in the memories is read and executed by the CPU, for example, when the recording/reproducing apparatus 940 is started. The CPU executes the program, and thus controls an operation of the recording/reproducing apparatus 940 in response to, for example, an operation signal which is input from the user interface 950.

The user interface 950 is connected to the control unit 949. The user interface 950 includes, for example, buttons and switches which allow a user to operate the recording/reproducing apparatus 940, a reception unit of a remote control signal, and the like. The user interface 950 generates an operation signal by detecting an operation performed by a user via these constituent elements, and outputs the generated operation signal to the control unit 949.

In the recording/reproducing apparatus 940 with the above configuration, the encoder 943 has a function of the image coding device according to the above-described embodiment. In addition, the decoder 947 has a function of the image decoding device according to the above-described embodiment. Accordingly, when an image is coded and decoded in the recording/reproducing apparatus 940, it is possible to improve process efficiency through a parallel process during coding or decoding of a motion vector.

Figure 34:
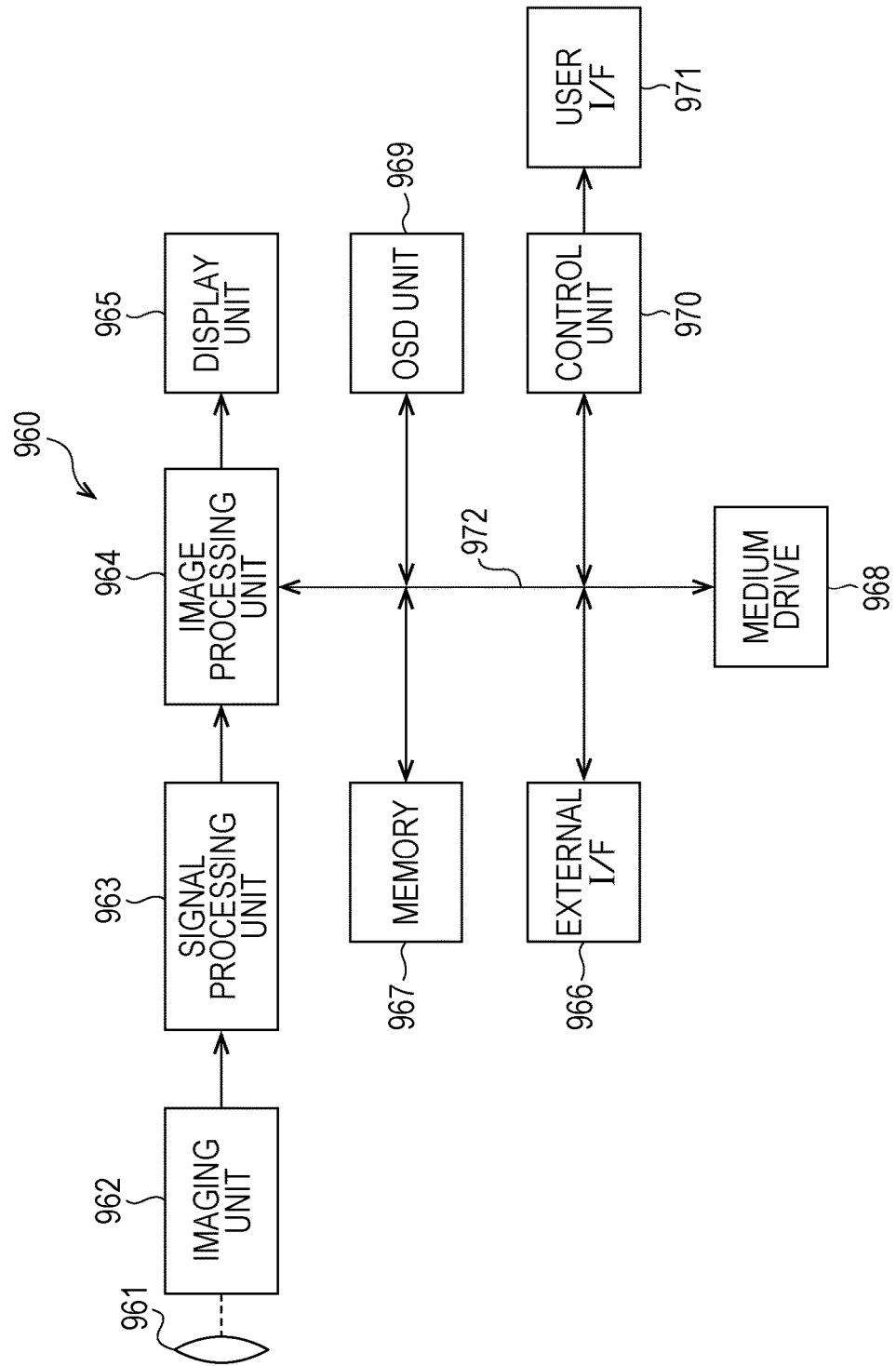
FIG. 34 is a block diagram illustrating an example of a schematic configuration of an imaging apparatus.

[Fourth application example: imaging apparatus] FIG. 34 illustrates an example of a schematic configuration of an imaging apparatus to which the above-described embodiment is applied. The imaging apparatus 960 images a subject so as to generate an image, and codes image data so as to record the coded data on a recording medium.

The imaging apparatus 960 includes an optical block 961, an imaging unit 962, a signal processing unit 963, an image processing unit 964, a display unit 965, an external interface 966, a memory 967, a medium drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 connects the image processing unit 964, the external interface 966, the memory 967, the medium drive 968, the OSD 969, and the control unit 970, to each other.

The optical block 961 includes a focus lens, a diaphragm mechanism, and the like. The optical block 961 forms an optical image of a subject on an imaging surface of the imaging unit 962. The imaging unit 962 includes an image sensor such as a charge coupled device (CCD) or a complementary metal oxide semiconductor (CMOS), and converts the optical image formed on the imaging surface into an image signal as an electrical signal through photoelectric conversion. In addition, the imaging unit 962 outputs the image signal to the signal processing unit 963.

The signal processing unit 963 performs various camera signal processes such as knee correction, gamma correction, and color correction, on the image signal which is input from the imaging unit 962. The signal processing unit 963 outputs the image data having undergone the camera signal processes to the image processing unit 964.

The image processing unit 964 codes the image data which is input from the signal processing unit 963 so as to generate coded data. In addition, the image processing unit 964 outputs the generated coded data to the external interface 966 or the medium drive 968. Further, the image processing unit 964 decodes the coded data which is input from the external interface 966 or the medium drive 968, so as to generate image data. Furthermore, the image processing unit 964 outputs the generated image data to the display unit 965. Moreover, the image processing unit 964 may output image data which is input from the signal processing unit 963, to the display unit 965, so as to display an image. In addition, the image processing unit 964 may superimpose display data which is acquired from the OSD 969, on an image which is output to the display unit 965.

The OSD 969 generates a GUI image such as, for example, a menu, a button, or a cursor, and outputs the generated image to the image processing unit 964.

The external interface 966 is formed by, for example, a USB input and output terminal. The external interface 966 connects the imaging apparatus 960 to a printer, for example, when an image is printed. In addition, the external interface 966 is connected to a drive as necessary. A removable medium such as, for example, a magnetic disk or an optical disc may be installed in the drive, and a program read from the removable medium may be installed in the imaging apparatus 960. Further, the external interface 966 may be configured as a network interface which is connected to a network such as a LAN or the Internet. In other words, the external interface 966 functions as transmission means in the imaging apparatus 960.

A recording medium installed in the medium drive 968 may be any readable and writable removable medium such as, for example, a magnetic disk, a magneto-optical disc, an optical disc, or a semiconductor memory. In addition, a recording medium may be fixedly installed in the medium drive 968, so as to configure a non-portable storage unit such as, for example, a built-in hard disk drive or a solid state drive (SSD).

The control unit 970 includes a processor such as a CPU, and memories such as a RAM and a ROM. The memories store a program executed by the CPU, program data, and the like. The program stored in the memories is read and executed by the CPU, for example, when the imaging apparatus 960 is started. The CPU executes the program, and thus controls an operation of the imaging apparatus 960 in response to, for example, an operation signal which is input from the user interface 971.

The user interface 971 is connected to the control unit 970. The user interface 971 includes, for example, buttons and switches which allow a user to operate the imaging apparatus 960, and the like. The user interface 971 generates an operation signal by detecting an operation performed by a user via these constituent elements, and outputs the generated operation signal to the control unit 970.

In the imaging apparatus 960 with the above configuration, the image processing unit 964 has functions of the image coding device and the image decoding device according to the above-described embodiment. Accordingly, when an image is coded and decoded in the imaging apparatus 960, it is possible to improve process efficiency through a parallel process during coding or decoding of a motion vector.

7. Application Examples of Scalable Coding

[First System]
Next, with reference to FIG. 35, a description will be made of a specific example of using scalable coded (layer coded) data which is scalably coded, described with reference to FIGS. 27 to 29. The scalable coding is used, for example, to select data to be transmitted as in an example illustrated in FIG. 35.

Figure 35:
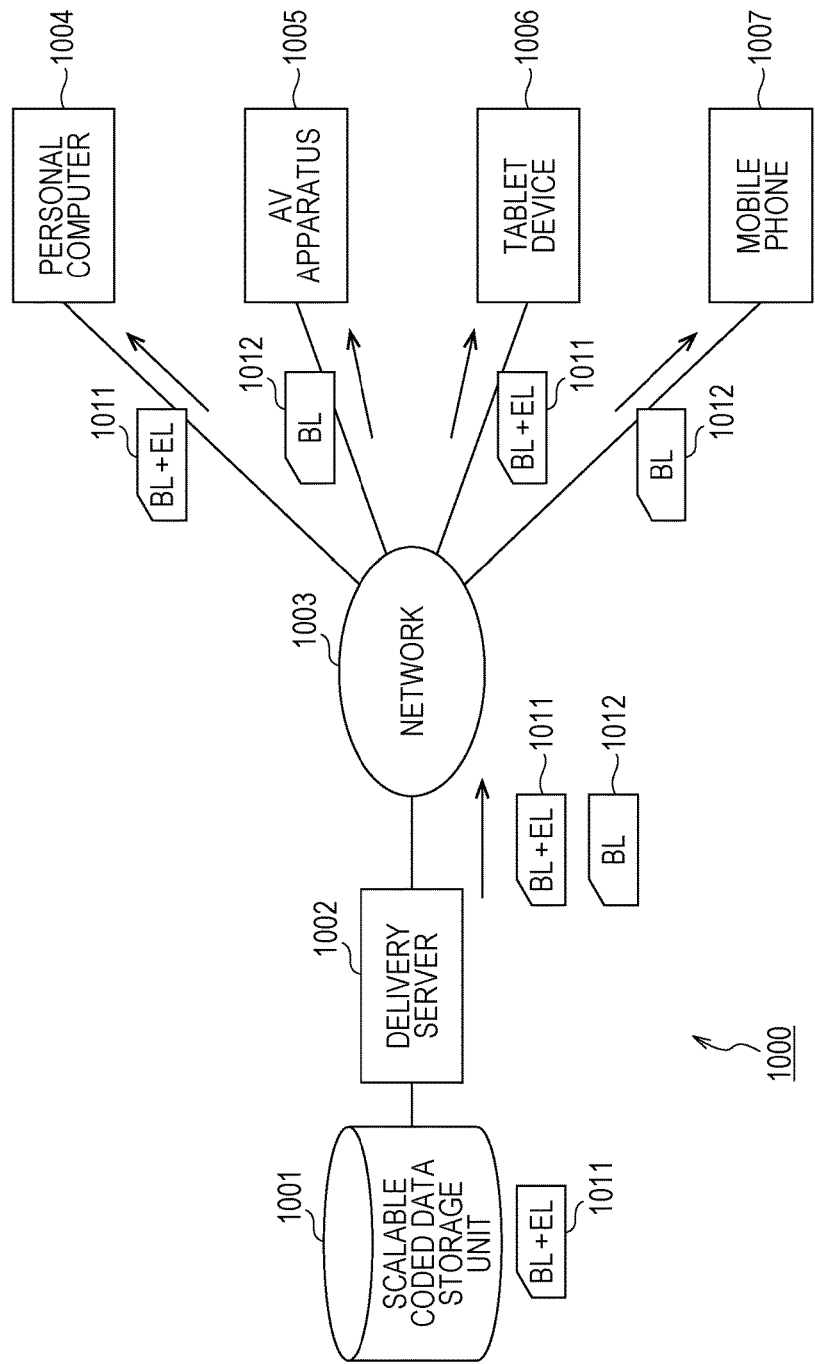
FIG. 35 is a block diagram illustrating an example of using scalable coding.

In a data transmission system 1000 illustrated in FIG. 35, a delivery server 1002 reads the scalable coded data stored in the scalable coded data storage unit 1001, and delivers the scalable coded data to terminal apparatuses such as a personal computer 1004, an AV apparatus 1005, a tablet device 1006, and a mobile phone 1007 via a network 1003.

At this time, the delivery server 1002 selects and transmits coded data with appropriate quality on the basis of performances of the terminal apparatuses, communication circumstances, or the like. If the delivery server 1002 unnecessarily transmits high quality data, it cannot be said that a high quality image is obtained in the terminal apparatus, and there is a concern that delay or overflow may occur. In addition, there is a concern that high quality data may unnecessarily occupy a communication band, and may unnecessarily increase a load on the terminal apparatus. Conversely, if the delivery server 1002 unnecessarily transmits low quality data, there is a concern that an image with sufficient image quality may not be obtained in the terminal apparatus. For this reason, the delivery server 1002 reads and transmits scalable coded data with quality which is suitable for the performances of the terminal apparatuses or the communication circumstances from the scalable coded data storage unit 1001.

Here, it is assumed that the scalable coded data storage unit 1001 stores scalable coded data (BL+EL) 1011 which is scalably coded. The scalable coded data (BL+EL) 1011 is coded data including both a base layer and an enhancement layer, and is data which allows both a base layer image and an enhancement layer image to be obtained through decoding.

The delivery server 1002 selects an appropriate layer on the basis of a performance of a terminal apparatus which receives data or communication circumstances, and reads data of the layer. For example, the delivery server 1002 reads the scalable coded data (BL+EL) 1011 which has high quality from the scalable coded data storage unit 1001, and transmits the data as it is, in relation to the personal computer 1004 or the tablet device 1006 having a high processing performance. In contrast, for example, in relation to the AV apparatus 1005 or the mobile phone 1007 having a low processing performance, the delivery server 1002 extracts base layer data from the scalable coded data (BL+EL) 1011, and transmits the data as scalable coded data (BL) 1012 which is the same content data as the scalable coded data (BL+EL) 1011 in terms of content but has lower quality than the scalable coded data (BL+EL) 1011.

As mentioned above, since a data amount can be easily adjusted by using the scalable coded data, it is possible to minimize the occurrence of delay or overflow or to minimize an unnecessary increase in a load on a terminal apparatus or a communication medium. In addition, redundancy between layers is reduced in the scalable coded data (BL+EL) 1011, and thus a data amount thereof can be further reduced than in a case where coded data of each layer is used as separate data. Therefore, a storage region of the scalable coded data storage unit 1001 can be used more efficiently.

In addition, various apparatuses such as the personal computer 1004 to the mobile phone 1007 can be employed as terminal apparatuses and thus performances of hardware of the terminal apparatuses are different depending on the apparatuses. Further, there are various applications which are executed by the terminal apparatuses, and thus there are also various performances of software thereof. Furthermore, all communication line networks including a wired network, a wireless network, or both networks such as, for example, the Internet or a local area network (LAN) can be employed as the network 1003 which is a communication medium, and there are various data transmission performances. Moreover, there is a concern that a data transmission performance may vary depending on other communication circumstances or the like.

Therefore, before starting data transmission, the delivery server 1002 may perform communication with a terminal apparatus which is a transmission destination of the data, so as to obtain information regarding performances of the terminal apparatus such as a hardware performance of the terminal apparatus and a performance of an application (software) executed by the terminal apparatus, and information regarding communication circumstances such as an available bandwidth of the network 1003. In addition, the delivery server 1002 may select an appropriate layer on the basis of the information obtained here.

Further, the extraction of a layer may be performed by the terminal apparatus. For example, the personal computer 1004 may decode the transmitted scalable coded data (BL+EL) 1011 and may display a base layer image and may display an enhancement layer image. Furthermore, for example, the personal computer 1004 may extract the base layer scalable coded data (BL) 1012 from the transmitted scalable coded data (BL+EL) 1011 so as to store the data, to transmit the data to other devices, or to decode the data for display of a base layer image.

Of course, the number of scalable coded data storage units 1001, the number of delivery servers 1002, the number of networks 1003, and the number of terminal apparatuses are all arbitrary. In addition, in the above description, a description has been made of an example in which the delivery server 1002 transmits data to the terminal apparatus, but a usage example is not limited thereto. The data transmission system 1000 is applicable to any system as long as the system selects and transmits an appropriate layer on the basis of a performance of a terminal apparatus, communication circumstances, or the like when coded data which is scalably coded is transmitted to the terminal apparatus.

In addition, the present technology is also applied to the above-described data transmission system 1000 as illustrated in FIG. 35 in the same manner as in the application thereof to the layer coding and layer decoding described with reference to FIGS. 27 to 29, and thus it is possible to achieve the effects described with reference to FIGS. 27 to 29.

[Second System]

Figure 36:
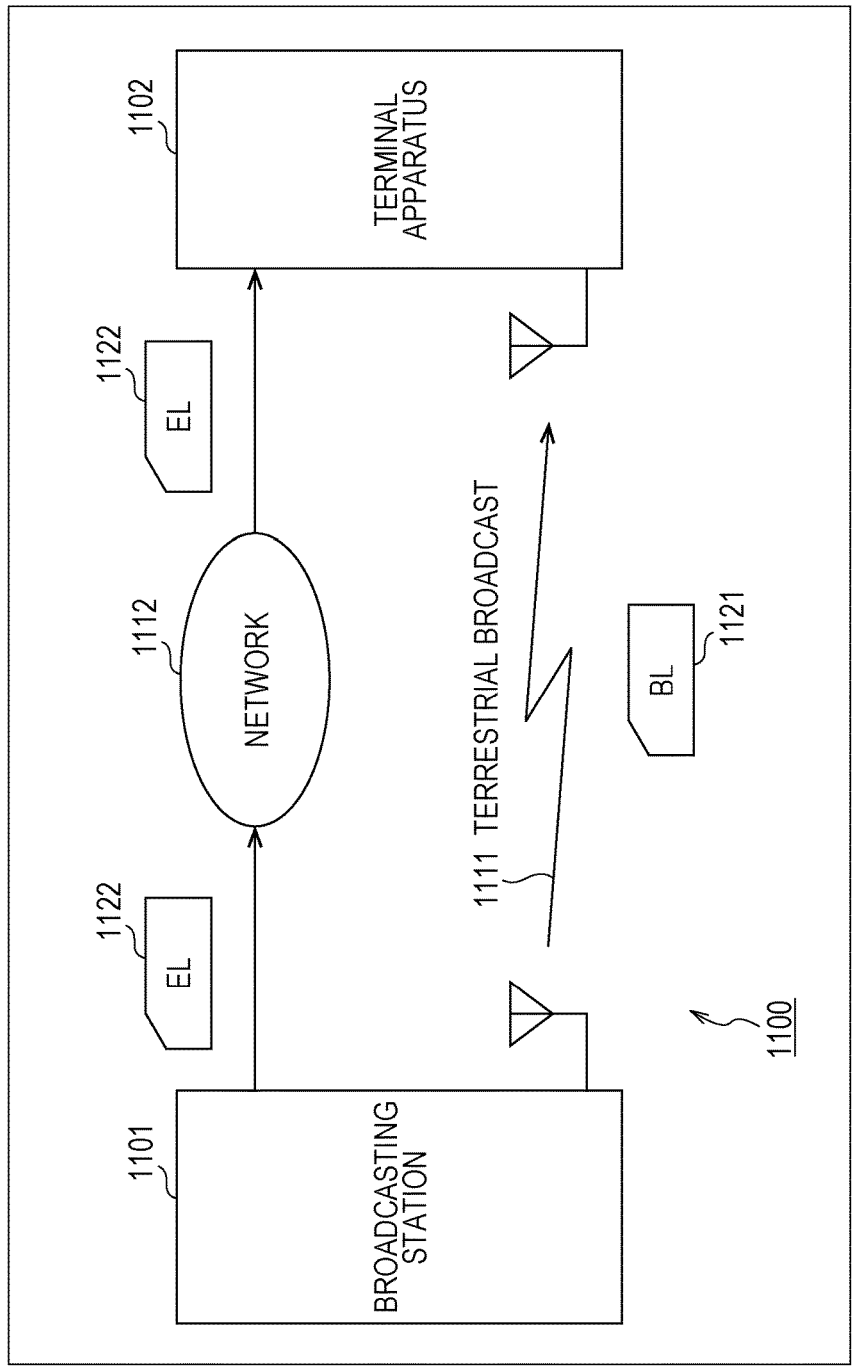
FIG. 36 is a block diagram illustrating another example of using scalable coding.

The scalable coding is used, for example, for transmission using a plurality of communication media as in an example illustrated in FIG. 36.

In a data transmission system 1100 illustrated in FIG. 36, a broadcasting station 1101 transmits base layer scalable coded data (BL) 1121 by using a terrestrial broadcast 1111. In addition, the broadcasting station 1101 transmits (for example, packetizes and transmits) enhancement layer scalable coded data (EL) 1122 via any network 1112 formed by a wired network, a wireless network, or both networks.

A terminal apparatus 1102 has a reception function of the terrestrial broadcast 1111 which is broadcasted by the broadcasting station 1101, and receives the base layer scalable coded data (BL) 1121 which is transmitted via the terrestrial broadcast 1111. In addition, the terminal apparatus 1102 further has a communication function of performing communication using the network 1112, and receives the enhancement layer scalable coded data (EL) 1122 which is transmitted via the network 1112.

The terminal apparatus 1102 may decode the base layer scalable coded data (BL) 1121 which is acquired via the terrestrial broadcast 1111, for example, in response to an instruction from a user, so as to obtain a base layer image, to store the image, and to transmit the image to other apparatuses.

In addition, for example, in response to an instruction from a user, the terminal apparatus 1102 may combine the base layer scalable coded data (BL) 1121 which is acquired via the terrestrial broadcast 1111 with the enhancement layer scalable coded data (EL) 1122 which is acquired via the network 1112 so as to obtain scalable coded data (BL+EL), and may decode the data so as to obtain an enhancement layer image, to store the image, and to transmit the image to other apparatuses.

As mentioned above, the scalable coded data may be transmitted via a communication medium which is different for each layer, for example. In this case, a load can be distributed, and thus it is possible to minimize the occurrence of delay or overflow.

In addition, a communication medium used for transmission may be selected for each layer depending on circumstances. For example, the base layer scalable coded data (BL) 1121 having a relatively large amount of data may be transmitted via a communication media having a large bandwidth, and the enhancement layer scalable coded data (EL) 1122 having a relatively small amount of data may be transmitted via a communication medium having a small bandwidth. In addition, for example, a communication medium for transmitting the enhancement layer scalable coded data (EL) 1122 may be changed between the network 1112 and the terrestrial broadcast 1111 depending on an available bandwidth of the network 1112. Of course, this is also the same for data of any layer.

The control is performed as mentioned above, and thus it is possible to further minimize an increase in a load in data transmission.

Of course, the number of layers is arbitrary, and the number of communication media used for transmission is also arbitrary. Further, the number of terminal apparatuses 1102 serving as a data transmission destination is also arbitrary. Furthermore, in the above description, the description has been made of broadcasting from the broadcasting station 1101 as an example, but a usage example is not limited thereto. The data transmission system 1100 is applicable to any system as long as the system splits coded data which is scalably coded into a plurality of data items in the unit of layers and transmits the data items via a plurality of lines.

In addition, the present technology is also applied to the above-described data transmission system 1100 as illustrated in FIG. 36 in the same manner as in the application thereof to the layer coding and layer decoding described with reference to FIGS. 27 to 29, and thus it is possible to achieve the effects described with reference to FIGS. 27 to 29.

[Third System]

Figure 37:
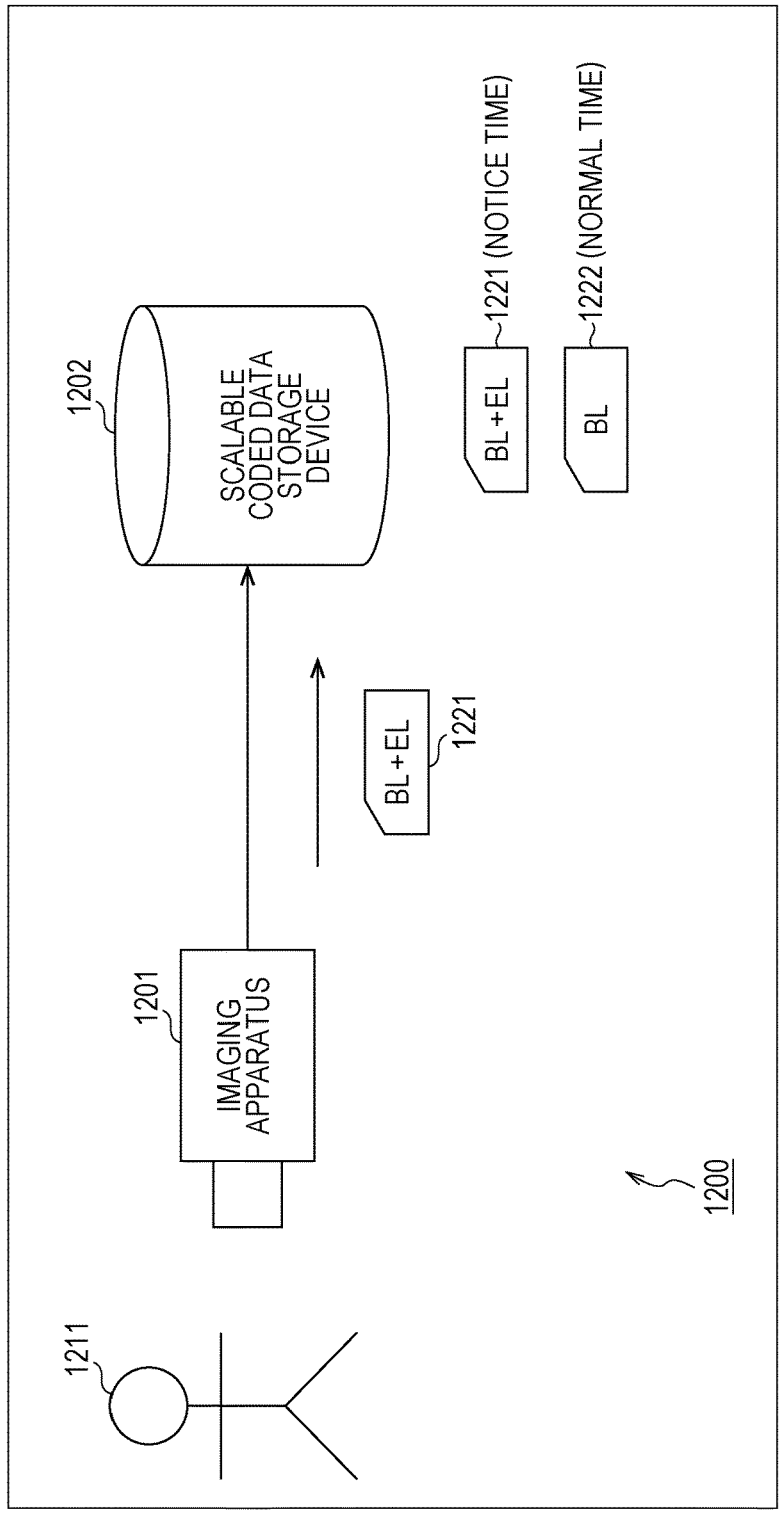
FIG. 37 is a block diagram illustrating still another example of using scalable coding.

The scalable coding is used, for example, to store coded data as in an example illustrated in FIG. 37.

In an imaging system 1200 illustrated in FIG. 37, an imaging apparatus 1201 scalably codes image data which is obtained by imaging a subject 1211, and supplies resultant data to a scalable coded data storage device 1202 as scalable coded data (BL+EL) 1221.

The scalable coded data storage device 1202 stores the scalable coded data (BL+EL) 1221 which is supplied from the imaging apparatus 1201, with quality based on circumstances. For example, in a case of the normal time, the scalable coded data storage device 1202 extracts base layer data from the scalable coded data (BL+EL) 1221, and stores the data as base layer scalable coded data (BL) 1222 having a small amount of data with low quality. In contrast, for example, in a case of the notice time, the scalable coded data storage device 1202 stores the scalable coded data (BL+EL) 1221 having a large amount of data with high quality as it is.

Accordingly, since the scalable coded data storage device 1202 can preserve an image with high quality as necessary only, it is possible to minimize an increase in a data amount while minimizing a reduction in the value of an image due to image quality deterioration, and thus to improve use efficiency of a storage region.

For example, the imaging apparatus 1201 is assumed to be a monitoring camera. In a case (a case of the normal time) where a monitoring target (for example, an trespasser) is not reflected in a captured image, there is a high probability that content of the captured image may not be important, and thus a reduction in a data amount is prioritized, and the image data (scalable coded data) is stored with low quality. In contrast, in a case (a case of the notice time) where a monitoring target is reflected in a captured image as the subject 1211, there is a high probability that content of the captured image may be important, and thus image quality is prioritized, and the image data (scalable coded data) is stored with high quality.

In addition, the normal time and the notice time may be determined, for example, by the scalable coded data storage device 1202 analyzing an image. Further, the normal time and the notice time may be determined, for example, by the imaging apparatus 1201, and a determination result may be transmitted to the scalable coded data storage device 1202.

In addition, a determination criterion of the normal time and the notice time is arbitrary, and content of a captured image which is used as a determination criterion is arbitrary. Of course, conditions other than the content of a captured image may be used as a determination criterion. For example, the normal time and the notice time may be changed on the basis of the magnitude, a waveform, or the like of a recorded sound, and may be changed, for example, for each predetermined time interval, or by an external instruction such as an instruction from a user.

In addition, in the above description, an example of changing two states including the normal time and the notice time has been described, but the number of states is arbitrary, and, for example, three or more states such as the normal time, the slight notice time, the notice time, the great notice time, may be changed. Here, an upper limit number of changed states depends on the number of layers of scalable coded data.

In addition, the imaging apparatus 1201 may determine the number of scalable coded layers on the basis of a state. For example, in a case of the normal time, the imaging apparatus 1201 may generate the base layer scalable coded data (BL) 1222 having a small amount of data with low quality, and may supply the data to the scalable coded data storage device 1202. Further, for example, in a case of the notice time, the imaging apparatus 1201 may generate the base layer scalable coded data (BL+EL) 1221 having a large amount of data with high quality, and may supply the data to the scalable coded data storage device 1202.

In the above description, the description has been made of the monitoring camera as an example, but usage of the imaging system 1200 is arbitrary and is not limited to a monitoring camera.

In addition, the present technology is also applied to the above-described imaging apparatus 1200 as illustrated in FIG. 37 in the same manner as in the application thereof to the layer coding and layer decoding described with reference to FIGS. 27 to 29, and thus it is possible to achieve the effects described with reference to FIGS. 27 to 29.

Further, in the present specification, a description has been made of an example in which various information pieces such as a code number of a prediction motion vector, difference motion vector information, prediction motion vector information, and an On/Off flag of parallel process control, are multiplexed into a coded stream, and are transmitted from a coding side to a decoding side. However, a method of transmitting the information pieces is not limited to this example. For example, the information may be transmitted or recorded as separate data correlated with a coded bit stream without being multiplexed into the coded bit stream. Here, the term "correlated" indicates that an image (which may be a part of the image such as a slice or a block) included in the bit stream can be linked to information corresponding to the image during decoding. In other words, the information may be transmitted on a transmission path different from that of the image (or the bit stream). Furthermore, the information may be recorded on a recording medium (or a different recording area of the same recording medium) different from that of the image (or the bit stream). Moreover, the information and the image (or the bit stream) may be correlated with each other in any unit such as, for example, a plurality of frames, one frame, or a part of the frame.

As mentioned above, although the preferred embodiment of the present disclosure has been described in detail with reference to the accompanying drawings, the present disclosure is not limited to this example. It is obvious that those skilled in the art can conceive of various modifications or alterations in the scope of the technical spirit recited in the claims, and it is understood that they naturally also fall within the technical scope of the present disclosure.

In addition, the present technology may have the following configurations.

(1) An image processing apparatus including an adjacent region setting unit that sets spatially adjacent regions on the basis of positions of prediction regions in a coding region so that generation of spatial motion vectors of the plurality of prediction regions is performed in parallel when a spatial prediction motion vector is generated among prediction motion vectors used to decode motion vectors of the plurality of prediction regions forming the coding region of an image; a prediction motion vector generation unit that generates a spatial prediction vector of the prediction region by using the motion vector of the spatially adjacent region set by the adjacent region setting unit; and a motion vector decoding unit that decodes a motion vector of the prediction region by using the prediction motion vector of the prediction region.

(2) The image processing apparatus according to the above (1), in which, in a case where a first prediction region is located on a right or lower side in the coding region, the adjacent region setting unit sets a first adjacent region of a second prediction region instead of the first adjacent region serving as the second prediction region located on a left or upper side in the coding region among adjacent regions of the first prediction region.

(3) The image processing apparatus according to the above (2), in which, in a case where the first prediction region is located on the right or lower side in the coding region, the adjacent region setting unit sets a second adjacent region of the second prediction region instead of the second adjacent region adjacent to the first prediction region among the adjacent regions of the first prediction region.

(4) The image processing apparatus according to the above (3), in which, in a case where the coding region is split into prediction regions of 2N×N, the first prediction region is a prediction region located on the lower side in the coding region, the second prediction region is a prediction region located on the upper side in the coding region, the first adjacent region is an adjacent region adjacent to an upper side of the prediction region, and the second adjacent region is an adjacent region adjacent to an upper right side of the prediction region.

(5) The image processing apparatus according to the above (3), in which, in a case where the coding region is split into prediction regions of N×2N, the first prediction region is a prediction region located on the right side in the coding region, the second prediction region is a prediction region located on the left side in the coding region, the first adjacent region is an adjacent region adjacent to a left side of the prediction region, and the second adjacent region is an adjacent region adjacent to a lower left side of the prediction region.

(6) The image processing apparatus according to the above (3), in which in a case where the first prediction region is located on the right side and the lower side in the coding region, the adjacent region setting unit sets a first adjacent region of a second prediction region instead of the first adjacent region serving as the second prediction region adjacent to the upper left side in the coding region among adjacent regions of the first prediction region.

(7) The image processing apparatus according to the above (6), in which, in a case where the coding region is split into prediction regions of 4×4, when the first prediction region is a prediction region located on the upper right side in the coding region, and the second prediction region is a prediction region located on the upper left side in the coding region, the first adjacent region is an adjacent region adjacent to the left side of the prediction region, and the second adjacent region is an adjacent region adjacent to the lower left side of the prediction region; when the first prediction region is a prediction region located on the lower left side in the coding region, and the second prediction region is a prediction region located on the upper left side in the coding region, the first adjacent region is an adjacent region adjacent to the upper side of the prediction region, and the second adjacent region is an adjacent region adjacent to the upper right side of the prediction region; and when the first prediction region is a prediction region located on the lower right side in the coding region, and the second prediction region is a prediction region located on the upper left side in the coding region, the first adjacent region is an adjacent region adjacent to the upper left side of the prediction region.

(8) The image processing apparatus according to any one of the above (1) to (5), in which the coding region is split into a plurality of prediction regions on the basis of asymmetric motion partition.

(9) The image processing apparatus according to any one of the above (1) to (8), further including a reception unit that receives a coded stream and a flag indicating whether or not setting of the spatially adjacent region will be performed; and a decoding unit that decodes the coded stream received by the reception unit so as to generate the image, in which the adjacent region setting unit performs setting of the spatially adjacent region on the basis of the flag received by the reception unit.

(10) The image processing apparatus according to the above (9), in which the flag is set for each coding region or the prediction region.

(11) The image processing apparatus according to any one of the above (1) to (10), in which whether or not setting of the spatially adjacent region will be performed is set on the basis of a sequence profile or level, and in which the adjacent region setting unit performs setting of the spatially adjacent region on the basis of the sequence profile or level.

(12) An image processing method including causing an image processing apparatus to set spatially adjacent regions on the basis of positions of prediction regions in a coding region so that generation of spatial motion vectors of the plurality of prediction regions is performed in parallel when a spatial prediction motion vector is generated among prediction motion vectors used to decode motion vectors of the plurality of prediction regions forming the coding region of an image; generate a spatial prediction vector of the prediction region by using the motion vector of the set spatially adjacent region; and decode a motion vector of the prediction region by using the prediction motion vector of the prediction region.

(13) An image processing apparatus including an adjacent region setting unit that sets spatially adjacent regions on the basis of positions of prediction regions in a coding region so that generation of spatial motion vectors of the plurality of prediction regions is performed in parallel when a spatial prediction motion vector is generated among prediction motion vectors used to code motion vectors of the plurality of prediction regions forming the coding region of an image; a prediction motion vector generation unit that generates a spatial prediction vector of the prediction region by using the motion vector of the spatially adjacent region set by the adjacent region setting unit; and a motion vector coding unit that codes a motion vector of the prediction region by using the prediction motion vector of the prediction region.

(14) The image processing apparatus according to the above (13), in which, in a case where a first prediction region is located on a right or lower side in the coding region, the adjacent region setting unit sets a first adjacent region of a second prediction region instead of the first adjacent region serving as the second prediction region located on a left or upper side in the coding region among adjacent regions of the first prediction region.

(15) The image processing apparatus according to the above (14), in which, in a case where the first prediction region is located on the right or lower side in the coding region, the adjacent region setting unit sets a second adjacent region of the second prediction region instead of the second adjacent region adjacent to the first prediction region among the adjacent regions of the first prediction region.

(16) The image processing apparatus according to the above (15), in which, in a case where the coding region is split into prediction regions of 2N×N, the first prediction region is a prediction region located on the lower side in the coding region, the second prediction region is a prediction region located on the upper side in the coding region, the first adjacent region is an adjacent region adjacent to an upper side of the prediction region, and the second adjacent region is an adjacent region adjacent to an upper right side of the prediction region.

(17) The image processing apparatus according to the above (15), in which, in a case where the coding region is split into prediction regions of N×2N, the first prediction region is a prediction region located on the right side in the coding region, the second prediction region is a prediction region located on the left side in the coding region, the first adjacent region is an adjacent region adjacent to a left side of the prediction region, and the second adjacent region is an adjacent region adjacent to a lower left side of the prediction region.

(18) The image processing apparatus according to the above (15), in which, in a case where the first prediction region is located on the lower right side in the coding region, the adjacent region setting unit sets a first adjacent region of a second prediction region instead of the first adjacent region serving as the second prediction region located on the upper left side in the coding region among adjacent regions of the first prediction region.

(19) The image processing apparatus according to the above (18), in which, in a case where the coding region is split into prediction regions of 4×4, when the first prediction region is a prediction region located on the upper right side in the coding region, and the second prediction region is a prediction region located on the upper left side in the coding region, the first adjacent region is an adjacent region adjacent to the left side of the prediction region, and the second adjacent region is an adjacent region adjacent to the lower left side of the prediction region; when the first prediction region is a prediction region located on the lower left side in the coding region, and the second prediction region is a prediction region located on the upper left side in the coding region, the first adjacent region is an adjacent region adjacent to the upper side of the prediction region, and the second adjacent region is an adjacent region adjacent to the upper right side of the prediction region; and when the first prediction region is a prediction region located on the lower right side in the coding region, and the second prediction region is a prediction region located on the upper left side in the coding region, the first adjacent region is an adjacent region adjacent to the upper left side of the prediction region.

(20) The image processing apparatus according to the above (15), in which the coding region is split into a plurality of prediction regions on the basis of asymmetric motion partition.

(21) The image processing apparatus according to claim any one of the above (13) to (20), further including a setting unit that sets a flag indicating whether or not setting of the spatially adjacent region will be performed; a coding unit that codes the image so as to generate a coded stream; and a transmission unit that transmits the motion vector coded by the motion vector coding unit, the coded stream generated by the coding unit, and the flag set by the setting unit, in which the adjacent region setting unit performs setting of the spatially adjacent region on the basis of the flag set by the setting unit.

(22) The image processing apparatus according to the above (21), in which the setting unit sets the flag for each coding region or the prediction region.

(23) The image processing apparatus according to any one of the above (13) to (22), in which whether or not setting of the spatially adjacent region will be performed is set on the basis of a sequence profile or level, and in which the adjacent region setting unit performs setting of the spatially adjacent region on the basis of the sequence profile or level.

(24) An image processing method including causing an image processing apparatus to set spatially adjacent regions on the basis of positions of prediction regions in a coding region so that generation of spatial motion vectors of the plurality of prediction regions is performed in parallel when a spatial prediction motion vector is generated among prediction motion vectors used to code motion vectors of the plurality of prediction regions forming the coding region of an image; generate a spatial prediction vector of the prediction region by using the motion vector of the set spatially adjacent region; and code a motion vector of the target region by using the prediction motion vector of the prediction region.

REFERENCE SIGNS LIST

100 IMAGE CODING DEVICE, 106 REVERSIBLE CODING UNIT, 115 MOTION PREDICTION/COMPENSATION UNIT, 121 MOTION VECTOR CODING UNIT, 122 PARALLEL PROCESS CONTROL UNIT, 151 SPATIALLY ADJACENT MOTION VECTOR BUFFER, 152 TEMPORALLY ADJACENT MOTION VECTOR BUFFER, 153 CANDIDATE PREDICTION MOTION VECTOR GENERATION SECTION, 154 COST FUNCTION VALUE CALCULATION SECTION, 155 OPTIMAL PREDICTION MOTION VECTOR DETERMINATION SECTION, 200 IMAGE DECODING DEVICE, 202 REVERSIBLE DECODING UNIT, 212 MOTION PREDICTION/COMPENSATION UNIT, 221 MOTION VECTOR DECODING UNIT, 222 PARALLEL PROCESS CONTROL UNIT, 251 PREDICTION MOTION VECTOR INFORMATION BUFFER, 252 DIFFERENCE MOTION VECTOR INFORMATION BUFFER, 253 PREDICTION

MOTION VECTOR RECONSTRUCTION SECTION, 254
MOTION VECTOR RECONSTRUCTION SECTION, 255
SPATIALLY ADJACENT MOTION VECTOR BUFFER, 256 TEMPORALLY ADJACENT MOTION VECTOR BUFFER

The invention claimed is:

1. An image processing apparatus comprising:
   circuitry configured to:
   set spatially adjacent blocks on the basis of positions of prediction blocks in a coding block in case that a spatial prediction motion vector is generated among prediction motion vectors used to decode motion vectors of the plurality of prediction blocks forming the coding block of an image;
   generate a spatial prediction vector of the prediction block by using the motion vector of the set spatially adjacent block; and
   decode a motion vector of the prediction block by using the prediction motion vector of the prediction block,
   wherein, in a case where a first prediction block is located on a right or lower side in the coding block, the circuitry is configured to set a first adjacent block of a second prediction block located on a left or upper side in the coding block among adjacent blocks of the first prediction block or to set a second adjacent block of the second prediction block among the adjacent blocks of the first prediction block.

2. The image processing apparatus according to claim 1, wherein, in a case where the coding block is split into prediction blocks of 2N×N, the first prediction block is a prediction block located on the lower side in the coding block, the second prediction block is a prediction block located on the upper side in the coding block, the first adjacent block is an adjacent block adjacent to an upper side of the prediction block, and the second adjacent block is an adjacent block adjacent to an upper right side of the prediction block.

3. The image processing apparatus according to claim 1, wherein, in a case where the coding block is split into prediction blocks of N×2N, the first prediction block is a prediction block located on the right side in the coding block, the second prediction block is a prediction block located on the left side in the coding block, the first adjacent block is an adjacent block adjacent to a left side of the prediction block, and the second adjacent block is an adjacent block adjacent to a lower left side of the prediction block.

4. The image processing apparatus according to claim 1, wherein, in a case where the first prediction block is located on the right side and the lower side in the coding block, the circuitry is configured to set the first adjacent block of the second prediction block instead of the first adjacent block serving as the second prediction block adjacent to the upper left side in the coding block among adjacent blocks of the first prediction block.

5. The image processing apparatus according to claim 4, wherein, in a case where the coding block is split into prediction blocks of 4×4, when the first prediction block is a prediction block located on the upper right side in the coding block, and the second prediction block is a prediction block located on the upper left side in the coding block, the first adjacent block is an adjacent block adjacent to the left side of the prediction block, and the second adjacent block is an adjacent block adjacent to the lower left side of the prediction block,
   when the first prediction block is a prediction block located on the lower left side in the coding block, and the second prediction block is a prediction block located on the upper left side in the coding block, the first adjacent block is an adjacent block adjacent to the upper side of the prediction block, and the second adjacent block is an adjacent block adjacent to the upper right side of the prediction block, and
   when the first prediction block is a prediction block located on the lower right side in the coding block, and the second prediction block is a prediction block located on the upper left side in the coding block, the first adjacent block is an adjacent block adjacent to the upper left side of the prediction block.

6. The image processing apparatus according to claim 1, wherein the coding block is split into a plurality of prediction blocks on the basis of asymmetric motion partition.

7. The image processing apparatus according to claim 1, wherein the circuitry is further configured to:
   receive a coded stream and a flag indicating whether or not setting of the spatially adjacent block will be performed; and
   decode the received coded stream reception unit so as to generate the image,
   wherein the spatially adjacent block is set on the basis of the received flag.

8. The image processing apparatus according to claim 7, wherein the flag is set for each coding block or the prediction block.

9. The image processing apparatus according to claim 1, wherein whether or not setting of the spatially adjacent block will be performed is set on the basis of a sequence profile or level, and
   wherein the spatially adjacent block is set on the basis of the sequence profile or level.

10. An image processing method comprising:
    causing an image processing apparatus to
    set spatially adjacent blocks on the basis of positions of prediction blocks in a coding block in case that a spatial prediction motion vector is generated among prediction motion vectors used to decode motion vectors of the plurality of prediction blocks forming the coding block of an image;
    generate a spatial prediction vector of the prediction block by using the motion vector of the set spatially adjacent block; and
    decode a motion vector of the prediction block by using the prediction motion vector of the prediction block,
    wherein, in a case where a first prediction block is located on a right or lower side in the coding block, a first adjacent block of a second prediction block located on a left or upper side in the coding block among adjacent blocks of the first prediction block, or a second adjacent block of the second prediction block among the adjacent blocks of the first prediction block, is set.

11. An image processing apparatus comprising:
    circuitry configured to:
    set spatially adjacent blocks on the basis of positions of prediction blocks in a coding block in case that a spatial prediction motion vector is generated among prediction motion vectors used to code motion vectors of the plurality of prediction blocks forming the coding block of an image;
    generate a spatial prediction vector of the prediction block by using the motion vector of the set spatially adjacent block; and code a motion vector of the prediction block by using the prediction motion vector of the prediction block, wherein, in a case where a first prediction block is located on a right or lower side in the coding block, the circuitry is configured to set a first adjacent block of a second prediction block located on a left or upper side in the coding block among adjacent blocks of the first prediction block or to set a second adjacent block of the second prediction block among the adjacent blocks of the first prediction block.

12. The image processing apparatus according to claim 11, wherein, in a case where the coding block is split into prediction blocks of 2N×N, the first prediction block is a prediction block located on the lower side in the coding block, the second prediction block is a prediction block located on the upper side in the coding block, the first adjacent block is an adjacent block adjacent to an upper side of the prediction block, and the second adjacent block is an adjacent block adjacent to an upper right side of the prediction block.

13. The image processing apparatus according to claim 11, wherein, in a case where the coding block is split into prediction blocks of N×2N, the first prediction block is a prediction block located on the right side in the coding block, the second prediction block is a prediction block located on the left side in the coding block, the first adjacent block is an adjacent block adjacent to a left side of the prediction block, and the second adjacent block is an adjacent block adjacent to a lower left side of the prediction block.

14. The image processing apparatus according to claim 11, wherein, in a case where the first prediction block is located on the lower right side in the coding block, the circuitry is configured to set the first adjacent block of the second prediction block instead of the first adjacent block serving as the second prediction block located on the upper left side in the coding block among adjacent blocks of the first prediction block.

15. The image processing apparatus according to claim 14, wherein, in a case where the coding block is split into prediction blocks of 4×4, when the first prediction block is a prediction block located on the upper right side in the coding block, and the second prediction block is a prediction block located on the upper left side in the coding block, the first adjacent block is an adjacent block adjacent to the left side of the prediction block, and the second adjacent block is an adjacent block adjacent to the lower left side of the prediction block, when the first prediction block is a prediction block located on the lower left side in the coding block, and the second prediction block is a prediction block located on the upper left side in the coding block, the first adjacent block is an adjacent block adjacent to the upper side of the prediction block, and the second adjacent block is an adjacent block adjacent to the upper right side of the prediction block, and when the first prediction block is a prediction block located on the lower right side in the coding block, and the second prediction block is a prediction block located on the upper left side in the coding block, the first adjacent block is an adjacent block adjacent to the upper left side of the prediction block.

16. The image processing apparatus according to claim 11, wherein the coding block is split into a plurality of prediction blocks on the basis of asymmetric motion partition.

17. The image processing apparatus according to claim 11, wherein the circuitry is further configured to:

set a flag indicating whether or not setting of the spatially adjacent block will be performed;

code the image so as to generate a coded stream; and transmit the coded motion vector, the generated coded stream, and the set flag, wherein the spatially adjacent block is set on the basis of the set flag.

18. The image processing apparatus according to claim 17, wherein the flag is set for each coding block or the prediction block.

19. The image processing apparatus according to claim 11, wherein whether or not setting of the spatially adjacent block will be performed is set on the basis of a sequence profile or level, and wherein the spatially adjacent block is set on the basis of the sequence profile or level.

20. An image processing method comprising:

causing an image processing apparatus to set spatially adjacent blocks on the basis of positions of prediction blocks in a coding block in case that a spatial prediction motion vector is generated among prediction motion vectors used to code motion vectors of the plurality of prediction blocks forming the coding block of an image;

generate a spatial prediction vector of the prediction block by using the motion vector of the set spatially adjacent block; and code a motion vector of the prediction block by using the prediction motion vector of the prediction block, wherein, in a case where a first prediction block is located on a right or lower side in the coding block, a first adjacent block of a second prediction block located on a left or upper side in the coding block among adjacent blocks of the first prediction block, or a second adjacent block of the second prediction block among the adjacent blocks of the first prediction block, is set.

* * * * *